United States Patent
Hirata et al.

(10) Patent No.: US 9,583,133 B2
(45) Date of Patent: Feb. 28, 2017

(54) IMAGE GENERATION DEVICE AND IMAGE GENERATION METHOD FOR MULTIPLEXING CAPTURED IMAGES TO GENERATE AN IMAGE STREAM

(75) Inventors: Shinichi Hirata, Kanagawa (JP); Hiroshi Osawa, Kanagawa (JP); Kyoko Furumura, Tokyo (JP)

(73) Assignees: Sony Corporation, Tokyo (JP); Sony Interactive Entertainment Inc., Tokyo (JP)

( * ) Notice: Subject to any disclaimer, the term of this patent is extended or adjusted under 35 U.S.C. 154(b) by 135 days.

(21) Appl. No.: 14/402,633

(22) PCT Filed: Jun. 11, 2012

(86) PCT No.: PCT/JP2012/003798
§ 371 (c)(1),
(2), (4) Date: Nov. 20, 2014

(87) PCT Pub. No.: WO2013/186804
PCT Pub. Date: Dec. 19, 2013

(65) Prior Publication Data
US 2015/0162048 A1 Jun. 11, 2015

(51) Int. Cl.
*H04N 5/232* (2006.01)
*G11B 20/10* (2006.01)
(Continued)

(52) U.S. Cl.
CPC ......... *G11B 20/10527* (2013.01); *H04N 1/21* (2013.01); *H04N 5/2258* (2013.01);
(Continued)

(58) Field of Classification Search
CPC ........... H04N 5/23238; H04N 5/23241; H04N 5/23245; H04N 7/181; G08B 13/19647;
(Continued)

(56) References Cited

U.S. PATENT DOCUMENTS 4,868,682 A * 9/1989 Shimizu ................. H04N 5/782
348/38
5,396,284 A * 3/1995 Freeman ............... G06T 7/2033
348/154
(Continued)

FOREIGN PATENT DOCUMENTS

GB 2452352 A 3/2009
JP 2004328736 A 11/2004
(Continued)

OTHER PUBLICATIONS

Fukuda, Machine generated translation of JP02010232908A, Oct. 2010.*
(Continued)

*Primary Examiner* — David Harvey
(74) *Attorney, Agent, or Firm* — Matthew B. Dernier, Esq.

(57) ABSTRACT

Frame memories store captured images supplied from a plurality of imaging units, respectively. A motion detection portion detects the motion of a captured image of at least one of the imaging units. A mode determination portion sets, in accordance with at least either the amount of the motion detected by the motion detection portion or a power consumption limit of the image generation device, one of two modes, one for operating the plurality of imaging units simultaneously and the other for operating the plurality of imaging units intermittently. A control signal generation portion supplies, to the plurality of frame memories, a control signal adapted to control reading of the captured images from the plurality of frame memories in accordance with the mode set by the mode determination portion.

9 Claims, 35 Drawing Sheets

(51) Int. Cl.
  *H04N 5/225* (2006.01)
  *H04N 1/21* (2006.01)
  *H04N 5/247* (2006.01)
  *H04N 9/87* (2006.01)
(52) U.S. Cl.
  CPC ..... *H04N 5/23238* (2013.01); *H04N 5/23241* (2013.01); *H04N 5/247* (2013.01); *H04N 9/87* (2013.01); *G11B 2020/10592* (2013.01); *H04N 5/23245* (2013.01)
(58) Field of Classification Search
  CPC ........ G08B 13/19641; G08B 13/19665; G08B 13/19621; G08B 13/19628; G11B 20/10527
  USPC .......................................................... 348/35
  See application file for complete search history.

(56) References Cited

U.S. PATENT DOCUMENTS

| | | | | |
|---|---|---|---|---|
| 5,963,255 A * | 10/1999 | Anderson | H04N 5/23241 | 320/135 |
| 6,141,034 A * | 10/2000 | McCutchen | G02B 27/22 | 348/36 |
| 6,323,858 B1 * | 11/2001 | Gilbert | H04N 5/232 | 345/418 |
| 6,335,754 B1 * | 1/2002 | Endo | G01C 11/02 | 348/36 |
| 6,573,912 B1 * | 6/2003 | Suzuki | G06T 7/0065 | 345/419 |
| 6,809,887 B1 * | 10/2004 | Gao | G02B 13/06 | 348/48 |
| 7,120,313 B2 * | 10/2006 | Kotake | G06T 1/20 | 382/282 |
| 7,643,055 B2 | 1/2010 | Uebbing | | |
| 7,720,353 B1 * | 5/2010 | Jouppi | H04N 5/783 | 386/241 |
| 7,942,314 B1 * | 5/2011 | Grimm | G06Q 20/042 | 235/375 |
| 2003/0007668 A1 * | 1/2003 | Kotake | G01C 21/26 | 382/113 |
| 2003/0025599 A1 * | 2/2003 | Monroe | G08B 13/19602 | 340/531 |
| 2003/0133008 A1 * | 7/2003 | Stephenson | H04N 5/2251 | 348/47 |
| 2003/0222983 A1 * | 12/2003 | Nobori | G01S 11/12 | 348/148 |
| 2004/0068583 A1 * | 4/2004 | Monroe | H04N 1/32128 | 709/246 |
| 2004/0075738 A1 * | 4/2004 | Burke | G08B 13/19656 | 348/143 |
| 2004/0212677 A1 | 10/2004 | Uebbing | | |
| 2005/0057652 A1 * | 3/2005 | Tagawa | G08B 13/19641 | 348/154 |
| 2005/0140607 A1 * | 6/2005 | Sato | G09G 3/3233 | 345/76 |
| 2005/0141607 A1 * | 6/2005 | Kaplinsky | H04N 5/232 | 375/240.2 |
| 2005/0206729 A1 * | 9/2005 | Chang | G08B 13/19619 | 348/155 |
| 2005/0275510 A1 * | 12/2005 | Li | B60R 25/1004 | 340/426.1 |
| 2006/0072014 A1 * | 4/2006 | Geng | G08B 13/19606 | 348/159 |
| 2006/0279628 A1 * | 12/2006 | Fleming | G11B 27/034 | 348/143 |
| 2007/0206945 A1 * | 9/2007 | DeLorme | G03B 41/00 | 396/332 |
| 2008/0204556 A1 * | 8/2008 | de Miranda | B60R 25/102 | 348/148 |
| 2009/0102921 A1 * | 4/2009 | Ito | B60R 1/00 | 348/148 |
| 2009/0290848 A1 * | 11/2009 | Brown | H04N 5/232 | 386/223 |
| 2010/0026712 A1 * | 2/2010 | Aliprandi | H04N 13/0011 | 345/629 |
| 2012/0057051 A1 | 3/2012 | Ito | | |
| 2012/0200665 A1 | 8/2012 | Furumura | | |
| 2015/0109446 A1 * | 4/2015 | Takano | B60R 25/10 | 348/148 |

FOREIGN PATENT DOCUMENTS

| | | | |
|---|---|---|---|
| JP | 02010232908 A | * | 10/2010 |
| JP | 2010232908 A | | 10/2010 |
| JP | 201176249 A | | 4/2011 |
| WO | 9957894 A1 | | 11/1999 |
| WO | 2006033061 A2 | | 3/2006 |
| WO | 2011010747 A1 | | 1/2011 |

OTHER PUBLICATIONS

European Search Report for corresponding Application EP12878668.8-1902, 7 pages, dated Jan. 4, 2016.
International Preliminary Report on Patentability and Written Opinion for corresponding Application PCT/JP2012/003798, 8 pages, dated Dec. 24, 2014.
International Search Report for corresponding Application PCT/JP2012/003798 dated Jul. 10, 2012.

* cited by examiner

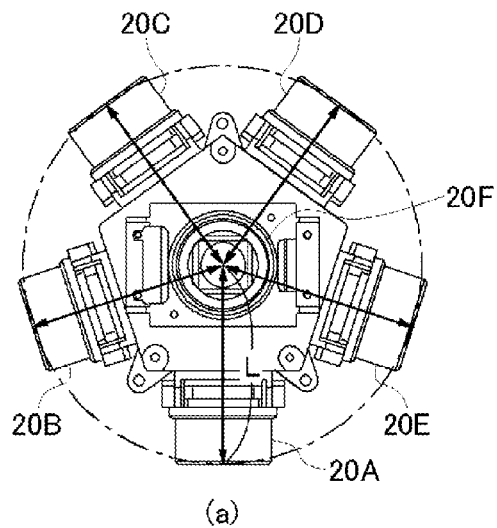
FIG.4
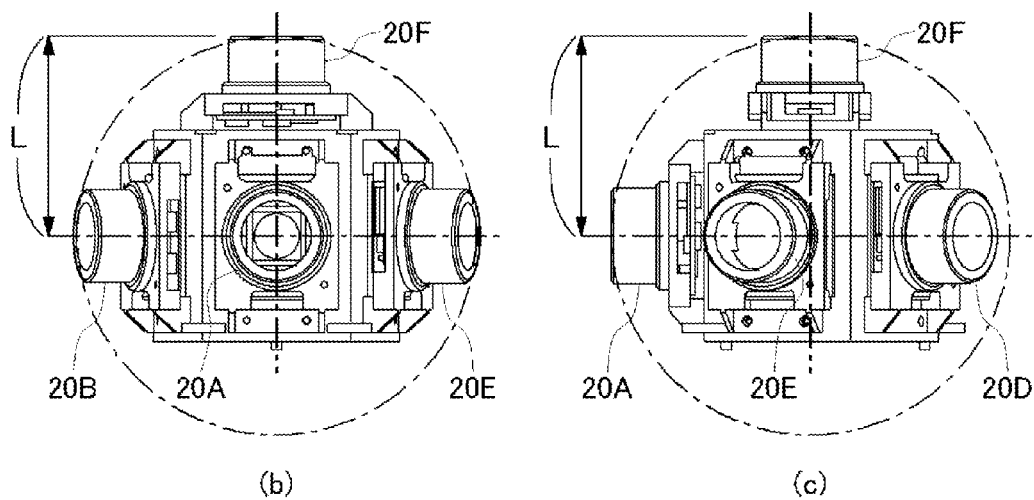

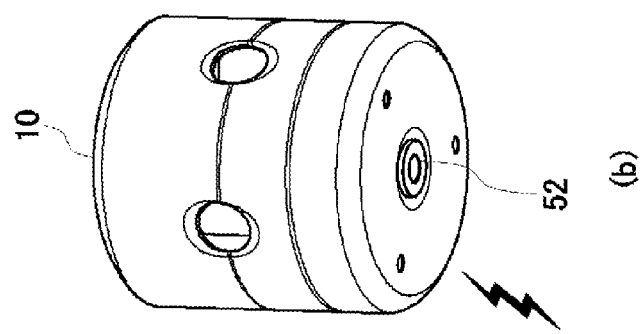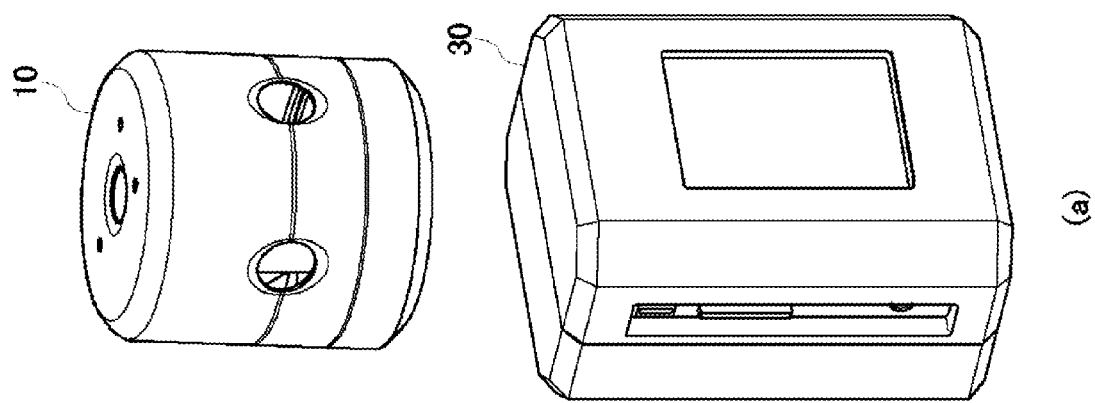
FIG. 6

FIG.10
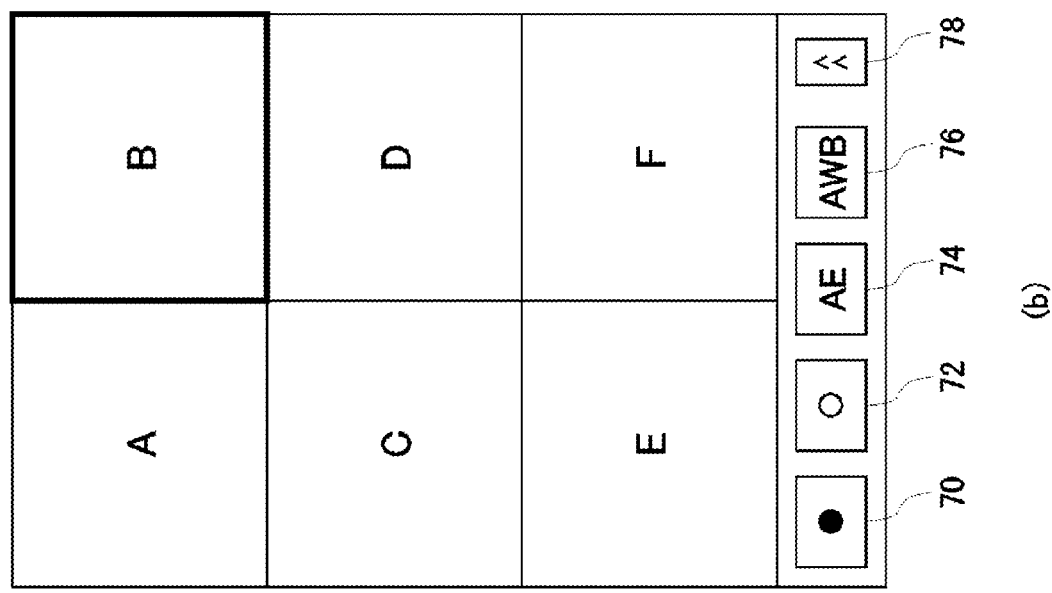
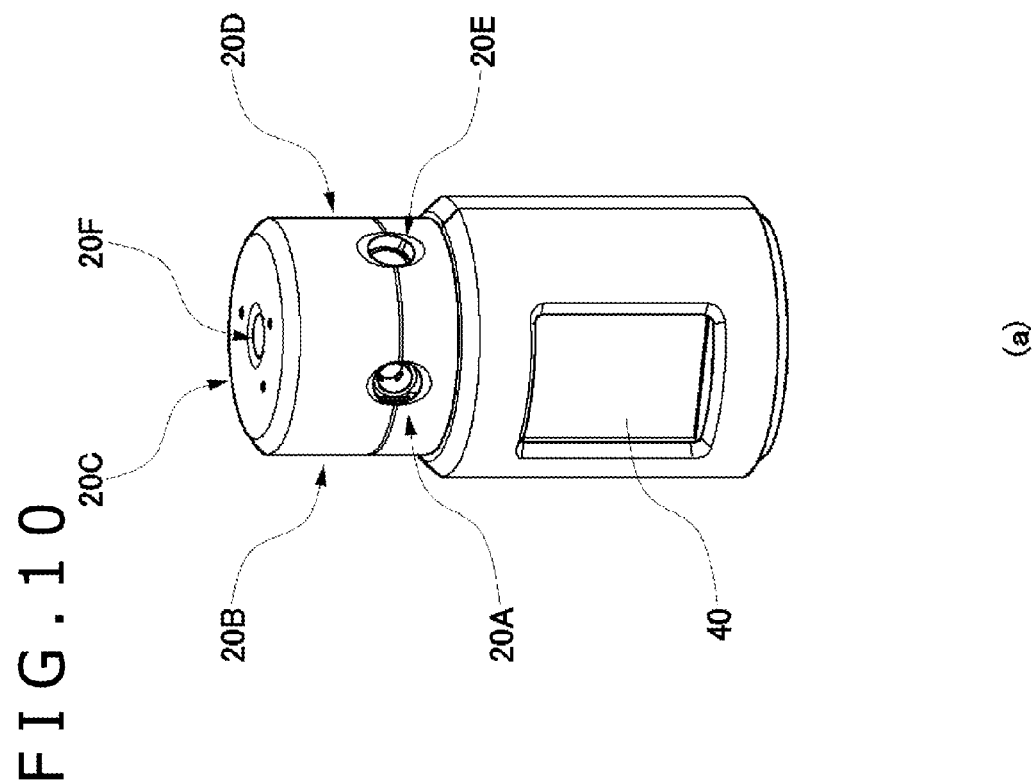

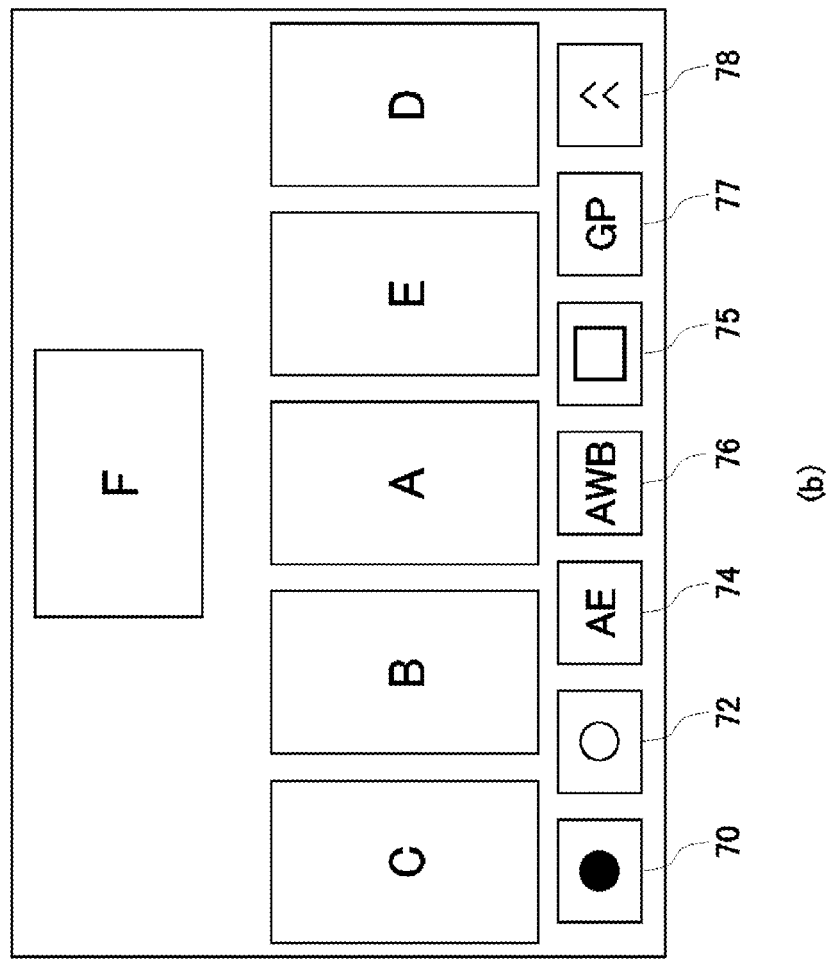
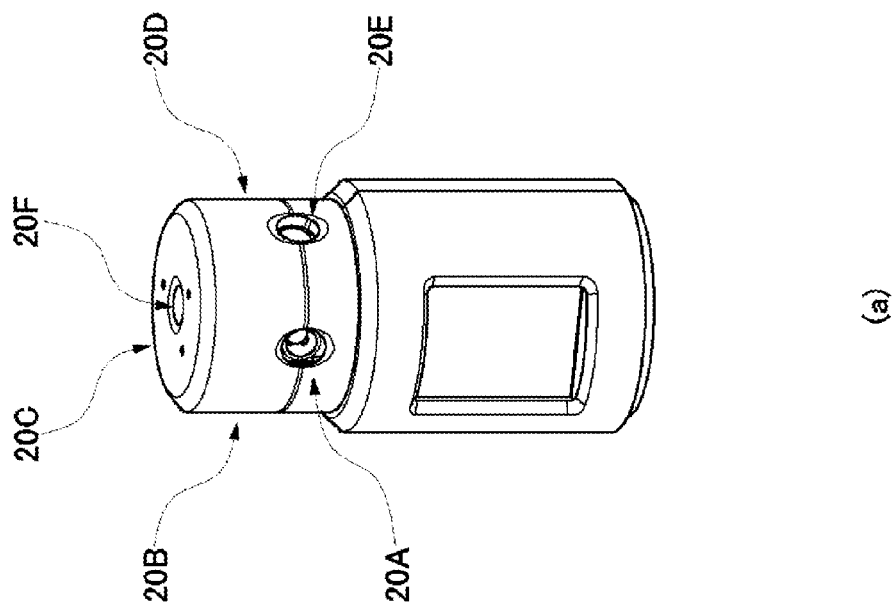
FIG. 20

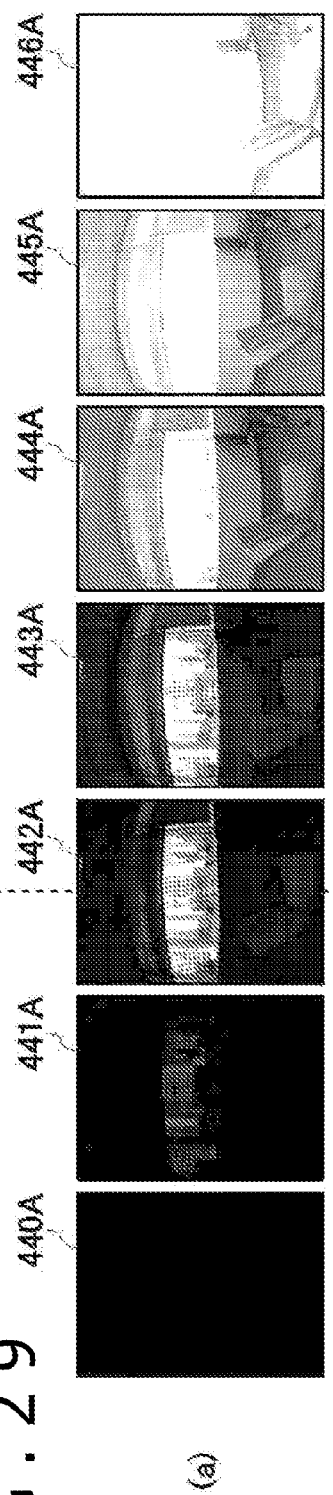
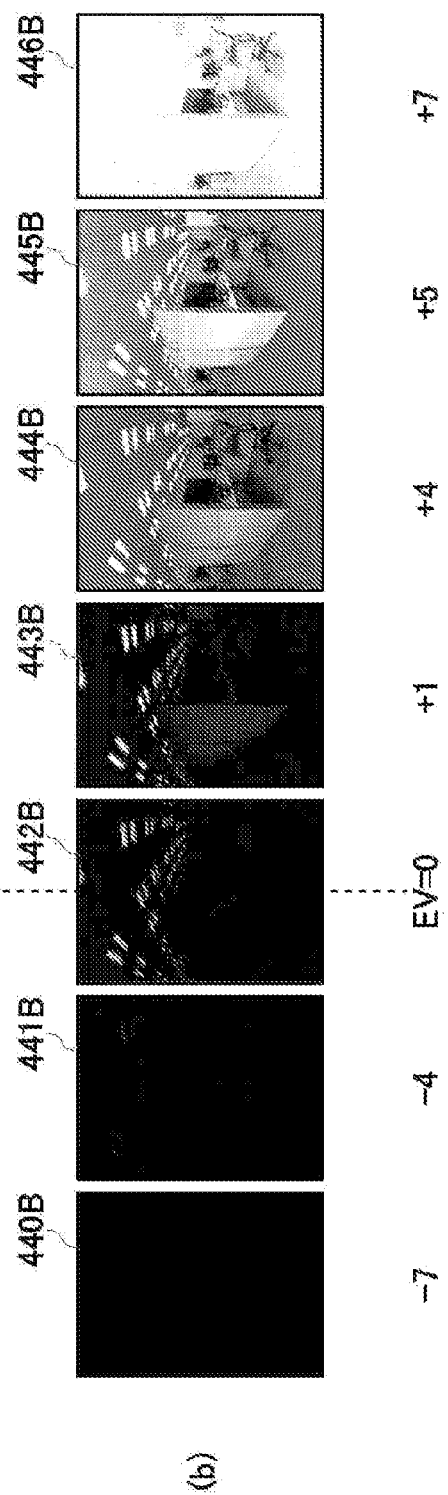
FIG. 29

FIG. 35
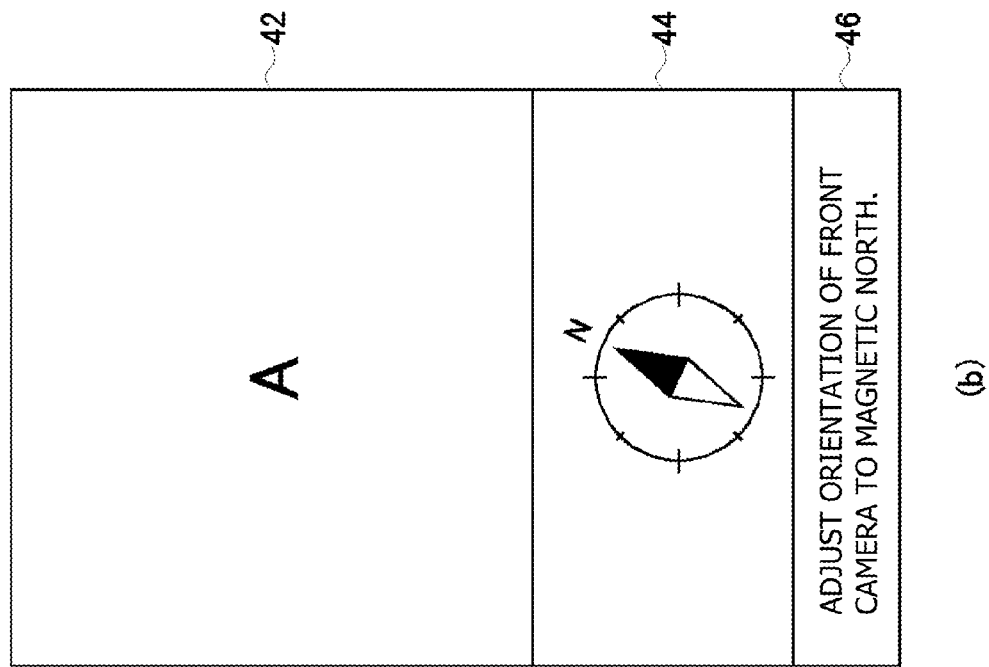
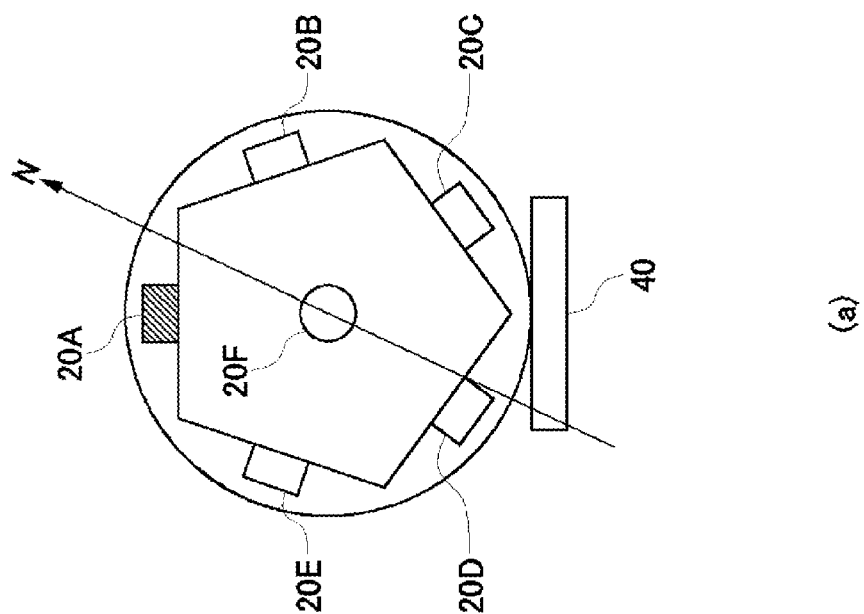

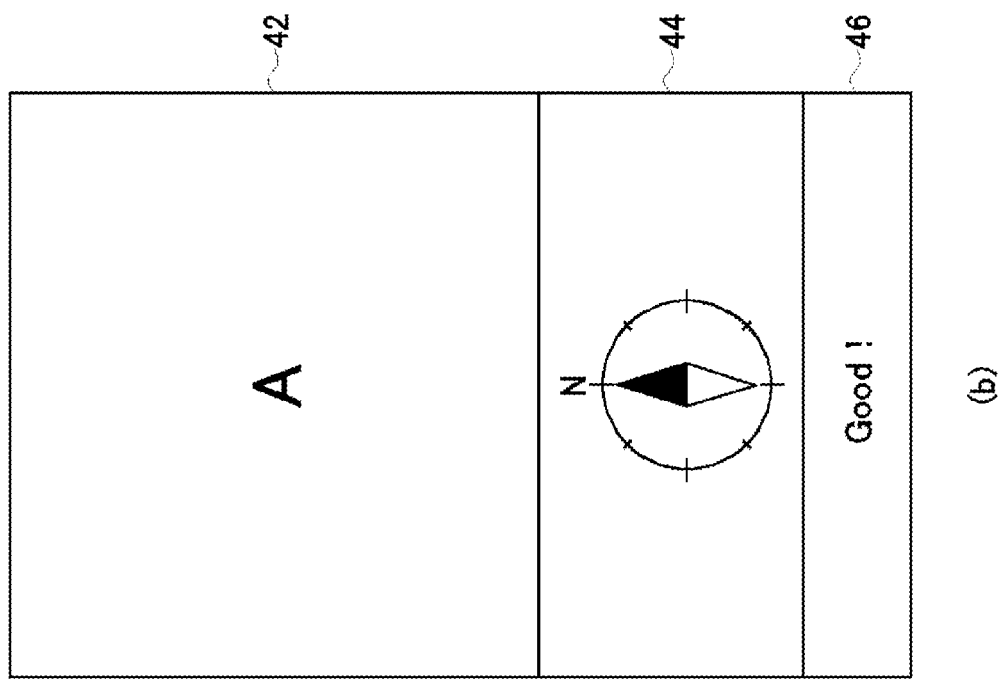
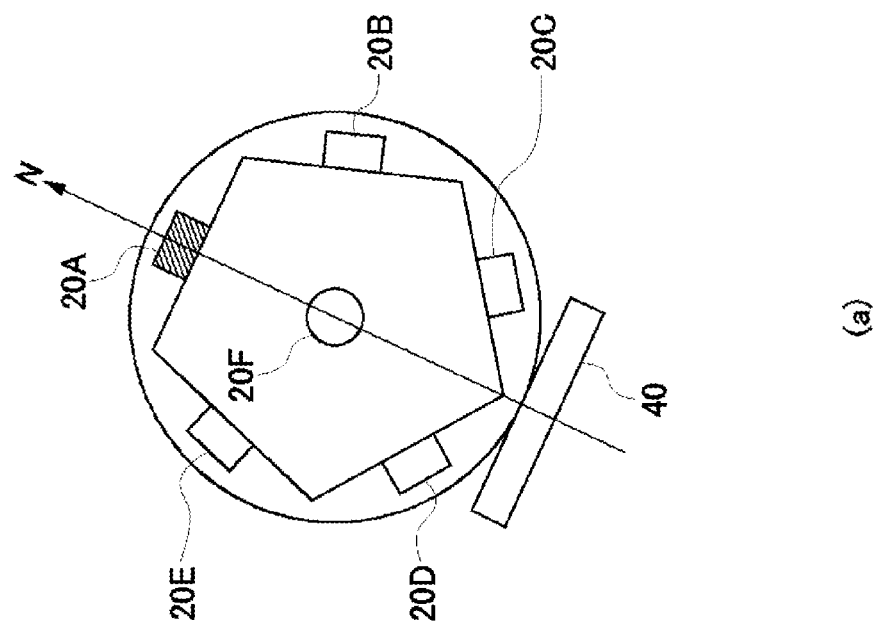
FIG.36

FIG. 37
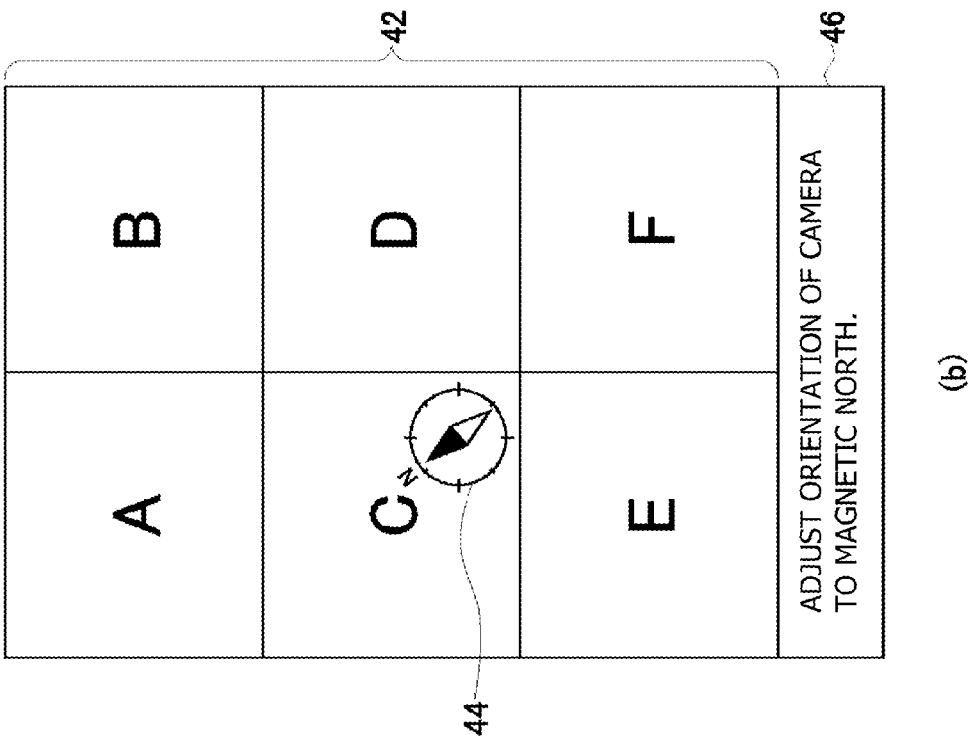
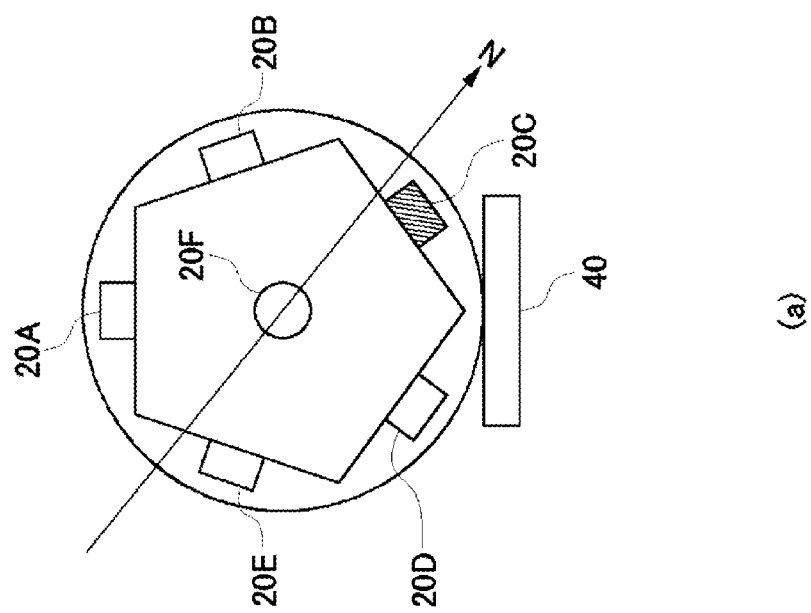

FIG.38
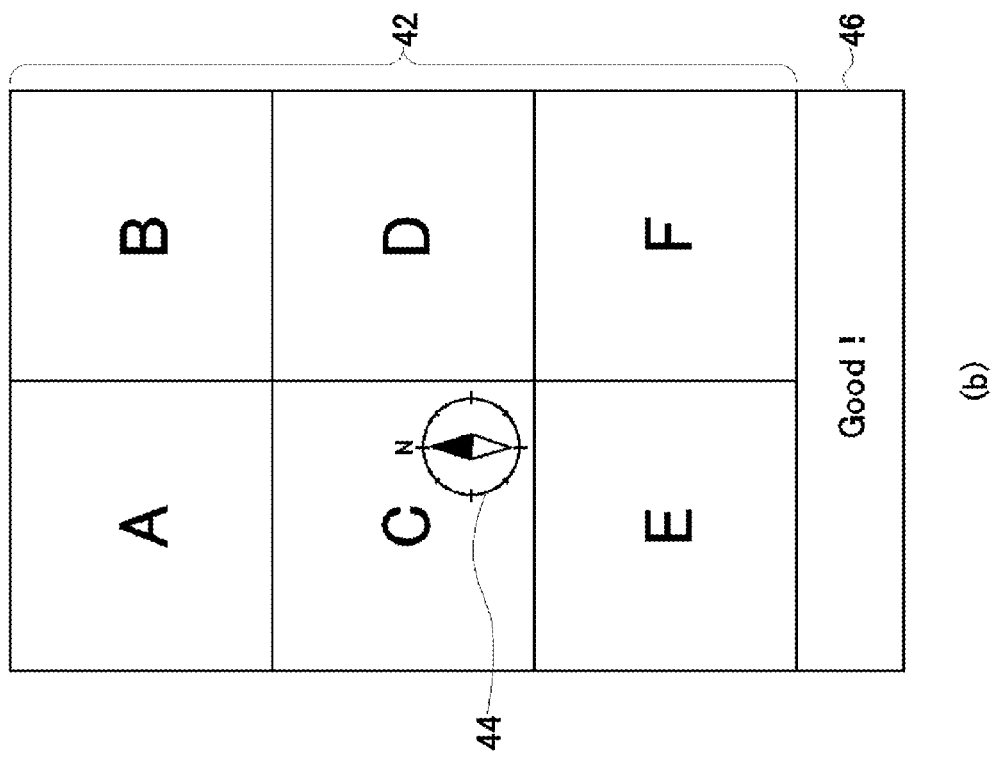
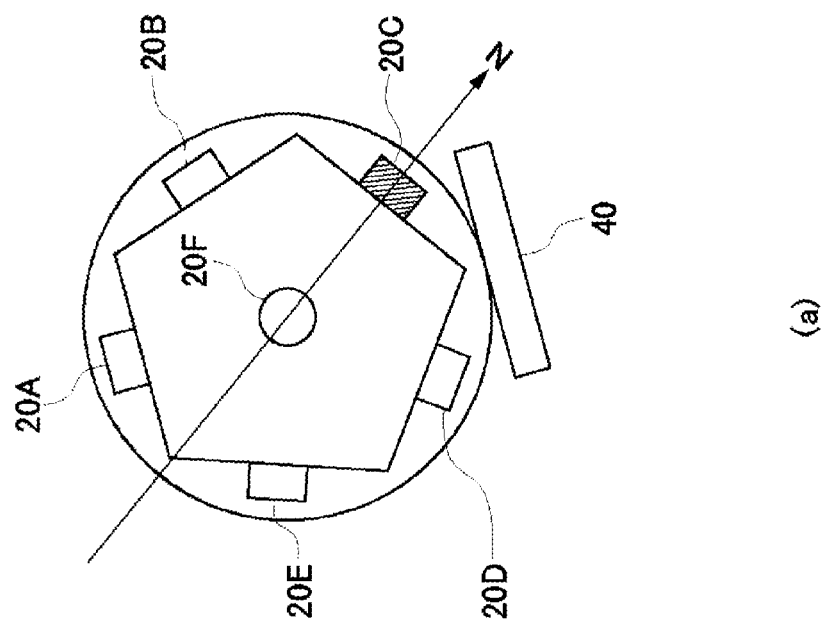

IMAGE GENERATION DEVICE AND IMAGE GENERATION METHOD FOR MULTIPLEXING CAPTURED IMAGES TO GENERATE AN IMAGE STREAM

TECHNICAL FIELD

The present invention relates to an image generation device and image generation method, and more particularly, to a device and method for capturing a composite image.

BACKGROUND ART

With digital still cameras and digital video cameras widespread, there are more occasions when captured still images and movies are stored in computers for viewing and editing or displayed on screens of game consoles and television (TV) sets. Further, it is also popular to upload captured movies to posting websites on the Internet for sharing with other users.

Some digital cameras are capable of capturing a panoramic image, making it possible to capture a panoramic image with a wide view angle in a handy manner. Software tools are in common use which generate a panoramic image by stitching together a plurality of images, shot in different shooting directions by digital cameras.

Further, a panoramic shooting mode or panoramic image synthesis application is available in some mobile devices such as camera-equipped mobile phones so that images, shot by tilting the mobile device at different angles, are automatically synthesized into a panoramic image.

CITATION LIST

Patent Literature

[PTL 1]
JP 2011-76249 A

SUMMARY

Technical Problem

Panoramic shooting mode available with cameras and camera-equipped mobile devices develops a large error caused by positional deviation because images are shot while at the same time changing the shooting direction of the camera or mobile device. Further, still images are shot one after another in different shooting directions for synthesis into a panoramic image, thus resulting in time lags between a plurality of still images shot in different shooting directions. Therefore, although it is possible to synthesize a panoramic still image, it is theoretically difficult to shoot a panoramic movie. For this reason, a method is taken in which omnidirectional images are shot simultaneously using a multiview camera incorporating a plurality of cameras, and then these images are synthesized into a panoramic photograph.

Such an omnidirectional multiview camera consumes a lot of power to drive a plurality of cameras. Further, large power is supplied to memories to process as many pieces of image data as the number of cameras. Still further, there is a problem that the memory capacity is large to store image data for the number of cameras.

The present invention has been made in light of the foregoing, and it is an object of the present invention to provide a technology which contributes to dynamic reduction in power consumption without significantly deteriorating the movie image quality even when a multiview camera is used.

Solution to Problem

In order to solve the above problem, an image generation device according to a mode of the present invention includes a plurality of frame memories and a multiplexing section. The plurality of frame memories store captured images from a plurality of imaging units. The multiplexing section reads the captured images of the imaging units from the frame memories and multiplexes the captured images to generate an image stream. The multiplexing section includes a motion detection portion, a mode determination portion, and a control signal generation portion. The motion detection portion detects the motion of a captured image of at least one of the imaging units. The mode determination portion sets, in accordance with at least either the amount of the motion detected by the motion detection portion or a power consumption limit of the image generation device, one of two modes, one for operating the plurality of imaging units simultaneously and the other for operating the plurality of imaging units intermittently. The control signal generation portion supplies, to the plurality of frame memories, a control signal adapted to control reading of the captured images from the plurality of frame memories in accordance with the mode set by the mode determination portion.

Another mode of the present invention is an image generation method. The image generation method includes a step of storing captured images from a plurality of imaging units in a plurality of frame memories. The image generation method further includes a multiplexing step of reading the captured images of the imaging units from the frame memories and multiplexing the captured images to generate an image stream. The multiplexing step includes a motion detection step, a mode determination step, and a control signal generation step. The motion detection step detects the motion of a captured image of at least one of the imaging units. The mode determination step sets, in accordance with at least either the amount of the motion detected by the motion detection step or a power consumption limit, one of two modes, one for operating the plurality of imaging units simultaneously and the other for operating the plurality of imaging units intermittently. The control signal generation step supplies, to the plurality of frame memories, a control signal adapted to control reading of the captured images from the plurality of frame memories in accordance with the mode set by the mode determination step.

It should be noted that any combinations of the above components and any conversions of expressions of the present invention between "method," "device," "system," "computer program," "data structure," "recording medium," and so on are also effective as modes of the present invention.

Advantageous Effect of Invention

The present invention allows for easy generation of a synthesized image using a multiview camera.

BRIEF DESCRIPTION OF DRAWINGS

FIGS. 4(a) to 4(c) are diagrams describing the positional relationship between six imaging units mounted to a fastening member shown in FIG. 3.

FIGS. 6(a) and 6(b) are diagrams describing a configuration in which the multiview imaging part and the main body part are detachable from each other.

FIGS. 10(a) and 10(b) are diagrams describing the operation screen displayed on the operation/display unit.

FIGS. 20(a) and 20(b) are diagrams describing examples of the operation screen displayed on the operation/display unit 40.

FIGS. 29(a) and 29(b) are diagrams describing captured images shot by setting an identical reference exposure value in the plurality of imaging units for comparison.

FIGS. 35(a) and 35(b) are diagrams describing a user interface for setting the shooting direction of the imaging unit in the front direction to magnetic north.

FIGS. 36(a) and 36(b) are diagrams describing a user interface for setting the shooting direction of the imaging unit in the front direction to magnetic north.

FIGS. 37(a) and 37(b) are diagrams describing a user interface for setting the shooting direction of the specific imaging unit to magnetic north.

FIGS. 38(a) and 38(b) are diagrams describing a user interface for setting the shooting direction of the specific imaging unit to magnetic north.

DESCRIPTION OF EMBODIMENTS

[Configuration of Panoramic Imaging Device]

Figure 1:
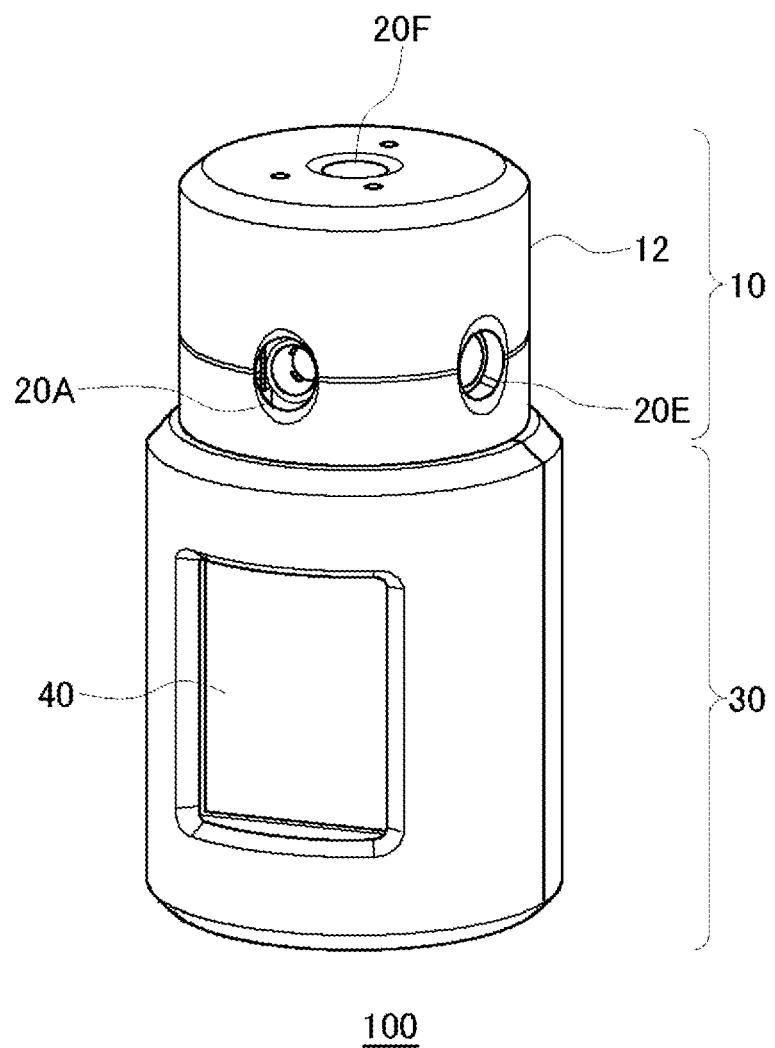
FIG. 1 is a perspective view of a panoramic imaging device according to an embodiment.

FIG. 1 is a perspective view of a panoramic imaging device 100 according to an embodiment. The panoramic imaging device 100 includes a multiview imaging part 10 and a main body part 30. In the present embodiment, the multiview imaging part 10 and the main body part 30 are both cylindrical in shape and connected together with their central axes aligned with each other.

The multiview imaging part 10 is covered with a cylindrical camera enclosure 12. A plurality of imaging units 20A to 20F (hereinafter referred to as the imaging units 20 when collectively referred to) are incorporated in the camera enclosure 12. Each of the imaging units 20A to 20F includes components required for shooting such as lens and imaging element. In the present embodiment, the five imaging units 20A to 20E (hereinafter also referred to as the "side face imaging units") are arranged equiangularly so that their lenses are located on the circumference of the cylindrical camera enclosure 12. The single imaging unit 20F (hereinafter also referred to as the "zenith imaging unit") is arranged so that its lens is located on the top face of the camera enclosure 12.

The main body part 30 includes an operation/display unit 40, a battery, a main circuit, and an external interface. The operation/display unit 40 is provided at a position recessed inward from the outer circumference of the cylindrical main body part 30. Movie data captured by the imaging units 20A to 20F of the multiview imaging part 10 is transmitted to the main circuit of the main body part 30 via a serial interface or USB (Universal Serial Bus) interface. The main circuit implements a function of generating a panoramic movie stream by multiplexing movie frames captured by the imaging units 20A to 20F. The main circuit includes an external interface used to connect an external recording device such as USB memory. A generated panoramic movie stream is recorded to the external recording device via the external interface.

The operation/display unit 40 is a display with a touch panel. The operation/display unit 40 displays, on its display, each of the images captured by one of the imaging units 20A to 20F of the multiview imaging part 10. Further, the operation/display unit 40 can display, on its display, a panoramic image obtained by synthesizing a plurality of images captured by the plurality of imaging units 20A to 20F. Still further, the operation/display unit 40 can display, on its display, an operation menu so that a user can make an operation input to the display screen by directly touching the touch panel while watching the display screen.

Figure 2:
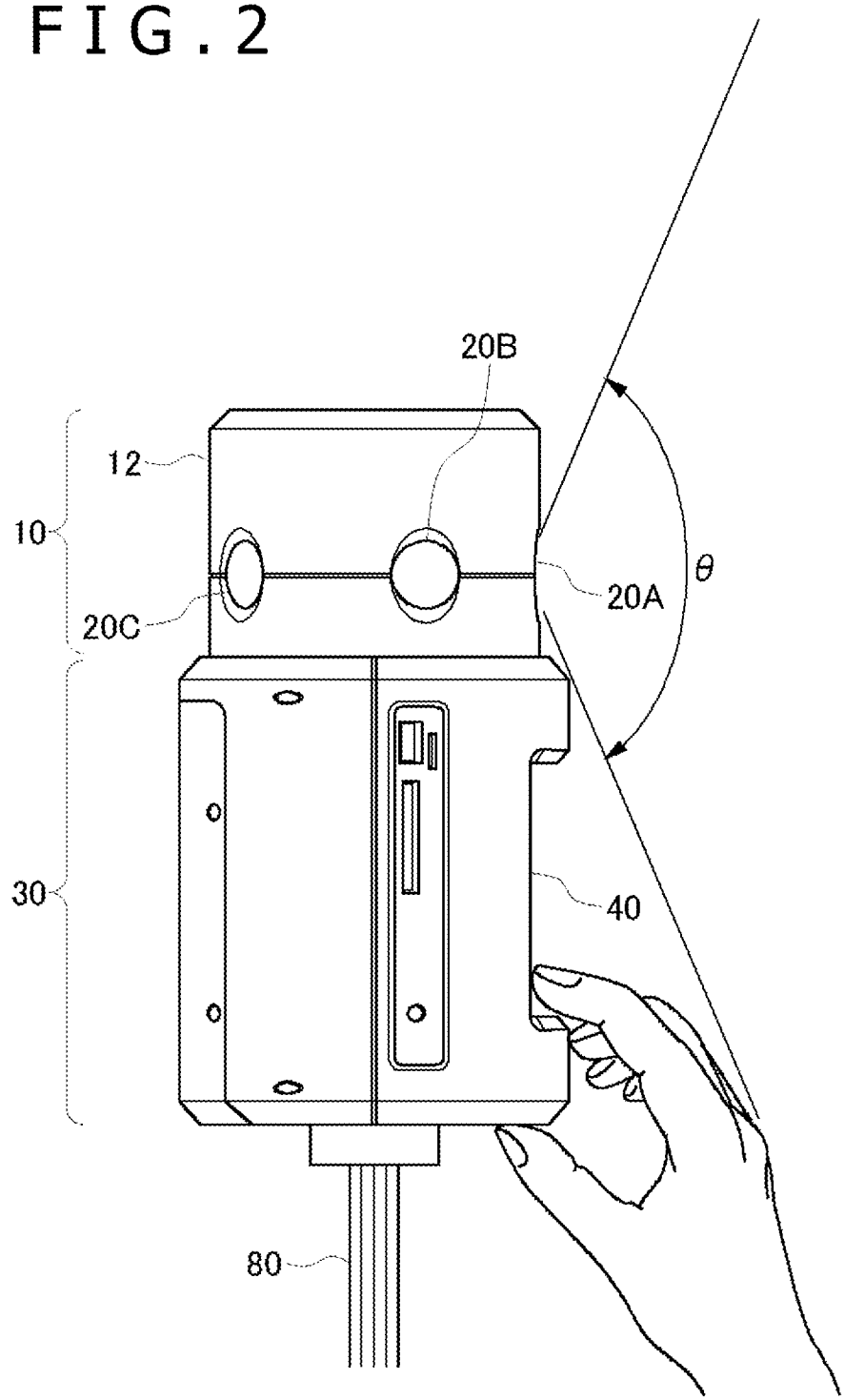
FIG. 2 is a diagram describing the view angle of a side face imaging unit of a multiview imaging part and the installation position of an operation/display unit of the panoramic imaging device shown in FIG. 1.

FIG. 2 is a diagram describing the view angle of the side face imaging unit 20A of the multiview imaging part 10 and the installation position of the operation/display unit 40 of the panoramic imaging device 100. The main body part 30 of the panoramic imaging device 100 is attached to a tripod 80.

The spread of the field of view shot by the side face imaging unit 20A is indicated by a view angle θ of the side face imaging unit 20A as illustrated in FIG. 2. A photographer sits in front of the tripod 80 and extends his or her hand from under the side face imaging unit 20A, thus operating the operation menu that appears on the operation/display unit 40. The operation/display unit 40 is provided in the recessed area of the cylindrical main body part 30. Therefore, even when operating the on-screen operation menu by touching the touch panel, the photographer can touch the touch panel outside the field of view of the side face imaging unit 20A. This prevents the photographer's fingers from unintentionally appearing in an image.

Further, because the operation/display unit 40 is provided in the recessed area of the cylindrical main body part 30, it is possible to prevent illumination light emitted from the operation/display unit 40 from appearing in any of the imaging units 20A to 20F. To reduce, to a given level or less, the impact of illumination light from the operation/display unit 40 appearing in the images, the depth of the recess in which the operation/display unit 40 is provided and the inclination of the operation/display unit 40 in the recessed area are designed.

Figure 3:
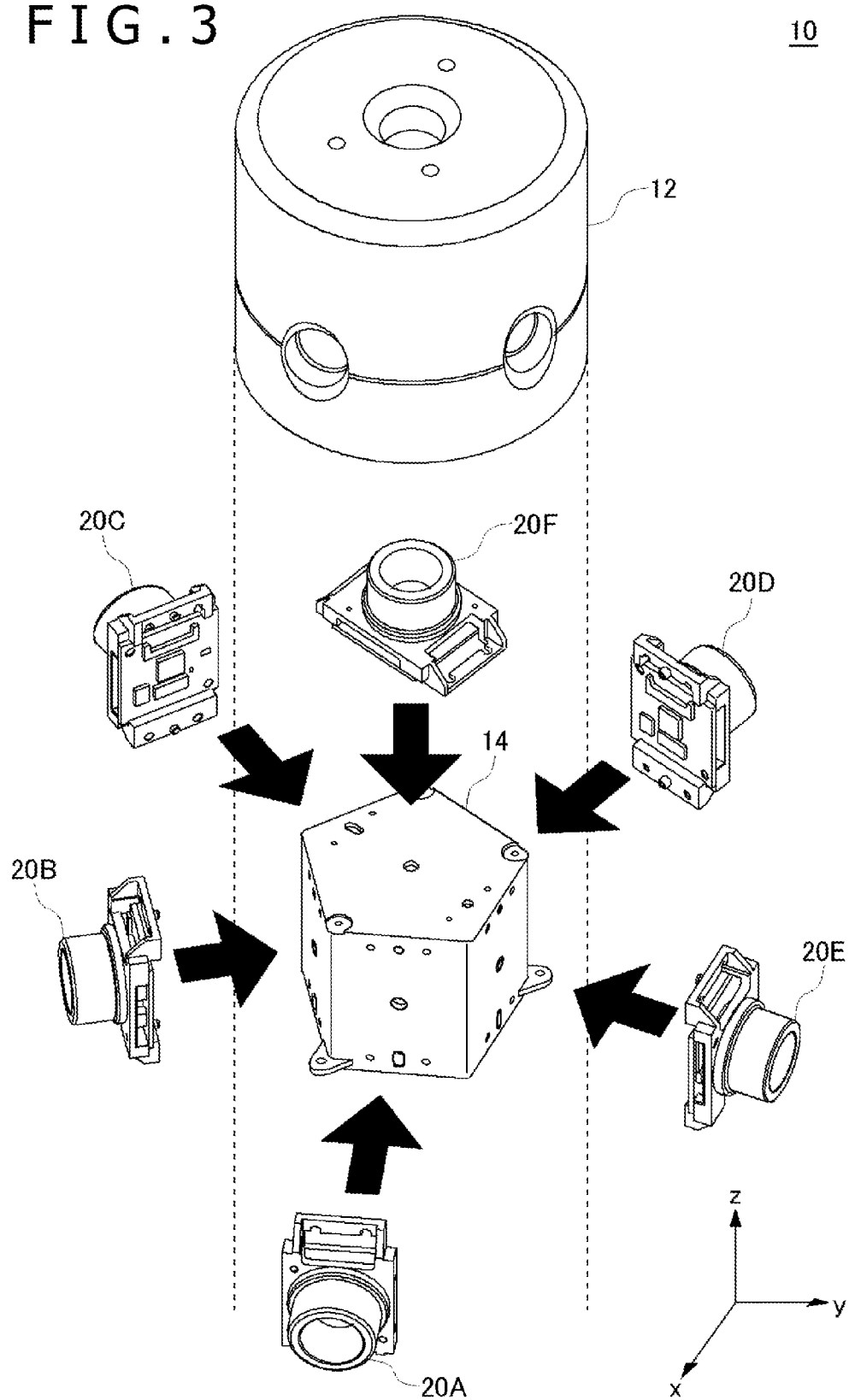
FIG. 3 is a diagram describing the internal structure of the multiview imaging part shown in FIG. 1.

FIG. 3 is a diagram describing the internal structure of the multiview imaging part 10. The plurality of imaging units 20A to 20F are fastened to a fastening member 14 inside the camera enclosure 12 of the multiview imaging part 10. If the plurality of imaging units 20A to 20F were fastened to different fastening members, a positional displacement would vary from one imaging unit to another of the plurality of imaging units 20A to 20F due to deformation of the fastening members caused, for example, by thermal expansion. If the plurality of imaging units 20A to 20F are fastened to the single fastening member 14 as in the present embodiment, the impact exerted on the imaging units 20A to 20F by the characteristic change of the fastening member 14 due, for example, to thermal expansion is constant, thus contributing to improved positional accuracy between the plurality of imaging units 20A to 20F.

In the present embodiment, the fastening member 14 is in the shape of a regular pentagonal prism, with each of the five side face imaging units 20A, 20B, 20C, 20D, and 20E provided on one of the side faces of the pentagonal prism, and the zenith imaging unit 20F provided on the zenith face of the pentagonal prism. Although in the shape of a pentagonal prism in the present embodiment, the fastening member 14 may be in the shape of other polygonal prism, with one imaging unit provided on each of the side faces of the polygonal prism.

In general, subjects are located in 360 horizontal degrees in a panoramic image, which are often the sky above the head and the ground under the feet. For this reason, if the imaging units are provided on the outer circumferential faces of a polygonal prism as in the present embodiment, and if one imaging unit is provided on the top face of the polygonal prism, it is possible to shoot a plurality of images by changing the direction of line of sight equiangularly in the horizontal direction of the photographer. Further, the plurality of imaging units are arranged equidistantly. This makes it easy to conduct image synthesis which is required to generate a panoramic image by stitching together image data obtained from the imaging units. Still further, unlike a conventional multiview camera which has an imaging unit on each of the faces of a regular dodecahedron (12 imaging units in total), the present embodiment is advantageous over the conventional multiview camera in that as many images as necessary for synthesizing a panoramic image can be captured using fewer imaging units.

FIGS. 4(a) to 4(c) are diagrams describing the positional relationship between the six imaging units 20A to 20F mounted to the fastening member 14 shown in FIG. 3. FIG. 4(a) is a top view as seen from the direction of the central axis of the fastening member 14 (from the z axis direction shown in FIG. 3). FIG. 4(b) is a side view as seen from the direction vertical to one of the side faces of the prism of the fastening member 14 to which the imaging unit 20A is attached (from the x axis direction shown in FIG. 3). FIG. 4(c) is a side view as seen from the y axis direction shown in FIG. 3 which is vertical to the x and z axis directions shown in FIG. 3.

As illustrated in the top view of FIG. 4(a), the five side face imaging units 20A to 20E are arranged around the fastening member 14 in the shape of a pentagonal prism in such a manner as to form a circle whose radius is L with an equal circumferential angle (72 degrees) on the horizontal plane. The shooting direction of each of the side face imaging units 20A to 20E is the radial direction of the circle. As illustrated in the side views of FIGS. 4(b) and 4(c), the zenith imaging unit 20F provided on the zenith face of the fastening member 14 and the side face imaging unit 20B provided on the side face of the fastening member 14 are arranged in such a manner as to form a circle whose radius is L with a circumferential angle of 90 degrees on the vertical plane. The zenith imaging unit 20F and each of the side face imaging units 20A, 20C, 20D, and 20E provided on one of the other side faces of the fastening member 14 are similarly arranged in such a manner as to form a circle whose radius is L with a circumferential angle of 90 degrees.

In other words, the six imaging units 20A to 20F are arranged in such a manner as to form a sphere whose radius is L.

Figure 5:
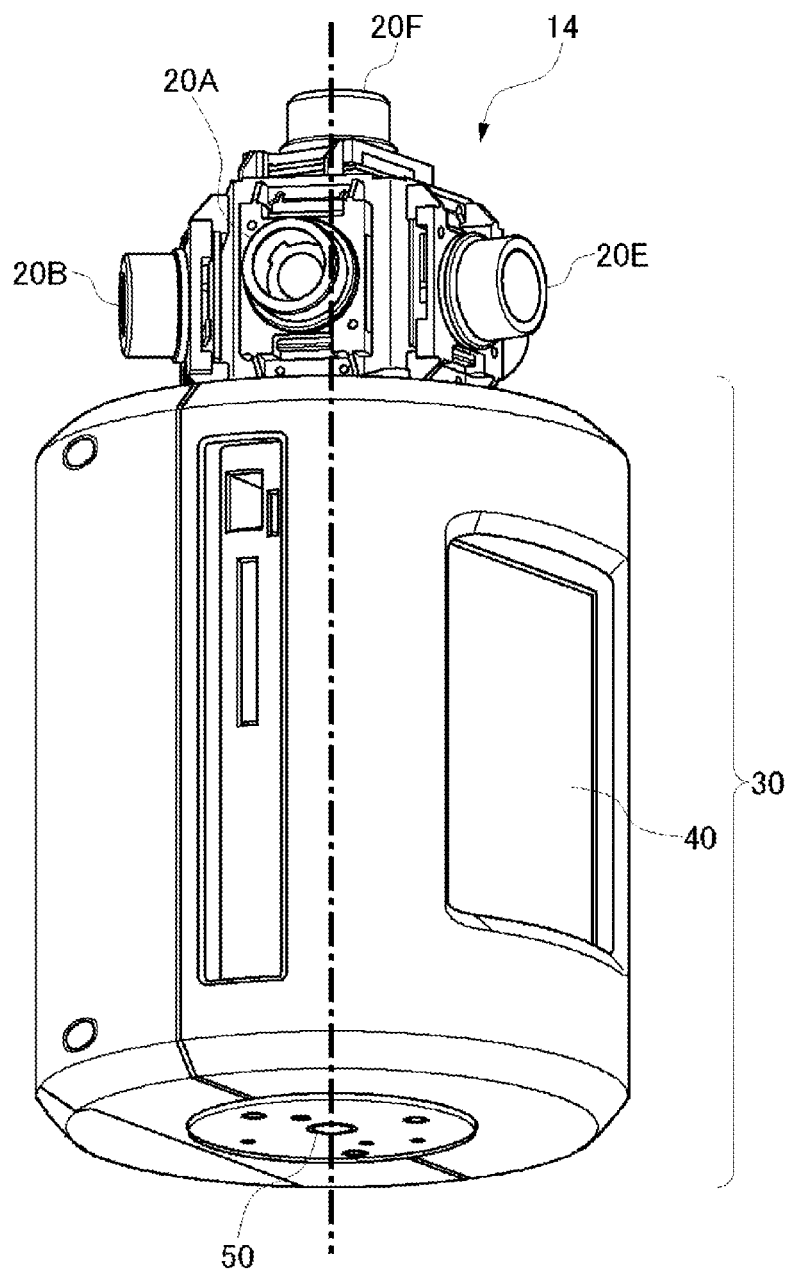
FIG. 5 is a diagram illustrating the central axes of the fastening member, to which the six imaging units are fastened, and a main body part.

FIG. 5 is a diagram illustrating the central axes of the fastening member 14, to which the six imaging units 20A to 20F are fastened, and the main body part 30. As illustrated in FIG. 5, the multiview imaging part 10 is connected to the main body part 30 in such a manner that the central axes of the fastening member 14 and the main body part 30 are aligned with each other. Further, a tripod seat fastening hole 50 of the main body part 30 is provided in the central axis of the main body part 30. As a result, the position of the tripod connected to the tripod seat fastening hole 50 is aligned with the central axis of the fastening member 14. This makes it easy to adjust the shooting position and the direction of line of sight even when the main body part 30 installed to the tripod is tilted or rotated.

FIGS. 6(a) and 6(b) are diagrams describing a configuration in which the multiview imaging part 10 and the main body part 30 are detachable from each other. As illustrated in FIG. 6(a), the multiview imaging part 10 and the main body part 30 may be detached from each other so that image data is converted in accordance with the interface standard such as USB (Universal Serial Bus) used for connection with a peripheral device, and so that the multiview imaging part 10 is connected to the main body part 30 that is located physically remotely using, for example, an extendable cable. Alternatively, the multiview imaging part 10 and the main body part 30 may be connected together via a detachable relay cable adapted to extend the camera's signal line. Still alternatively, the multiview imaging part 10 and the main body part 30 may each have a wireless communication function and be wirelessly connected together. This allows for panoramic shooting even in a confined area into which the main body part 30 cannot be carried by carrying only the multiview imaging part 10 into that area. For example, the inside of a hole can be panoramically shot by inserting the multiview imaging part 10 into that hole.

On the other hand, the main body part 30 may be a mobile terminal such as tablet PC or mobile phone so that the multiview imaging part 10 and the main body part 30 are detached from each other for exchange of data through wireless communication. This allows the photographer to carry the main body part 30 and operate the multiview imaging part 10 from a remote location, making it even easier to prevent the photographer from accidentally appearing in an image.

FIG. 6(b) illustrates a configuration in which a tripod seat fastening hole 52 is provided on the bottom face of the multiview imaging part 10. This configuration allows a tripod to be directly connected to the multiview imaging part 10. If the multiview imaging part 10 has a wireless communication function, data captured by the multiview imaging part 10 can be transmitted to the main body part 30 or other mobile terminal.

Figure 7:
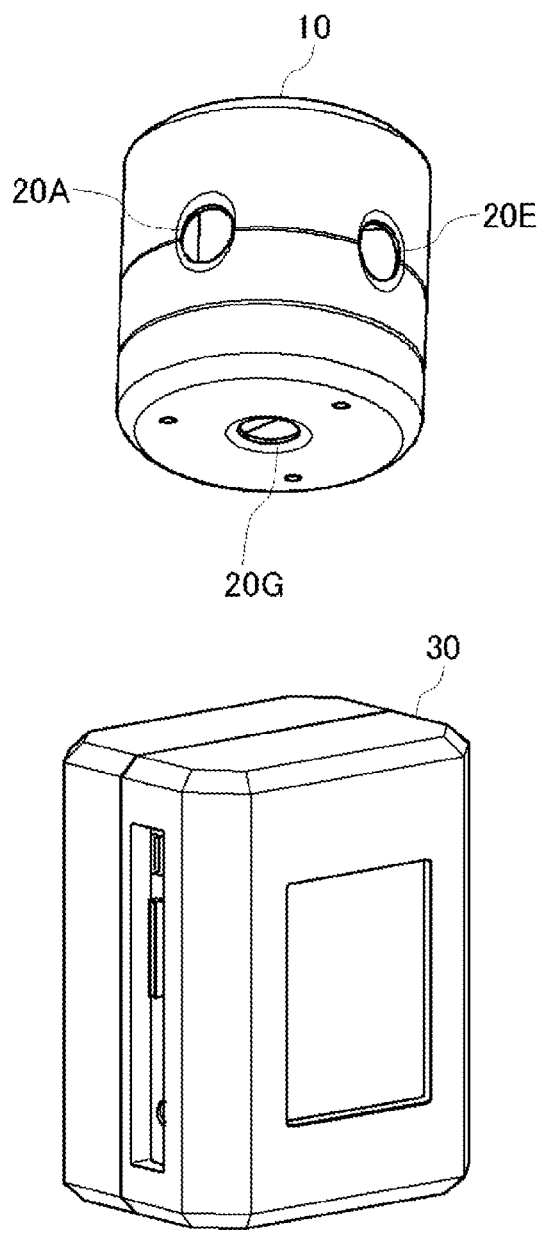
FIG. 7 is a diagram illustrating a configuration in which an imaging unit is provided also on the bottom face of the multiview imaging part.

FIG. 7 is a diagram illustrating a configuration in which an imaging unit 20G is provided also on the bottom face of the multiview imaging part 10. The provision of the imaging unit 20G on the bottom face in addition to the imaging unit 20F provided on the top face as described above allows for omnidirectional shooting. In this case, a tripod cannot be connected to the bottom face. Therefore, shooting is conducted, for example, by suspending the multiview imaging part 10 from the ceiling with a wire. Alternatively, omnidirectional shooting may be conducted by throwing the multiview imaging part 10 in the air. If the multiview imaging part 10 has a wireless communication function, data captured by the multiview imaging part 10 can be transmitted to the main body part 30 or other mobile terminal.

FIGS. 8(a) to 8(d) are diagrams describing the relationship between the view angle of the imaging unit 20A provided on one of the side faces of the fastening member 14 and the view angle of the imaging unit 20F provided on the zenith face of the fastening member 14.

Figure 8:
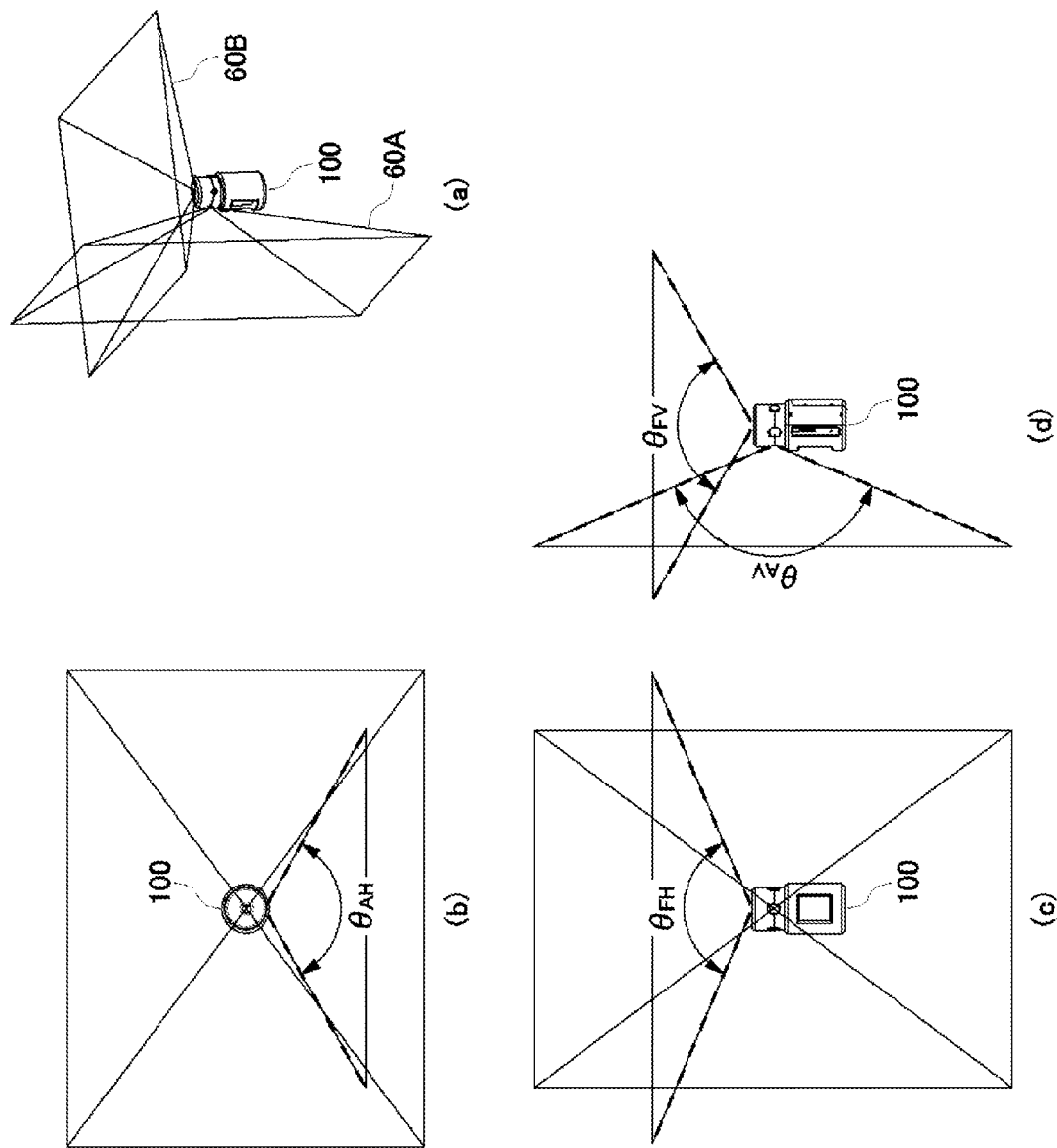
FIGS. 8(a) to 8(d) are diagrams describing the relationship between the view angle of the imaging unit provided on one of the side faces of the fastening member and the view angle of the imaging unit provided on the zenith face of the fastening member.

FIG. 8(a) illustrates the relationship between a field of view 60A of the side face imaging unit 20A provided on one of the side faces of the fastening member 14 and a field of view 60B of the zenith imaging unit 20F provided on the zenith face of the fastening member 14. FIG. 8(b) is a top view of the multiview imaging part 10 of the panoramic imaging device 100 as seen from above (view as seen from the z axis direction in FIG. 3), illustrating a horizontal view angle $\theta_{AH}$ of the field of view 60A of the side face imaging unit 20A provided on one of the side faces of the fastening member 14. FIGS. 8(c) and 8(d) are side views of the panoramic imaging device 100 as seen from side (views as seen from the x and y axis directions in FIG. 3). FIG. 8(c) illustrates a horizontal view angle $\theta_{FH}$ of the zenith imaging unit 20F provided on the zenith face of the fastening member 14. FIG. 8(d) illustrates a vertical view angle $\theta_{AV}$ of the side face imaging unit 20A provided on one of the side faces of the fastening member 14 and a vertical view angle $\theta_{FV}$ of the zenith imaging unit 20F provided on the zenith face of the fastening member 14.

As an example, the horizontal view angle $\theta_{AH}$ of the side face imaging unit 20A is $\theta_{AH}$=121 degrees. This permits panoramic shooting in 360 horizontal degrees thanks to the five side face imaging units 20A to 20E provided on the side faces of the fastening member 14. On the other hand, the vertical view angle $\theta_{AV}$ of the side face imaging unit 20A is $\theta_{AV}$=134 degrees. With this and the horizontal view angle $\theta_{FH}$ (=134 degrees) or vertical view angle $\theta_{FV}$ (=121 degrees) of the zenith imaging unit 20F combined, panoramic shooting is possible in 180 vertical degrees.

It should be noted that the relationship between the vertical view angle $\theta_{AV}$ and the horizontal view angle $\theta_{AH}$ of the side face imaging unit 20A is $\theta_{AV} > \theta_{AH}$ in this example. The horizontal view angle of an ordinary lens is larger than the vertical view angle thereof. It should be kept in mind here that the imaging units 20A to 20E are provided on the side faces of the fastening member 14 in a manner rotated 90 degrees relative to the normal orientation in order to increase the view angles of the side face imaging units 20A to 20E in the vertical direction.

Figure 9:
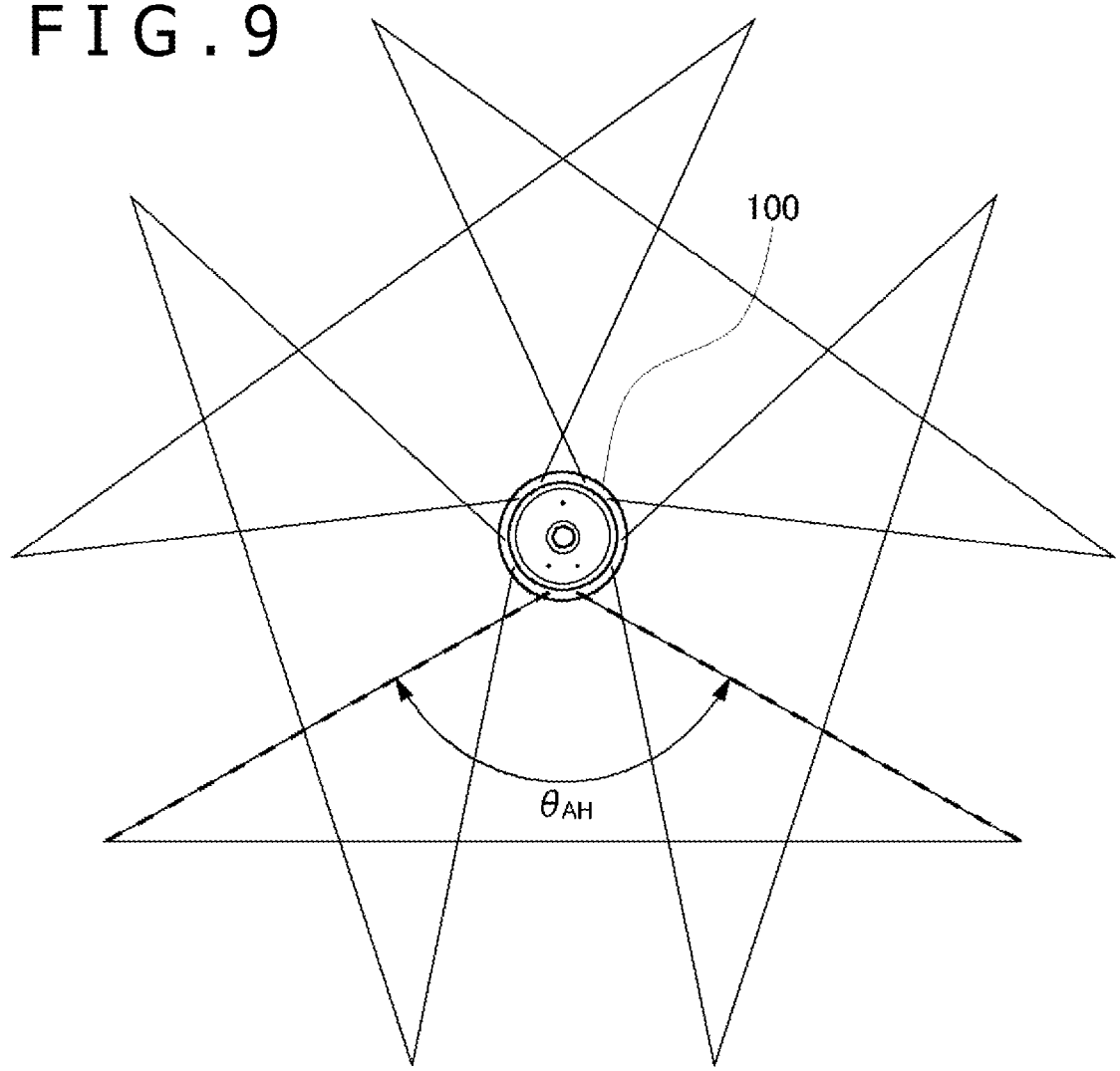
FIG. 9 is a diagram illustrating, in a top view of the multiview imaging part of the panoramic imaging device as seen from above, the overlaps between the fields of view of the five side face imaging units provided on the side faces of the fastening member.

FIG. 9 is a diagram illustrating, in a top view of the multiview imaging part 10 of the panoramic imaging device 100 as seen from above, the overlaps between the fields of view of the five side face imaging units 20A to 20E provided on the side faces of the fastening member 14. The horizontal view angle of each of the side face imaging units 20A to 20E is, for example, 121 degrees. Combining the images shot by the five side face imaging units 20A to 20E permits panoramic shooting in 360 horizontal degrees.

FIGS. 10(a) and 10(b) are diagrams describing the operation screen displayed on the operation/display unit 40. Images shot by the six imaging units 20A to 20F of the panoramic imaging device 100 shown in FIG. 10(a) are displayed respectively in areas A to F of the operation screen shown in FIG. 10(b).

Selecting any of the areas A to F shown in FIG. 10(b) on the touch panel allows one of the imaging units 20A to 20F to be selected as a reference camera. Here, the area B is selected. As a result, the area B is highlighted, for example, by displaying the frame of the area B in a different color. The area B is associated with the imaging unit 20B. The imaging unit 20B is used as a reference for setting shooting conditions such as exposure and white balance.

When the photographer presses an auto exposure (AE) lock button 74, the imaging unit 20B, the reference camera, is set to an optimal exposure value by auto exposure. This optimal exposure value is reflected in the other imaging units 20A, 20C, 20D, 20E, and 20F. The AE lock button 74 is a toggle button. When the photographer presses the AE lock button 74 again, AE is unlocked, thus allowing automatic adjustment of the exposure of each of the imaging units 20A to 20F individually.

When the photographer presses an auto white balance (AWB) lock button 76 next, the white balance of the imaging unit 20B, the reference camera, is adjusted by auto white balance. The correction value thereof is reflected in the other imaging units 20A, 20C, 20D, 20E, and 20F. The AWB lock button 76 is also a toggle button. When the photographer presses the AWB lock button 76 again, AWB is unlocked, thus allowing automatic adjustment of white balance of each of the imaging units 20A to 20F individually.

When an extension control button 78 is pressed, various setup menus appear, thus allowing further setting of shooting parameters.

When the photographer presses a movie recording start/stop button 70, movies are shot by the imaging units 20A to 20F. When the photographer presses the movie recording start/stop button 70 again, the shooting of movies stops. When the photographer presses a still image shooting button 72, still images are shot by the imaging units 20A to 20F. The recorded movies or still images are stored, for example, in a USB memory connected to the external interface of the main circuit of the main body part 30.

Figure 11:
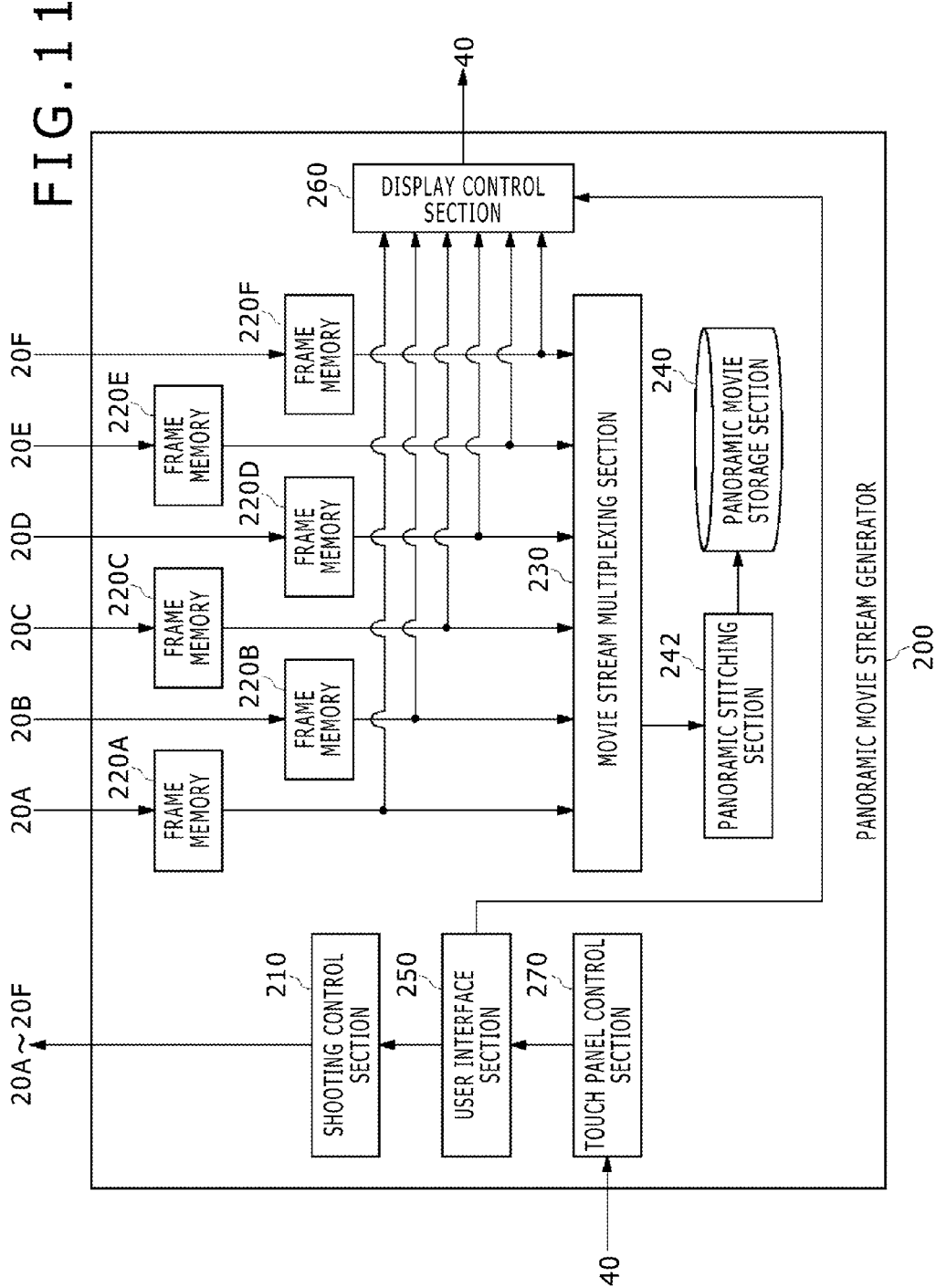
FIG. 11 is a functional configuration diagram of a panoramic movie stream generator implemented in a main circuit of the main body part.

FIG. 11 is a functional configuration diagram of a panoramic movie stream generator 200 implemented in the main circuit of the main body part 30.

A shooting control section 210 sets shooting parameters such as exposure value, white balance value, and frame rate collectively in all the imaging units 20A to 20F of the multiview imaging part 10 or individually in each of these units. Further, the shooting control section 210 controls the zooming of the imaging units 20A to 20F and the start and stop of shooting.

Movie frames shot by the imaging units 20A to 20F are stored respectively in frame memories 220A to 220F.

A movie stream multiplexing section 230 multiplexes the movie frames stored in the frame memories 220A to 220F and shot by the imaging units 20A to 20F, generating a multiview movie stream and supplying the movie stream to a panoramic stitching section 242. The panoramic stitching section 242 stitches together the movie frames shot by the imaging units 20A to 20F through a stitching process, synthesizing a panoramic movie and generating a panoramic movie stream. If power consumption is limited, the panoramic stitching section 242 can output a multiview movie stream as-is without performing a stitching process. Alternatively, the panoramic stitching section 242 can output both a multiview movie stream and a panoramic movie stream as necessary. The panoramic stitching section 242 records at least either a multiview movie stream or a panoramic movie stream to a panoramic movie storage section 240.

A display control section 260 reads the movie frames shot by the imaging units 20A to 20F from the frame memories 220A to 220F, displaying the movie frames on the screen of the operation/display unit 40.

A user interface section 250 supplies operation menu information of the imaging units 20A to 20F to the display control section 260, allowing the display control section 260 to display the operation menu on the screen of the operation/display unit 40.

A touch panel control section 270 detects a touch operation on the touch panel by a user's finger, supplying the touched position and other information to the user interface section 250. The user interface section 250 identifies the nature of operation selected by the user on the operation menu from the touched position information supplied from the touch panel control section 270, transmitting an operation command to the shooting control section 210. The shooting control section 210 controls the imaging units 20A to 20F based on the operation command supplied from the user interface section 250.

[Movie Stream Switching and Recording Control]

A description will be given next of movie stream switching and recording control handled by the panoramic movie stream generator 200 of the panoramic imaging device 100.

Figure 12:
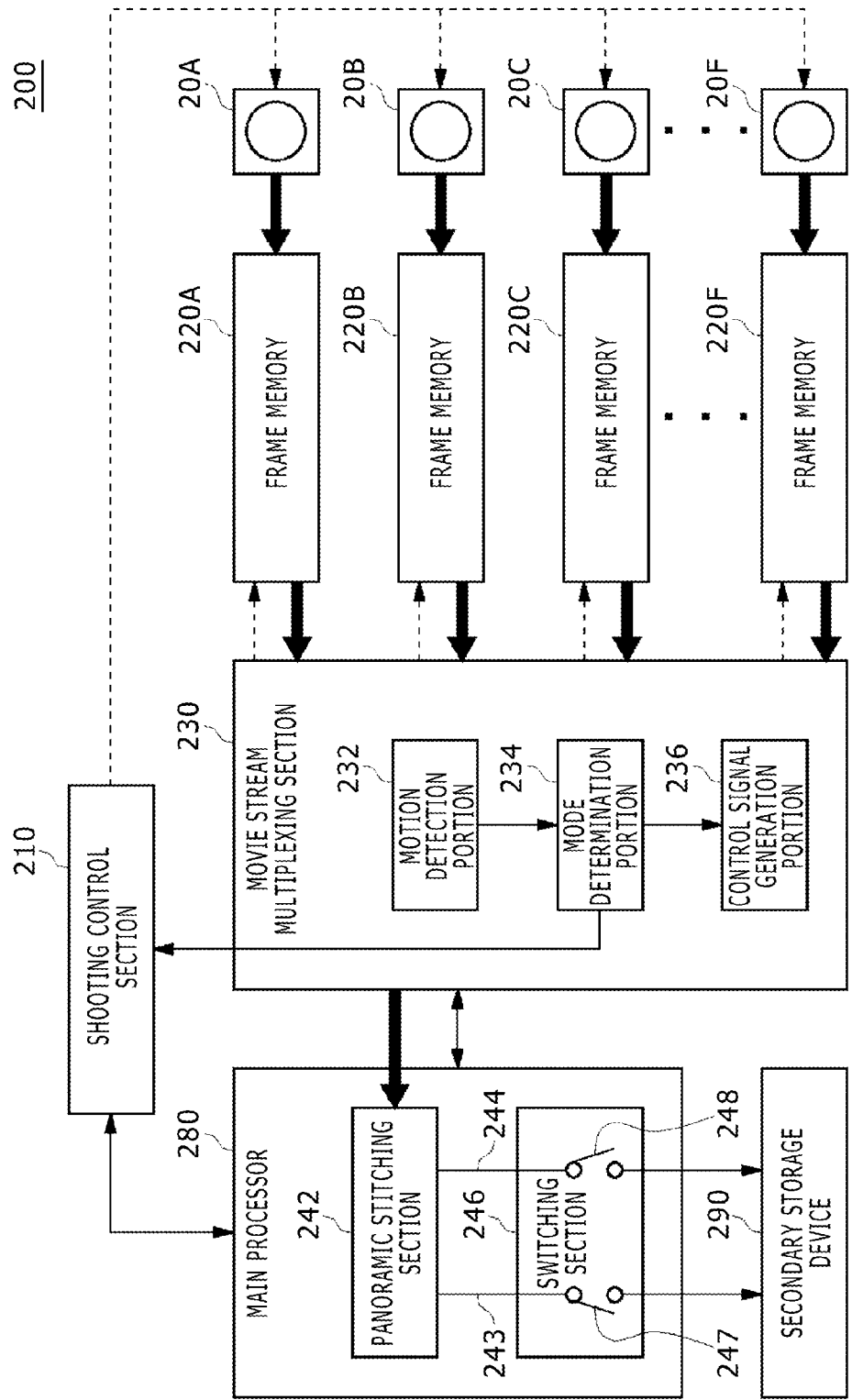
FIG. 12 illustrates a configuration relating to movie stream switching and recording control handled by the panoramic movie stream generator.

FIG. 12 illustrates a configuration relating to movie stream switching and recording control handled by the panoramic movie stream generator 200. A description will be given here of different configurations and operations of the shooting control section 210 and the movie stream multiplexing section 230 shown in FIG. 11. The panoramic movie storage section 240, the display control section 260, the user interface section 250, and the touch panel control section 270, i.e., the components shown in FIG. 11, are omitted in FIG. 12.

In FIG. 12, dashed lines represent control signal lines, and bold lines represent image data transfer channels. As already described in FIG. 11, movie frames shot by the imaging units 20A to 20F are stored respectively in the frame memories 220A to 220F. The movie stream multiplexing section 230 reads the movie frames stored in the frame memories 220A to 220F and shot by the imaging units 20A to 20F, multiplexing the movie frames and generating a multiview movie stream.

The movie stream multiplexing section 230 has functions of a motion detection portion 232, a mode determination portion 234, and a control signal generation portion 236 in addition to the function of multiplexing movie frames shot by the imaging units 20A to 20F.

The motion detection portion 232 detects motion vectors of movie frames A to F shot by the imaging units 20A to 20F, finding the sum of the magnitudes of the motion vectors of the movie frames A to F. Alternatively, the motion detection portion 232 may detect motion vector or vectors of the movie frames shot by the specific one or more imaging units of interest so as to find the sum of the magnitudes of the motion vectors of the one or more movie frames of interest.

If the sum of the magnitudes of the motion vectors calculated by the motion detection portion 232 is smaller than a given threshold, the mode determination portion 234 sets the imaging units 20A to 20F to "imaging unit intermittent operation mode." In this mode, the imaging units 20A to 20F are operated one after another in an intermittent manner at intervals of a frame, thus switching to one of the imaging units 20A to 20F every frame. Then, the captured image, output from the switched imaging unit, is read from the associated frame memory, after which the captured images are multiplexed into a movie stream.

If the sum of the magnitudes of the motion vectors calculated by the motion detection portion 232 is equal to or greater than the given threshold, the mode determination portion 234 sets the imaging units 20A to 20F to "imaging unit simultaneous operation mode." In this mode, all the imaging units 20A to 20F are operated simultaneously.

Then, the captured images, output from the imaging units 20A to 20F, are read from the frame memories 220A to 220F, after which the captured images are multiplexed into a movie stream.

The mode determination portion 234 supplies, to the shooting control section 210 and the control signal generation portion 236, information about the operation mode of the imaging units that has been set.

The shooting control section 210 supplies, to the imaging units 20A to 20F, a control signal appropriate to the operation mode set by the mode determination portion 234.

In "imaging unit intermittent operation mode," the shooting control section 210 supplies, to the imaging units 20A to 20F, a control signal adapted to operate the imaging units 20A to 20F one after another in an intermittent manner at intervals of a frame. This eliminates the need to supply power to the inactive imaging units, thus contributing to reduced power consumption.

In "imaging unit simultaneous operation mode," the shooting control section 210 supplies, to the imaging units 20A to 20F, a control signal adapted to operate all the imaging units 20A to 20F simultaneously. In this case, all the imaging units 20A to 20F are active, thus resulting in more power consumption. However, the synthesized panoramic image does not suffer degradation even when the subject moves vigorously or during a scene change.

The control signal generation portion 236 supplies, to the frame memories 220A to 220F, a control signal appropriate to the operation mode set by the mode determination portion 234. In "imaging unit intermittent operation mode," the control signal generation portion 236 supplies, to the frame memories 220A to 220F, a control signal adapted to switch to one of the frame memories 220A to 220F every frame, enable reading from the switched frame memory and disable reading from all other frame memories. In "imaging unit simultaneous operation mode," the control signal generation portion 236 supplies, to the frame memories 220A to 220F, a control signal adapted to enable reading from all the frame memories 220A to 220F.

Here, even in "imaging unit simultaneous operation mode," if the bandwidth of the interface adapted to transfer image data is greater than (number of imaging units)×(data amount per frame)×(frame rate), no problem will arise when the reading from all the frame memories 220A to 220F is enabled and image data is read simultaneously from the frame memories 220A to 220F. However, if the data amount of only one of the imaging units is permitted, image data may be temporarily recorded to the frame memories 220A to 220F, after which the frame memories 220A to 220F are switched from one to another to sequentially transmit image data.

Further, if intermittently operating the imaging units 20A to 20F poses a problem because the imaging units 20A to 20F are slow to start up, the imaging units 20A to 20F may be operated continuously while activating the frame memories 220A to 220F one after another in an intermittent manner at intervals of a frame, thus switching to one of the frame memories 220A to 220F every frame, reading the captured image from the switched frame memory, and multiplexing the images into a movie stream. This also contributes to reduced power supplied to the frame memories.

Further, the mode determination portion 234 may switch between "imaging unit intermittent operation mode" and "imaging unit simultaneous operation mode" in accordance with not only the amount of motion of the captured image but also the remaining battery charge or permissible power consumption of the panoramic imaging device 100. For example, in order to operate the panoramic imaging device 100 for extended hours, it is necessary to keep the power consumption per unit time to a minimum. Therefore, the operation mode is switched to "imaging unit intermittent operation mode." On the other hand, if the remaining battery charge is sufficient, the panoramic imaging device 100 may be operated in "imaging unit simultaneous operation mode" which is switched to "imaging unit intermittent operation mode" when the remaining battery charge goes low. Alternatively, if the panoramic imaging device 100 runs on a built-in chargeable battery, "imaging unit intermittent operation mode" may be selected. On the other hand, if the panoramic imaging device 100 runs on external power supplied from an AC adaptor, "imaging unit simultaneous operation mode" may be selected.

The movie stream multiplexing section 230 multiplexes image frames, output from the frame memories 220A to 220F in either of the operation modes, thus generating a multiview movie stream and supplying the movie stream to a main processor 280.

The main processor 280 performs a stitching process on the multiview movie stream, thus generating a panoramic movie stream and recording the movie stream to a secondary storage device 290 such as flash memory. The functions of the panoramic stitching section 242 and a switching section 246 are implemented by software in the main processor 280 to perform the panoramic stitching process. These functions may be implemented by hardware.

The panoramic stitching section 242 stitches together image frames included in the multiview movie stream supplied from the movie stream multiplexing section 230 and shot by the imaging units 20A to 20F, thus synthesizing a panoramic image, generating a panoramic movie stream having chronological data of the panoramic image frame, and outputting the movie stream. If power consumption is limited in accordance with the remaining battery charge or the permissible power consumption, the panoramic stitching section 242 outputs the multiview movie stream as-is without synthesizing any panoramic image.

The switching section 246 switches between the panoramic movie stream and multiview movie stream output from the panoramic stitching section 242 in accordance with the power consumption limit, recording the movie stream to the secondary storage device 290. For example, the following three steps of control are possible in accordance with the magnitude of available power.

(a) If the available power is small, the panoramic stitching section 242 outputs a multiview movie stream without generating any panoramic movie stream. In this case, the switching section 246 turns OFF a switch 247 of a data transfer channel 243 of the panoramic movie stream and turns ON a switch 248 of a data transfer channel 244 of the multiview movie stream, recording the multiview movie stream to the secondary storage device 290. This keeps power consumption to a minimum because no panoramic stitching process is performed.

(b) If the available power is moderate, the panoramic stitching section 242 generates and outputs a panoramic movie stream, but does not output any multiview movie stream. In this case, the switching section 246 turns ON the switch 247 of the data transfer channel 243 of the panoramic movie stream and turns OFF the switch 248 of the data transfer channel 244 of the multiview movie stream, recording the panoramic movie stream to the secondary storage device 290. Because the panoramic stitching section 242 is active, more power is consumed than case (a). However, this option is advantageous in that a panoramic movie is generated in realtime.

(c) If the available power is large, the panoramic stitching section 242 not only generates and outputs a panoramic movie stream but also outputs a multiview movie stream. In this case, the switching section 246 turns ON the switch 247 of the data transfer channel 243 of the panoramic movie stream and turns ON the switch 248 of the data transfer channel 244 of the multiview movie stream, recording the panoramic movie stream and the multiview movie stream to the secondary storage device 290. Both a multiview movie stream and a panoramic movie stream are generated and recorded. This results in a high processing volume, more data to be recorded, and the highest power consumption. However, this option is advantageous in that it can find more applications by recording not only panoramic movie streams but also multiview movie streams in advance.

It should be noted that although the frame rates of the imaging units 20A to 20F are the same in the above description, the frame rate may be changed between the imaging units 20A to 20F if the amount of motion is different between the images captured by the imaging units 20A to 20F. In this case, the shooting control section 210 and the control signal generation portion 236 change, based on the ratio between the frame rates, the ratio at which to switch between the imaging units 20A to 20F and the frame memories 220A to 220F. That is, round robin control is performed which assigns weights based on the ratio between the frame rates.

Figure 13:
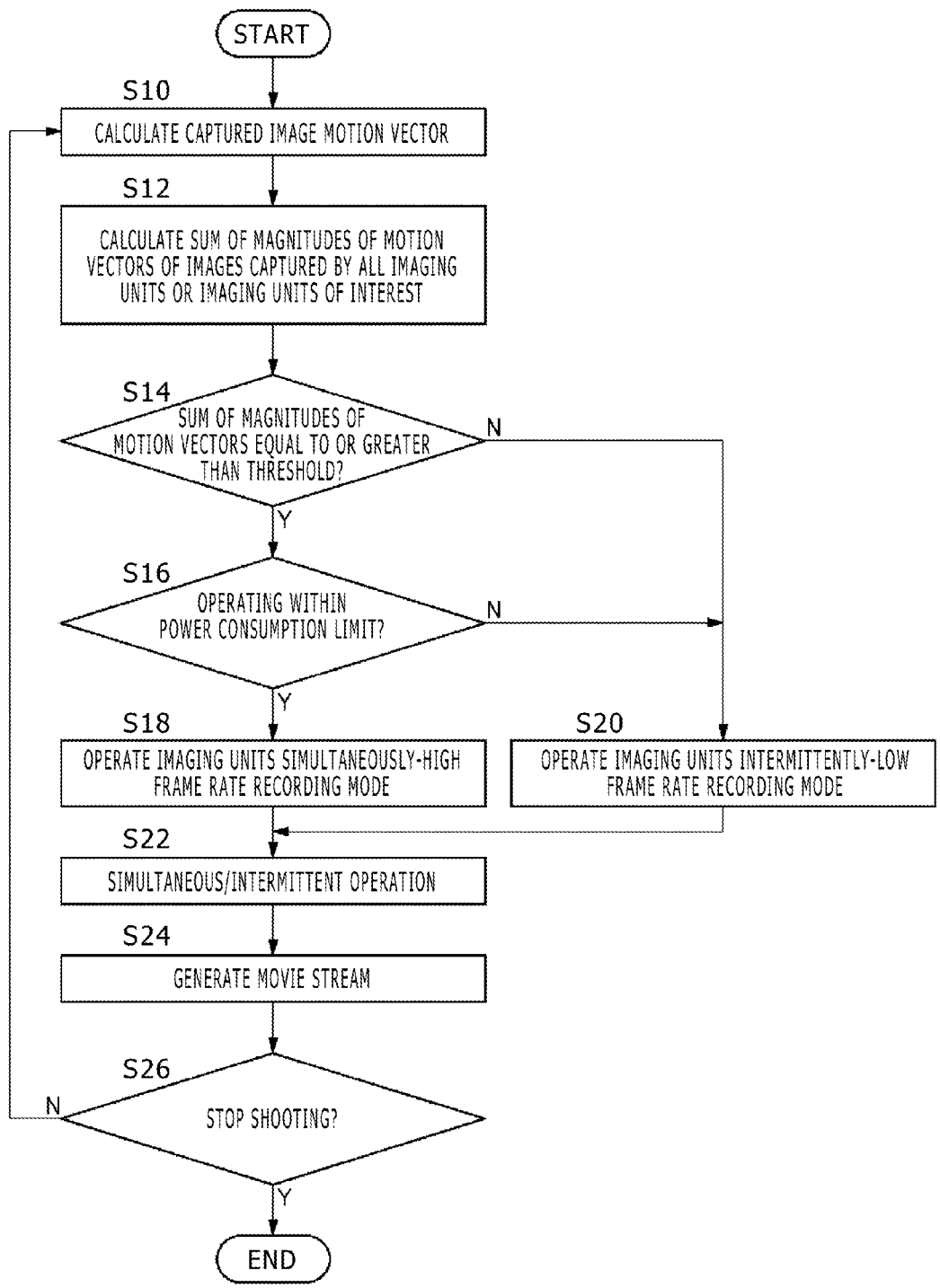
FIG. 13 is a flowchart describing the steps for movie stream switching and recording control handled by the panoramic movie stream generator.

FIG. 13 is a flowchart describing the steps for movie stream switching and recording control handled by the panoramic movie stream generator 200.

The motion detection portion 232 detects motion vectors from images captured by the imaging units 20A to 20F (S10). The motion detection portion 232 finds the sum of the magnitudes of the motion vectors of the images captured by all the imaging units 20A to 20F or one or more imaging units of interest (S12).

The mode determination portion 234 determines whether the sum of the magnitudes of the motion vectors of the captured images is equal to or greater than a threshold (S14). If the sum of the magnitudes of the motion vectors of the captured images is smaller than the threshold (N in S14), the mode determination portion 234 selects "imaging unit intermittent operation mode" (S20). In "imaging unit intermittent operation mode," "low frame rate recording mode" is selected in which a multiview movie stream or a panoramic movie stream is recorded at a low frame rate.

If the sum of the magnitudes of the motion vectors of the captured images is equal to or greater than the threshold (Y in S14), the mode determination portion 234 determines whether the panoramic imaging device 100 is operating within the power consumption limit (S16). For example, the mode determination portion 234 determines whether the panoramic imaging device 100 is operating within the power consumption limit in consideration of permissible power consumption per unit time and remaining battery charge in the case of shooting for extended periods. The mode determination portion 234 sets the panoramic imaging device 100 to "imaging unit intermittent operation mode" (S20) if the panoramic imaging device 100 is not operating within the power consumption limit (N in S16). The mode determination portion 234 sets the panoramic imaging device 100 to "imaging unit simultaneous operation mode" (S18) if the panoramic imaging device 100 is operating within the power consumption limit (Y in S16). In "imaging unit simultaneous operation mode," "high frame rate recording mode" is selected in which a multiview movie stream or a panoramic movie stream is recorded at a high frame rate.

The shooting control section 210 switches the imaging units 20A to 20F to simultaneous or intermittent operation in accordance with the mode set by the mode determination portion 234, and the control signal generation portion 236 switches the frame memories 220A to 220F to simultaneous or intermittent output in accordance with the mode set by the mode determination portion 234 (S22).

The panoramic movie stream generator 200 multiplexes frame data output from the frame memories 220A to 220F in accordance with each mode, generating a multiview movie stream or a panoramic movie stream (S24).

If the shooting is stopped by the user (Y in S26), the movie stream switching and recording control is terminated. If the shooting is not stopped by the user (N in S26), control returns to step S10 to repeat the processes from step S10 onward.

Figure 14:
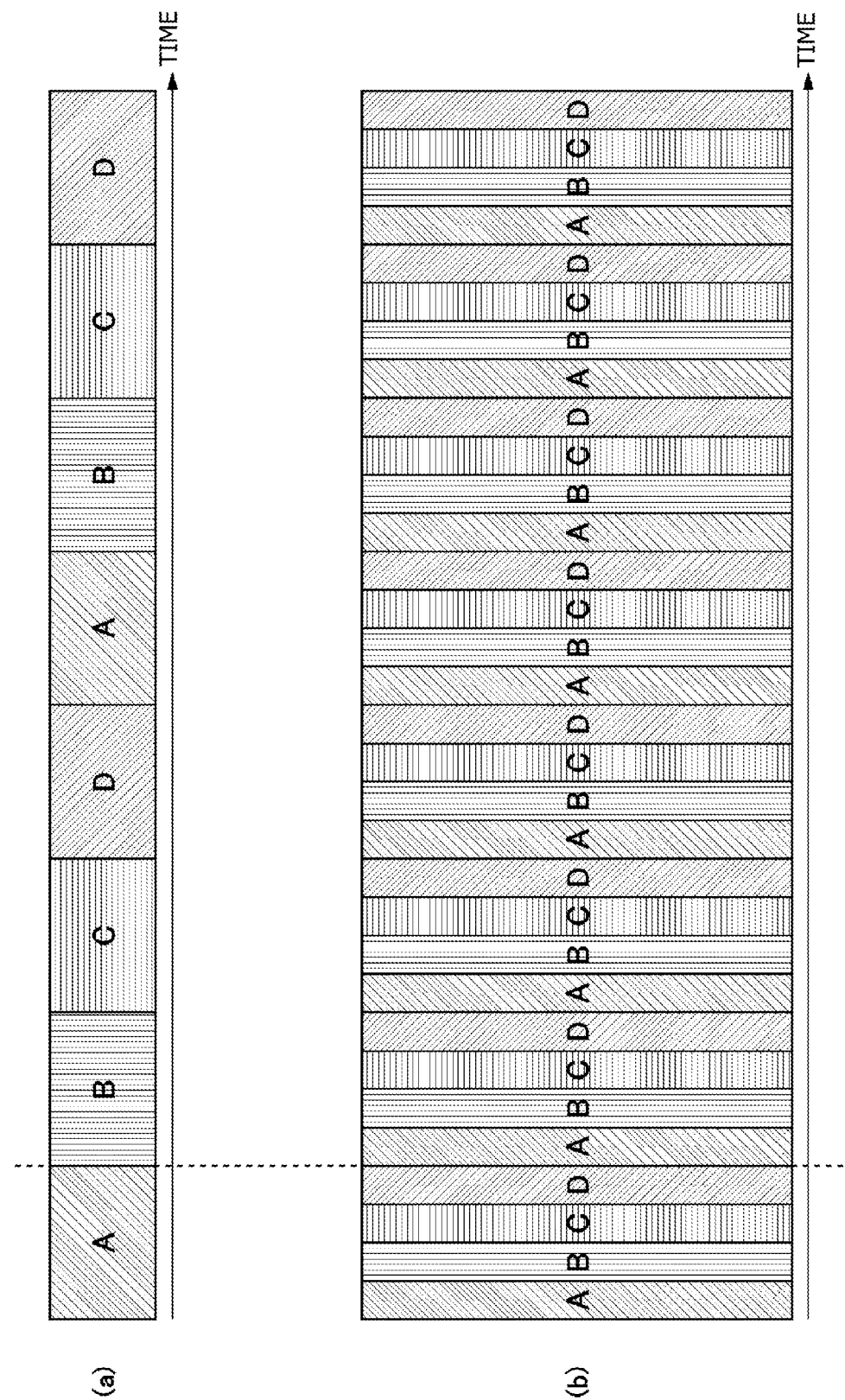
FIGS. 14(a) and 14(b) are diagrams describing the data structure of a panoramic movie stream generated by movie stream switching and recording control.

FIGS. 14(a) and 14(b) are diagrams describing the data structure of a multiview movie stream generated by movie stream switching and recording control. Assume here that there are four imaging units, and that the frame rate of each of the imaging units is 30 fps (frames per second).

FIG. 14(a) illustrates a multiview movie stream generated in "imaging unit intermittent operation mode." The imaging units 20A to 20D are operated one after another in an intermittent manner at intervals of a frame, and frames A, B, C, and D captured respectively by the imaging units 20A, 20B, 20C, and 20D are multiplexed in this order at intervals of each frame. Each of the imaging units 20A to 20D operates intermittently once every four times. As a result, the effective frame rate of each of the imaging units 20A to 20D is 30 fps/4=7.5 fps. The transfer rate of a multiview movie stream after multiplexing is equivalent to 30 fps/4×4=30 fps. That is, a low frame rate multiview movie stream is generated. The four imaging units 20A to 20D operate intermittently. In the panoramic image obtained by synthesizing the four images captured by the four imaging units 20A to 20D, therefore, the captured images adjacent to each other are those captured at different times. However, if there is not much motion, a panoramic image obtained by stitching together the images that were captured at different times does not suffer much degradation in quality.

FIG. 14(b) illustrates a multiview movie stream generated in "imaging unit simultaneous operation mode." The imaging units 20A to 20D are operated simultaneously, and the frames A, B, C, and D captured respectively by the imaging units 20A, 20B, 20C, and 20D are multiplexed at intervals of each frame. As a result, the effective frame rate of each of the imaging units 20A to 20D remains unchanged as 30 fps. The transfer rate of a multiview movie stream after multiplexing is equivalent to 30 fps×4=120 fps. That is, a high frame rate multiview movie stream is generated. The four imaging units 20A to 20D operate simultaneously. In the panoramic image obtained by synthesizing the four images captured by the four imaging units 20A to 20D, therefore, the captured images adjacent to each other are those captured at the same time. Therefore, a panoramic image obtained by stitching together the images that were captured at the same time remains intact in quality even when the subject moves vigorously.

A description will be given below of the operational advantage of movie stream switching and recording control handled by the panoramic movie stream generator 200 described above.

In general, if the subject moves slowly or slightly, the image does not suffer much degradation in quality even when the camera's frame rate is reduced. Conversely, if the subject moves vigorously, reducing the camera's frame rate (equivalent to longer shutter speed in the case of a CMOS image sensor) leads to significant degradation in quality due to motion blur. In the case of a multiview camera, simultaneously recording all camera data at the highest frame rate provides the highest image quality in any scene. However, this leads to more power consumption and clutters the storage capacity of the data storage device such as SSD (Solid State Drive) or HDD (Hard Disk Drive). For this reason, it is preferable to be able to adaptively control the camera's operating condition and recorded data in accordance with the scene.

In movie stream switching and recording control according to the present embodiment, it is possible to switch between the operation modes of the imaging units 20A to 20F and between the output modes of the frame memories 220A to 220F in accordance with the motion of the scene. If the scene moves significantly, the image suffers degradation in quality unless the effective frame rate of each imaging unit is secured. Therefore, "imaging unit simultaneous operation mode" is selected by giving higher priority to image quality than power consumption. If the scene moves slightly, reducing the effective frame rate of each of the imaging units does not lead to significant degradation in image quality. Therefore, the operation mode is switched to "imaging unit intermittent operation mode" to keep the power consumption to a minimum. As described above, switching between the operation modes in accordance with the motion of the scene keeps the power consumption to a minimum and reduces the storage capacity without sustaining a significant decline in image quality. Further, switching between the operation modes in accordance with the remaining battery charge and the permissible power consumption allows for efficient use of the panoramic imaging device 100. Still further, a low frame rate image stream is generated in "imaging unit intermittent operation mode," thus reducing the storage capacity.

[Multiview Camera Control System]

Figure 15:
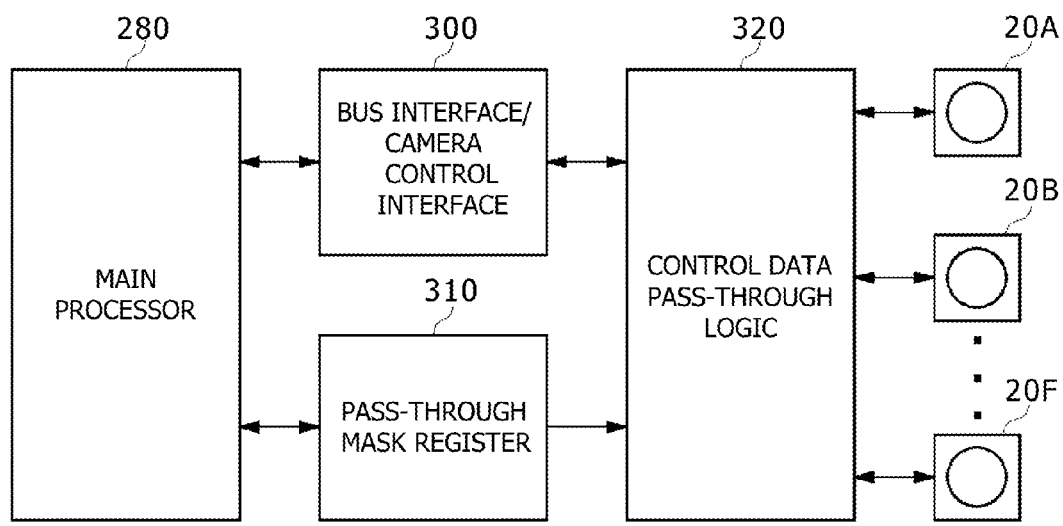
FIG. 15 is a configuration diagram of a control system adapted to selectively control a multiview camera.

FIG. 15 is a configuration diagram of a control system adapted to selectively control a multiview camera. The shooting control section 210 illustrated in FIG. 12 includes a bus interface/camera control interface 300, a pass-through mask register 310, and a control data pass-through logic 320. The shooting control section 210 collectively and selectively controls the arbitrary imaging units of the plurality of imaging units 20A to 20F in response to an instruction from the main processor 280. For example, the shooting control section 210 can collectively or selectively control auto exposure (AE), auto white balance (AWB), and exposure value (EV).

The bus interface/camera control interface 300 is a bus interface of a given standard adapted to connect the main processor 280 and the imaging units 20 and a dedicated interface adapted to control the imaging units 20A to 20F. The bus interface/camera control interface 300 supplies a control signal to the control data pass-through logic 320 in response to an instruction from the main processor 280.

The control data pass-through logic 320 is a circuit adapted to write control data to the imaging units 20A to 20F or read data from the imaging units 20A to 20F. When writing data, the control data pass-through logic 320 can transmit write data to the imaging units 20A to 20F by unicast, multicast, or broadcast. When reading data, the control data pass-through logic 320 can receive read data from the imaging units 20A to 20F by unicast.

The pass-through mask register 310 is a register adapted to control the input and output operations of the circuit of the control data pass-through logic 320. The pass-through mask register 310 is a pass-through mask register that corresponds to the number of the imaging units 20A to 20F.

Figure 16:
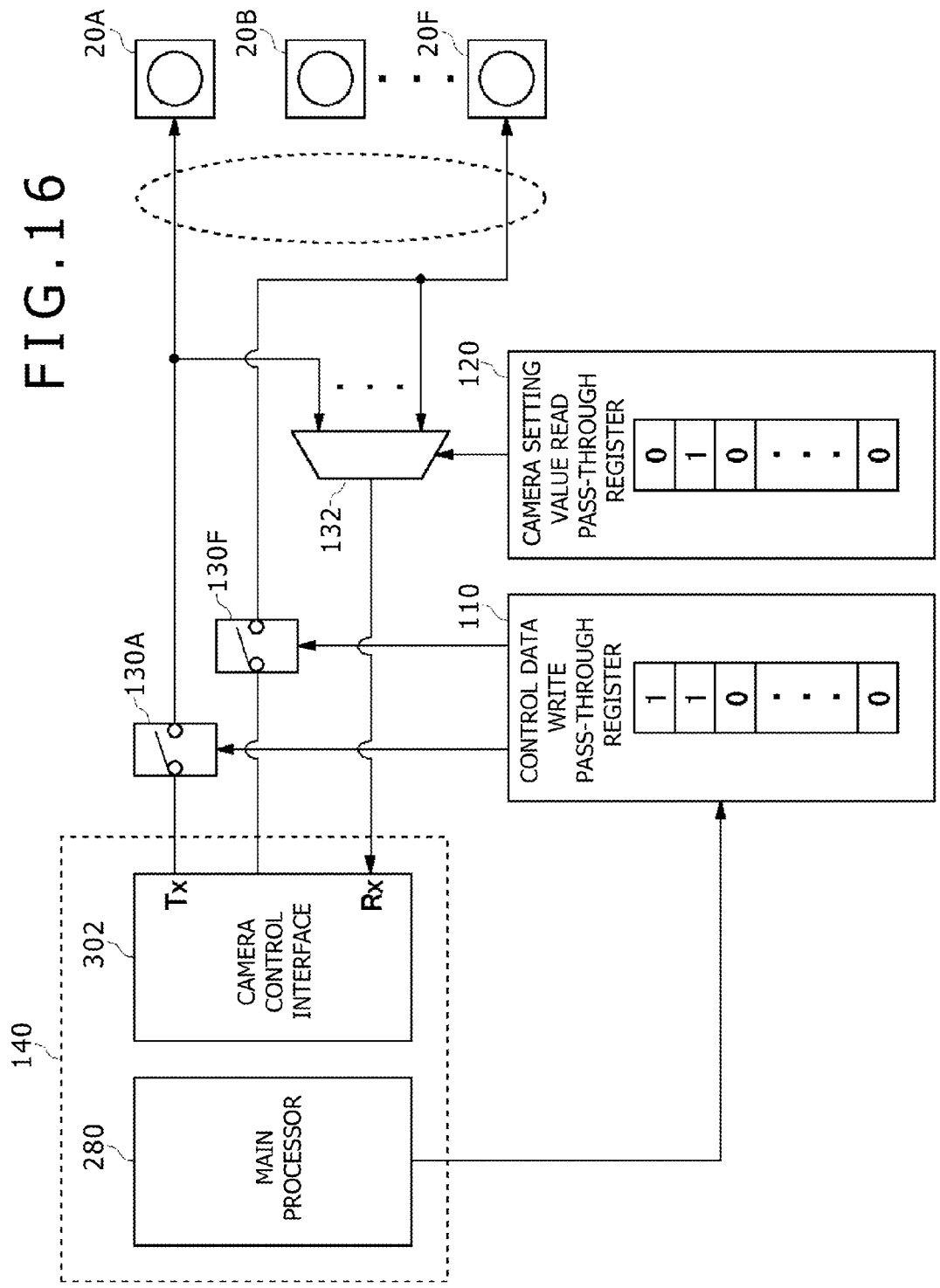
FIG. 16 is a diagram describing a functional configuration of the multiview camera control system shown in FIG. 15.

FIG. 16 is a diagram describing a functional configuration of the multiview camera control system shown in FIG. 15. A camera control interface 302 is an example of the bus interface/camera control interface 300 shown in FIG. 15 and makes up an application processor 140 together with the main processor 280. The application processor 140 is implemented, for example, by system-on-chip (SoC) technology.

In the functional configuration diagram shown in FIG. 16, the control data pass-through logic 320 shown in FIG. 15 is a circuit that connects the camera control interface 302 and the imaging units 20A to 20F using a bus interface such as I2C or SPI. The control data pass-through logic 320 includes switches 130A to 130F and a multiplexer 132.

A data transmitter Tx of the camera control interface 302 is connected to the imaging units 20A to 20F via the switches 130A to 130F. Control data specified by the main processor 280 is selectively written to the imaging units 20A to 20F. A control data write pass-through register 110 (hereinafter simply referred to as the "write pass-through register") is a pass-through mask register that corresponds to the number of the imaging units 20A to 20F. The write pass-through register 110 sets up a mask to switch between ON and OFF states of the switches 130A to 130F associated respectively with the imaging units 20A to 20F.

For example, when the value of the write pass-through register 110 is '110000,' the switches 130A and 130B associated respectively with the two imaging units 20A and 20B are ON, and the switches 130C to 130F associated respectively with the remaining four imaging units 20C to 20F are OFF. This allows control data to be selectively written to the two imaging units 20A and 20B.

The imaging units 20A to 20F are connected to a data receiver Rx of the camera control interface 302 via the multiplexer 132 having multiple inputs and a single output. Data is selectively read out from the imaging units 20A to 20F in accordance with a read instruction from the main processor 280. A camera setting value read pass-through register 120 (hereinafter simply referred to as the "read pass-through register") is a pass-through selection register that corresponds to the number of the imaging units 20A to 20F. The read pass-through register 120 sets up a mask to select one of a plurality of input streams of the multiplexer 132.

For example, when the value of the read pass-through register 120 is '010000,' the input stream from the imaging unit 20B is selected from among the input streams from the six imaging units 20A to 20F that are fed to the multiplexer 132. As a result, the data from the imaging units 20B is output from the multiplexer 132 as an output stream and supplied to the receiver Rx of the camera control interface 302.

In the configuration shown in FIG. 16, only one interface is available for the main processor 280 to read or write data from or to the imaging units 20A to 20F. It is possible to collectively or selectively read or write data from or to the imaging units 20A to 20F by simply rewriting the pass-through masks of the write pass-through register 110 and the read pass-through register 120. Providing an independent interface for each of the imaging units 20A to 20F leads to a larger circuit scale. However, the configuration shown in FIG. 16 has only one interface, thus contributing to a reduced number of circuits. Further, it is possible to select the desired imaging units to be written and simultaneously write data to the selected imaging units by simply rewriting the write pass-through register 110, thus speeding up the write operation.

Figure 17:
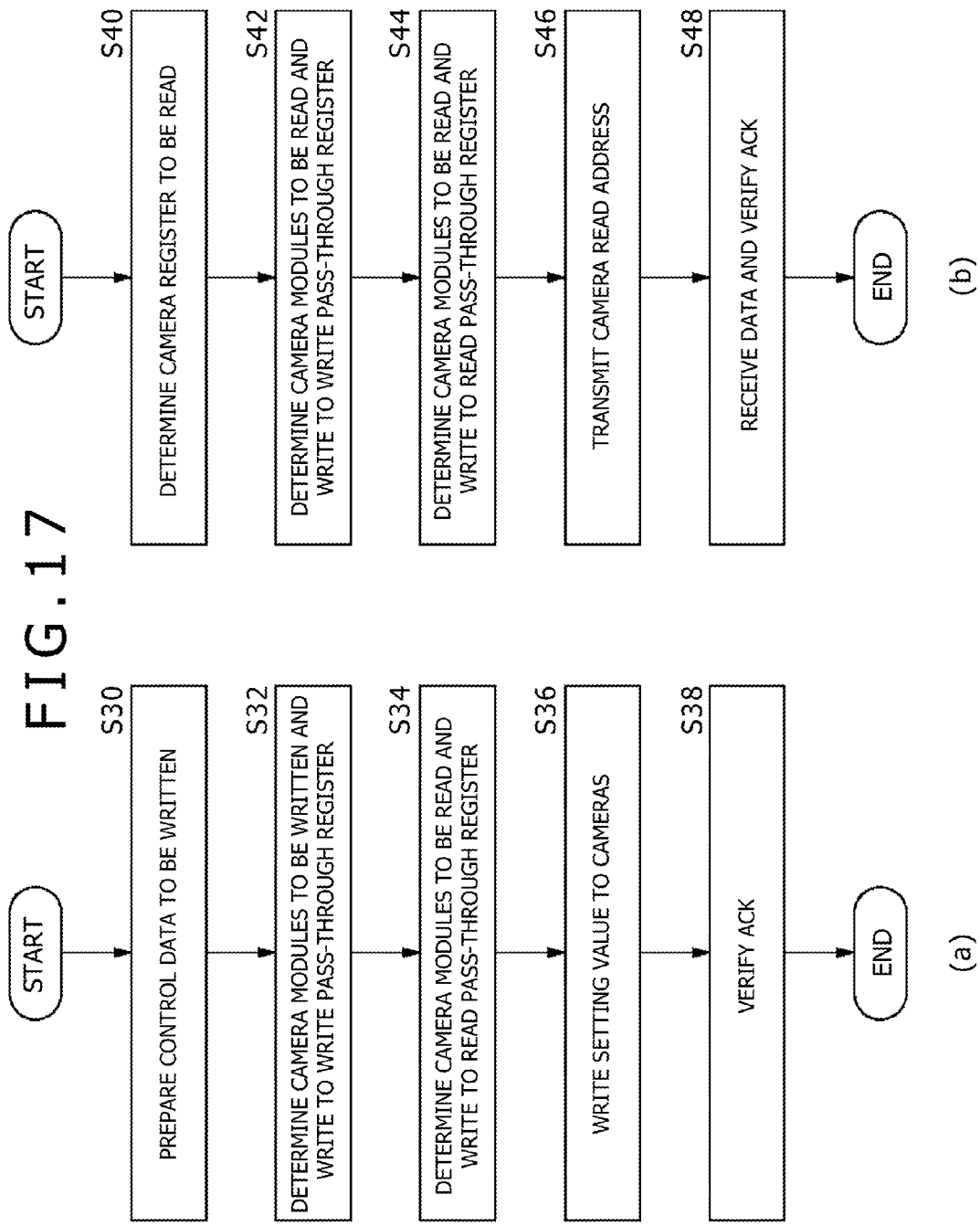
FIG. 17(a) is a flowchart describing a write process performed by the multiview camera control system shown in FIG. 16.
FIG. 17(b) is a flowchart describing a read process performed by the multiview camera control system shown in FIG. 16.

FIG. 17(a) is a flowchart describing a write process performed by the multiview camera control system shown in FIG. 16.

The main processor 280 prepares control data to be written to the imaging units 20A to 20F (S30). Control data is, for example, data relating to shooting conditions such as exposure value and specified by the user interface section 250 from the user.

The main processor 280 determines the target imaging units to be written and writes, to the write pass-through register 110, a value that specifies the imaging units to which control data is to be written (S32). If the write pass-through register 110 is a pass-through mask that corresponds to the number of the imaging units, the write pass-through register 110 sets up a pass-through mask to select the target imaging units to be written. The ON/OFF states of the switches 130A to 130F are set by the write pass-through register 110. The setup of a pass-through mask by the write pass-through register 110 is required to selectively transmit control data to the target imaging units to be written.

If acknowledge (ACK) is required in response to write operation, the main processor 280 determines the target imaging units to be read and writes, to the read pass-through register 120, a value that specifies the imaging units from which data is to be read (S34). If the read pass-through register 120 is a pass-through mask that corresponds to the number of the imaging units, the read pass-through register 120 sets up a pass-through mask to select the target imaging units to be read. Of the plurality of input streams of the multiplexer 132 having multiple inputs and a single output, the input streams specified by the read pass-through register 120 are selected and output as output streams. The setup of a pass-through mask by the read pass-through register 120 is required to selectively receive ACK from the target imaging units to be written.

Here, each of the target imaging units to be written returns ACK when the write operation is complete. Normally, ACK should be received from all the target imaging units to be written, and the reception of ACK should be verified individually. Such a process leads to a larger circuit scale and requires a procedure different from that of the bus standard. However, it is extremely rare that the write process fails under normal circumstances. Therefore, ACK from only one of the target imaging units is passed to verify the reception of ACK as an alternative way to verify the reception of ACK from all the target imaging units. This also contributes to a simpler circuit. In the present embodiment, therefore, the read pass-through register 120 sets only one bit to verify the reception of ACK. In order to verify whether data has been written to each of all the imaging units properly in a stricter manner, it is only necessary to individually read the register value for each of the imaging units to verify the reception of ACK.

The camera control interface 302 outputs, to the imaging units 20A to 20F, a signal adapted to write control data from the transmission terminal Tx via the switches 130A to 130F (S36). At this time, the ON/OFF states of the switches 130A to 130F are changed in accordance with the pass-through mask set up by the write pass-through register 110, thus allowing control data to be written only to the imaging units 20 selected as the target imaging units.

If ACK is required in response to write operation, the camera control interface 302 receives, from the imaging units 20A to 20F, an ACK signal with the reception terminal Rx via the multiplexer 132 (S38). At this time, ACK from the imaging units selected as target imaging units to be read is verified in accordance with the pass-through mask set up by the read pass-through register 120.

It should be noted that if ACK is not required in response to write operation, steps S34 and S38 can be omitted.

FIG. 17(b) is a flowchart describing a read process performed by the multiview camera control system shown in FIG. 16.

The main processor 280 determines the register of the imaging unit 20 to be read (S40).

The main processor 280 determines the target imaging unit to be read and writes, to the write pass-through register 110, a value that specifies the imaging units from which data is to be read (S42). If the write pass-through register 110 is a pass-through mask that corresponds to the number of the imaging units, the write pass-through register 110 sets up a pass-through mask to select the target imaging units to be read. The ON/OFF states of the switches 130A to 130F are set by the write pass-through register 110. The setup of a pass-through mask by the write pass-through register 110 is required to selectively transmit read addresses to the target imaging units to be read.

Next, the main processor 280 determines the target imaging units to be read and writes, to the read pass-through register 120, a value that specifies the imaging units from which data is to be read (S44). If the read pass-through register 120 is a pass-through mask that corresponds to the number of the imaging units, the read pass-through register 120 sets up a pass-through mask to select the target imaging units to be read. Of the plurality of input streams of the multiplexer 132 having multiple inputs and a single output, the input streams specified by the read pass-through register 120 are selected and output as output streams. The setup of a pass-through mask by the read pass-through register 120 is required to selectively receive data and ACK from the target imaging units to be read.

The camera control interface 302 outputs, to the imaging units 20A to 20F, an imaging unit read address from the transmission terminal Tx via the switches 130A to 130F (S46). At this time, the ON/OFF states of the switches 130A to 130F are changed in accordance with the pass-through mask set up by the write pass-through register 110, thus allowing the read address to be transmitted only to the imaging units 20 selected as the target imaging units to be read.

The camera control interface 302 receives, from the imaging units 20A to 20F, data for the specified address with the reception terminal Rx via the multiplexer 132 (S48). At this time, data is received from the imaging units selected as the target imaging units to be read, and ACK from the imaging units selected as the target imaging units is verified in accordance with the pass-through mask set up by the read pass-through register 120.

Figure 18:
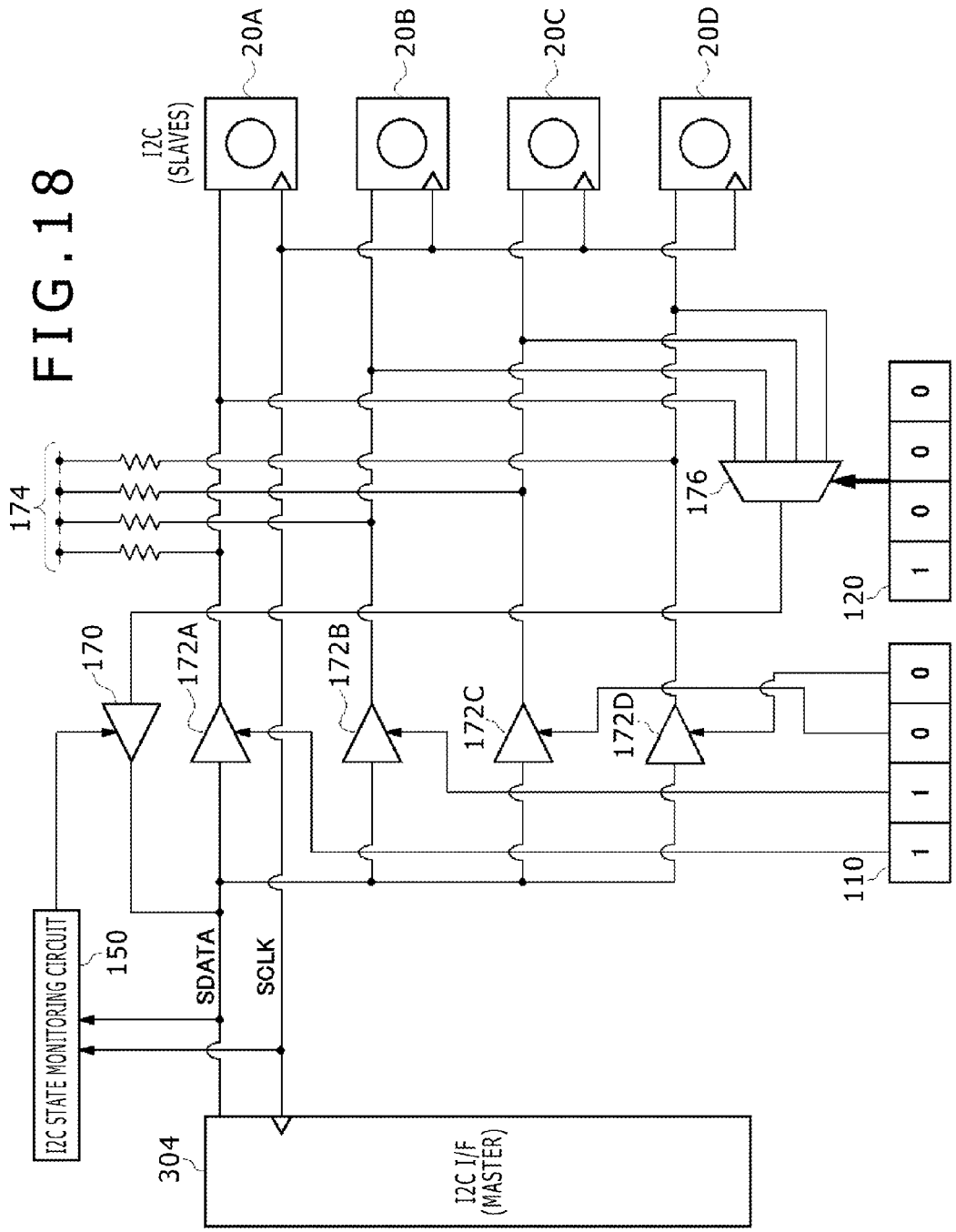
FIG. 18 is a diagram describing an example of implementation of the multiview camera control system shown in FIG. 16.

FIG. 18 is a diagram describing an example of implementation of the multiview camera control system shown in FIG. 16. In the implementation example shown in FIG. 18, a serial communication scheme for communication with peripheral devices called I2C (Inter-Integrated Circuit) is used. A description will be given here of a case in which the four imaging units (imaging units 20A to 20D) are used for simplicity.

An I2C interface 304 is provided on the side of the application processor 140 and serves as the I2C communication master. The imaging units 20A to 20D are I2C communication slaves.

An I2C state monitoring circuit 150 is a circuit that enables a tristate buffer 170 to receive in the receive state. As a result, data reception from a multiplexer 176 is enabled. During write operation, the tristate buffer 170 is blocked.

SDATA output from the I2C interface 304 is supplied to tristate buffers 172A to 172D associated respectively with the imaging units 20A to 20D. The tristate buffer associated with the target imaging unit to be written is enabled in accordance with the pass-through mask of the write pass-through register 110, thus allowing the SDATA to be transmitted only to the target imaging unit to be written. Pull-up resistors 174 are resistors that adjust the output signals of the tristate buffers 172A to 172D to appropriate logic levels. SCLK output from the I2C interface 304 is a clock signal adapted to synchronize the imaging units 20A to 20F.

Of the input terminals of the multiplexer 176 having multiple inputs and a single output, the input values from the input terminals specified in accordance with the pass-through mask of the read pass-through register 120 are multiplexed and supplied to the I2C interface 304 via the tristate buffer 170.

In FIG. 18, the pass-through mask of the write pass-through register 110 is '1100.' Therefore, control data is written to the imaging units 20A and 20B during write operation. The pass-through mask of the read pass-through register 120 is '1000.' Therefore, ACK is read from the imaging unit 20A during read operation.

Figure 19:
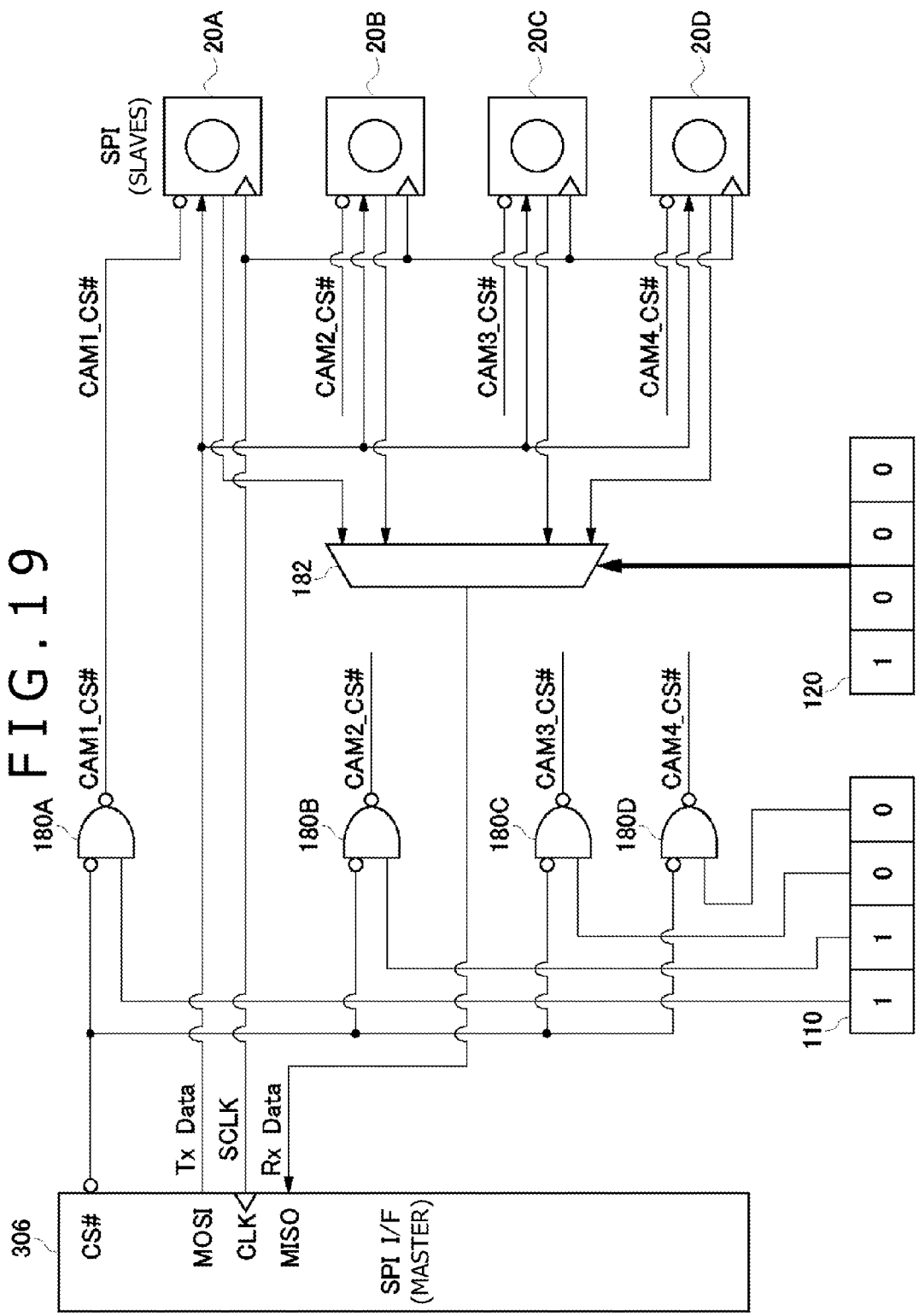
FIG. 19 is a diagram describing another example of implementation of the multiview camera control system shown in FIG. 16.

FIG. 19 is a diagram describing another example of implementation of the multiview camera control system shown in FIG. 16. In the implementation example shown in FIG. 19, a bus interface called SPI (Serial Peripheral Interface) is used which connects devices inside a computer. Here, a description will be given also of a case in which the four imaging units (imaging units 20A to 20D) are used for simplicity.

An SPI interface 306 is provided on the side of the application processor 140 and serves as the SPI communication master. The imaging units 20A to 20D are SPI communication slaves.

A CS# signal output from the SPI interface 306 is a chip select signal and supplied to NAND circuits 180A to 180D. The write pass-through register 110 is a pass-through mask adapted to select the target imaging units 20A to 20D to be written. A register value is supplied to the NAND circuits 180A to 180D that are respectively associated with the imaging units 20A to 20D. In this example, the pass-through mask of the write pass-through register 110 is '1100.' Therefore, '1' is fed to the two NAND circuits 180A and 180B, and '0' is fed to the remaining two NAND circuits 180C and 180D. Output values CAM1_CS# to CAM4_CS# of the NAND circuits 180A to 180D are inverted and fed to the imaging units 20A to 20D. As a result, the two imaging units 20A and 20B are selected, allowing control data TxData to be transmitted from MOSI (Master Out Slave In) of the SPI interface 306 to the imaging units 20A and 20B.

The SCLK signal from CLK of the SPI interface 306 is supplied to the imaging units 20A to 20F to synchronize these imaging units.

Read data RxData from a multiplexer 182 is received by MISO (Master In Slave Out) of the SPI interface 306. The read pass-through register 120 is a pass-through mask adapted to select the target imaging units 20A to 20D to be read. The read pass-through register 120 is used to select the input signals of the multiplexer 182 having multiple inputs and a single output. In this example, the pass-through mask of the read pass-through register 120 is '1000.' Of the plurality of input streams of the multiplexer 182 having multiple inputs and a single output, the input stream from the imaging unit 20A is selected and output as an output stream of the multiplexer 182.

FIGS. 20(a) and 20(b) are diagrams describing examples of the operation screen displayed on the operation/display unit 40. Images shot by the six imaging units 20A to 20F of the panoramic imaging device 100 shown in FIG. 20(a) are displayed respectively in areas A to F of the operation screen shown in FIG. 20(b).

The frame of each of the areas A to F of the operation screen appears, for example, in blue when selected as a reference camera. Further, when these areas are divided into groups, the frame of each group appears in a different color. The selection of a reference camera is toggled on or off. Each click toggles between selection and deselection.

The movie recording start/stop button 70, the still image shooting button 72, the auto exposure lock button 74, the auto white balance lock button 76, and the extension control button 78 are the same as those described in FIG. 10(b). Therefore, the description thereof is omitted.

When a camera freeze button 75 is pressed, the selected imaging unit freezes with the currently captured image. That is, the imaging unit remains operational and maintains, on screen, the same image as when the camera freeze button 75 is pressed. The camera freeze button 75 is a toggle button. When the camera freeze button 75 is pressed again, the camera unfreezes, thus resuming shooting by the selected imaging unit.

When a grouping button 77 is pressed, the areas arbitrarily selected from among the plurality of areas A to F are grouped. In other words, the specific imaging units are selected and grouped from among the imaging units 20A to 20F. The desired areas to be grouped can be selected by clicking those areas or enclosing them with a freehand curve on the operation screen.

Figure 21:
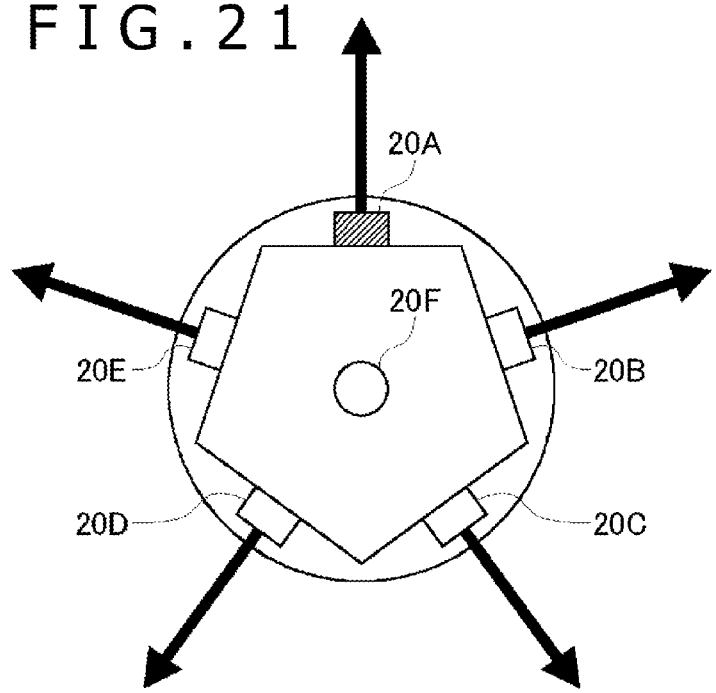
FIG. 21 is a diagram describing a case in which imaging units are collectively set up by specifying a reference camera.
Figure 22:
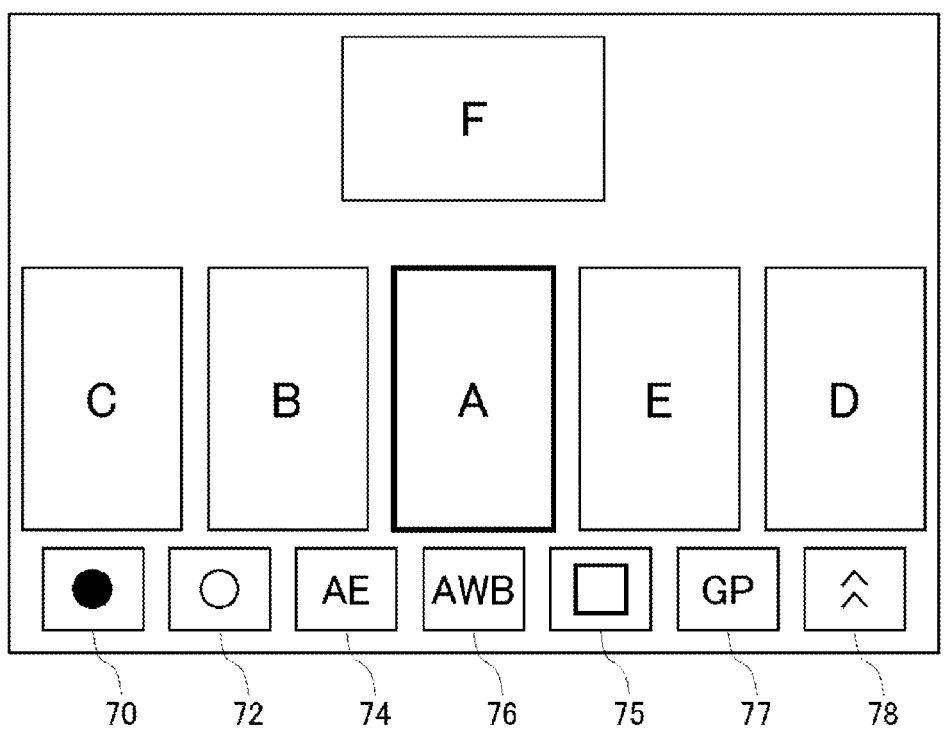
FIG. 22 is a diagram illustrating an example of the operation screen when the imaging units are collectively set up by specifying a reference camera.

FIG. 21 is a diagram describing a case in which the imaging units are collectively set up by specifying a reference camera. FIG. 22 illustrates an example of the operation screen in that case.

As illustrated in FIG. 21, the imaging unit 20A is specified as a reference camera so that the shooting parameters such as reference camera's exposure value are set collectively in the other imaging units 20B to 20F. In the case of shooting indoors, for example, the imaging unit 20A in the front direction is specified as a reference camera, and the other imaging units 20B to 20F proceed with shooting with the same exposure setting as that of the reference camera.

As illustrated in FIG. 22, when the auto exposure (AE) lock button 74 or the auto white balance (AWB) lock button 76 is pressed with the area A, associated with the imaging unit 20A, selected as a reference camera, the same parameter is reflected in the other imaging units 20B to 20F.

The read pass-through register 120 is set to a value that specifies the imaging unit 20A selected as a reference camera as a target imaging unit to be read. As a result, the shooting parameters such as exposure value and white balance value are read from the imaging unit 20A, the reference camera. Then, the write pass-through register 110 is set to a value that specifies the remaining imaging units 20B to 20F other than the imaging unit 20A selected as a reference camera as target imaging units to be written. As a result, the shooting parameters read from the imaging unit 20A, the reference camera, are collectively written to the remaining imaging units 20B to 20F.

A more specific operation procedure is as follows:
(1) Click the area A of the front camera on the operation screen. As a result, the frame of the area A turns blue, and the imaging unit 20A serves as a reference camera.
(2) Press the auto white balance lock button 76 to lock the white balance of all the imaging units 20A to 20F to the adjustment value of the imaging unit 20A, the reference camera.
(3) Press the auto exposure lock button 74 to lock the exposure value of all the imaging units 20A to 20F to the adjustment value of the imaging unit 20A, the reference camera.
(4) Shoot with the movie recording start/stop button 70 or the still image shooting button 72.

Figure 23:
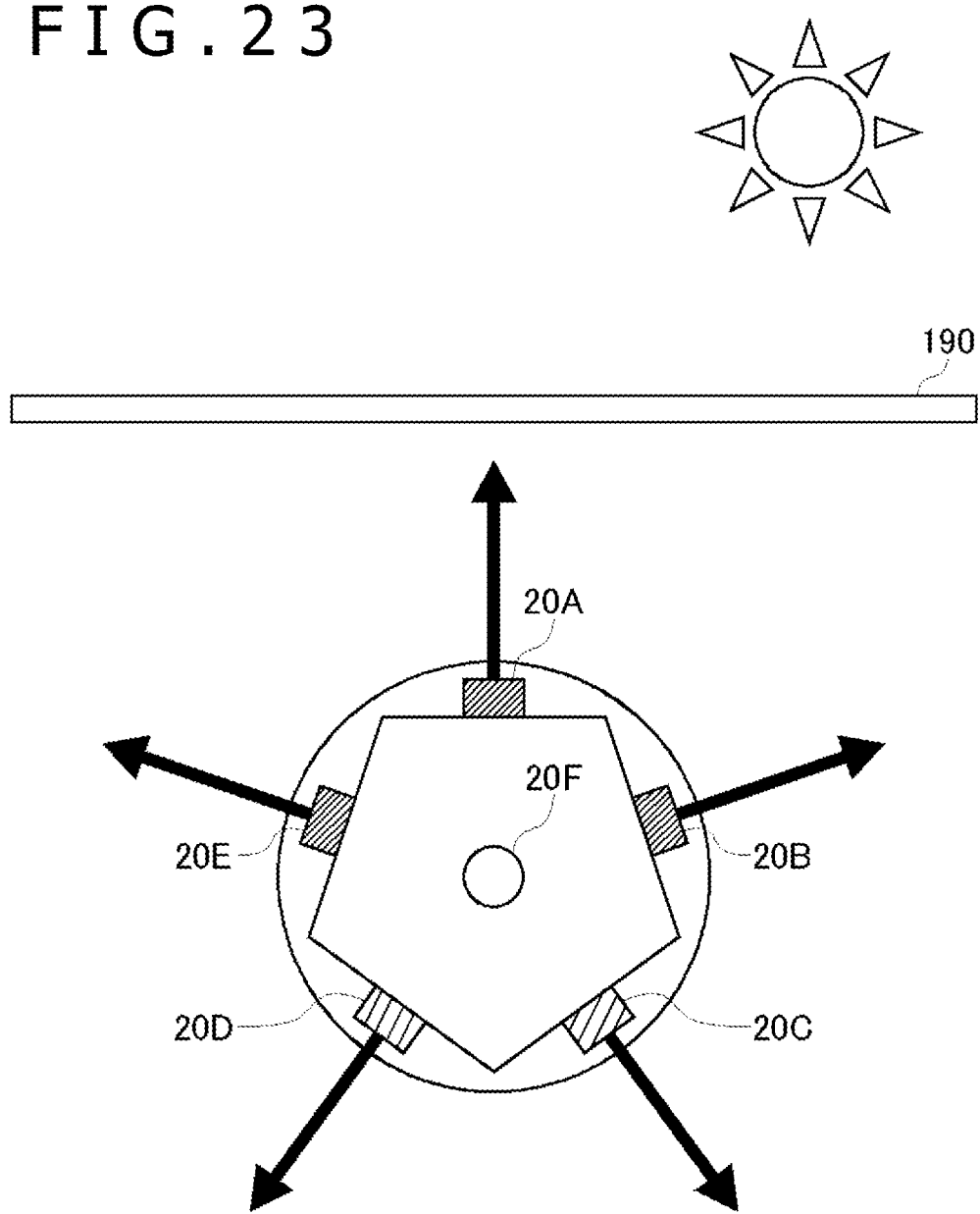
FIG. 23 is a diagram describing a case in which an outdoor image is shot from indoors through a window.
Figure 24:
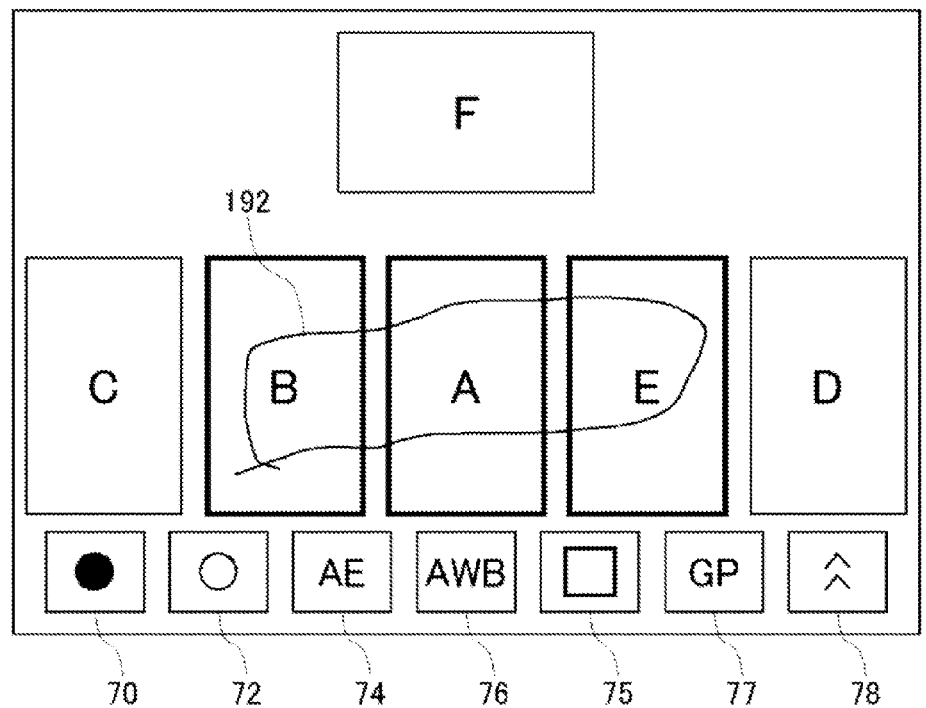
FIG. 24 is a diagram illustrating an example of the operation screen when an outdoor image is shot from indoors through a window.
Figure 25:
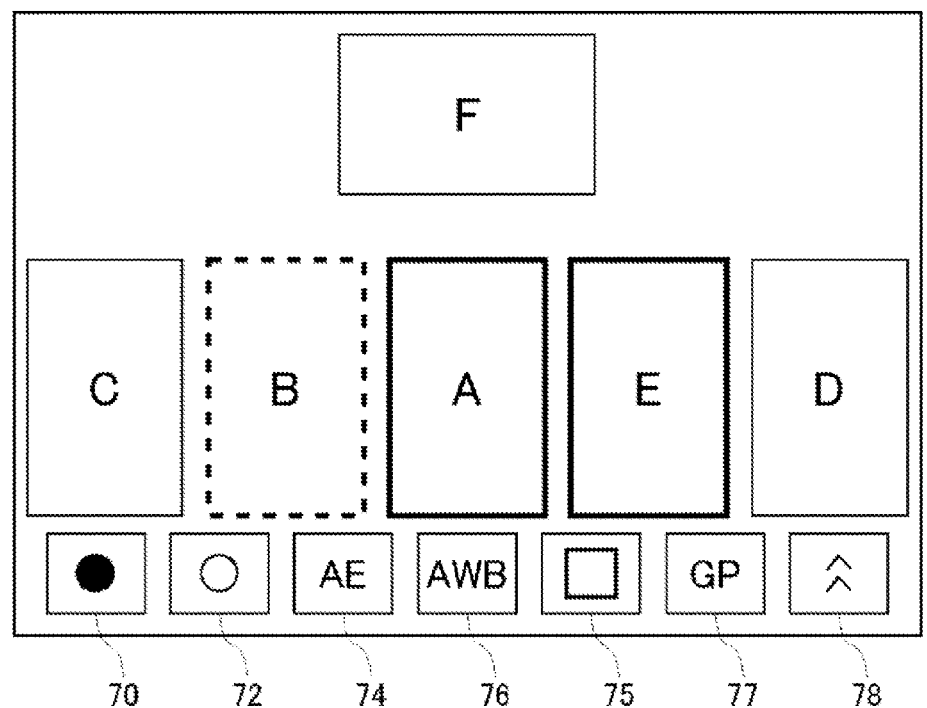
FIG. 25 is a diagram illustrating an example of the operation screen when an outdoor image is shot from indoors through a window.

FIG. 23 is a diagram describing a case in which an outdoor image is shot from indoors through a window. FIGS. 24 and 25 illustrate examples of the operation screen in that case.

As illustrated in FIG. 23, when an outdoor image is shot through a window 190, the imaging units 20A, 20B, and 20E on the window side narrow down the exposure for outdoor shooting. However, it is necessary for the remaining imaging units 20C and 20D to shoot with an exposure setting for indoor shooting.

As illustrated in FIG. 24, the areas A, B, and E associated with the imaging units 20A, 20B, and 20E on the window side are enclosed with a freehand curve 192 for selection. The grouping button 77 is pressed to group the selected areas A, B, and E.

Next, of the areas A, B, and E that belong to the same group, the area B is selected as illustrated in FIG. 25 so that the imaging unit 20B is selected as a reference camera. As a result, the same shooting parameter as for the imaging unit 20B, the reference camera, is reflected in the other imaging units 20A and 20E that belong to the same group.

The read pass-through register 120 is set to a value that specifies the imaging unit 20B selected as a reference camera in the group as a target imaging unit to be read. As a result, the shooting parameters such as exposure value and white balance value are read from the imaging unit 20B, the reference camera. Then, the write pass-through register 110 is set to a value that specifies the remaining imaging units 20A and 20E other than the imaging unit 20B selected as a reference camera in the group as target imaging units to be written. As a result, the shooting parameters read from the imaging unit 20B, the reference camera, are collectively written to the remaining imaging units 20A and 20E.

A more specific operation procedure is as follows:
(1) Select the areas A, B, and E associated with the imaging units 20A, 20B, and 20E on the window side on the operation screen.
(2) Press the grouping button 77 to group the selected areas A, B, and E. As a result, the frames of the areas A, B, and E turn green, thus forming a first group. The remaining areas C, D and F form a second group.
(3) Click the area B. As a result, the frame of the area B turns blue. The imaging unit 20B associated with the area B serves as a reference camera of the green first group.
(4) Click the area D. As a result, the frame of the area D turns blue. The imaging unit 20D associated with the area D serves as a reference camera of the second group.
(5) When the auto white balance lock button 76 is pressed, the white balance of the imaging units 20A, 20B, and 20E that belong to the first group is locked to the adjustment value of the imaging unit 20B, the reference camera. Further, the white balance of the imaging units 20C, 20D and 20F that belong to the second group is locked to the adjustment value of the imaging unit 20D, the reference camera.
(6) When the auto exposure lock button 74 is pressed, the exposure values of the imaging units 20A, 20B, and 20E that belong to the first group are locked to the adjustment value of the imaging unit 20B, the reference camera. Further, the exposure values of the imaging units 20C, 20D and 20F that belong to the second group are locked to the adjustment value of the imaging unit 20D, the reference camera.
(7) Shoot with the movie recording start/stop button 70 or the still image shooting button 72.

Figure 26:
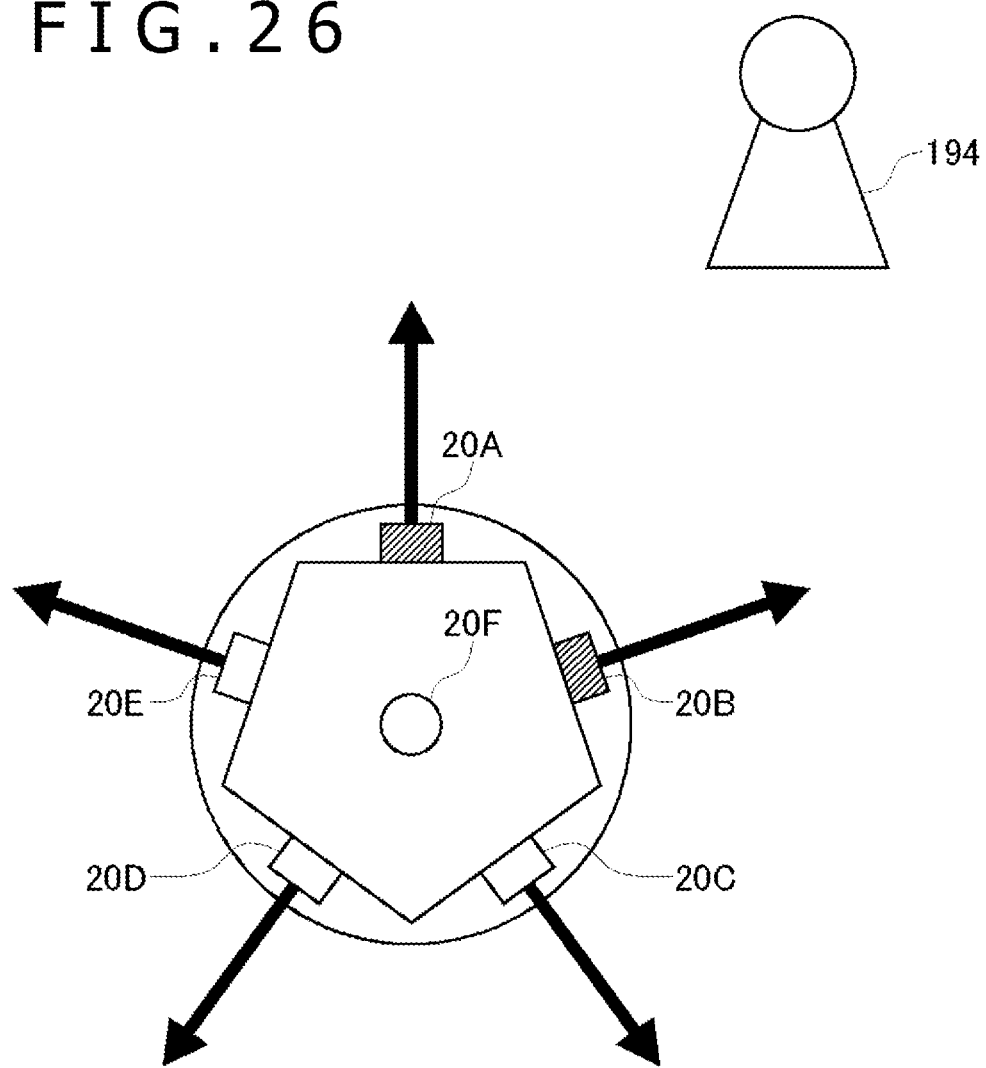
FIG. 26 is a diagram describing a case in which some of the cameras are frozen.
Figure 27:
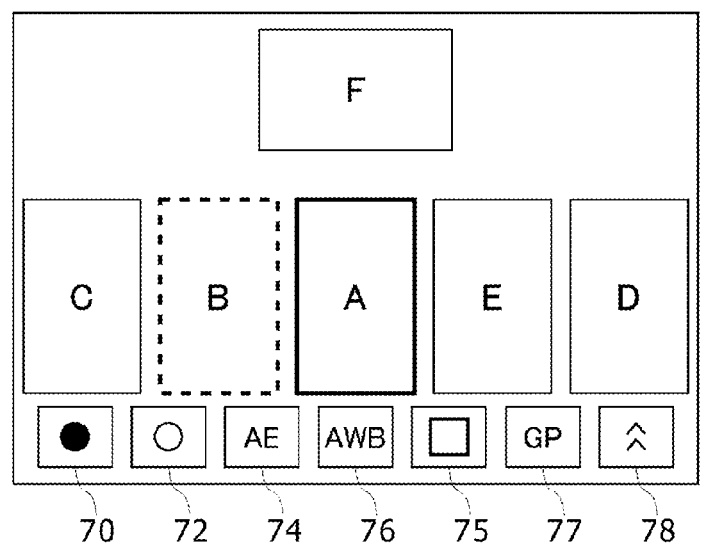
FIG. 27 is a diagram illustrating an example of the operation screen when some of the cameras are frozen.

FIG. 26 is a diagram describing a case in which some of the cameras are frozen. FIG. 27 illustrates an example of the operation screen in that case.

If a person 194 comes in during panoramic image shooting as illustrated in FIG. 26, the camera images are frozen with the person 194 not appearing in the images, and the camera shooting is temporarily suspended. In this example, the shooting by the imaging units 20A and 20B is temporarily suspended so that the person 194 does not appear in the captured images, and the images not showing the person 194 are frozen.

As illustrated in FIG. 27, select the desired areas A and B to freeze. Next, press the grouping button 77 to group the selected areas A and B. Then, select the area A or B as a reference camera and press the camera freeze button 75. This makes it possible to temporarily stop the imaging units 20A and 20B associated with the areas A and B that belong to the same group and freeze the images with no person appearing therein.

A more specific operation procedure is as follows:
(1) Select the desired areas A and B to freeze on the operation screen.
(2) Press the grouping button 77 to group the selected areas A and B. As a result, the frames of the areas A and B turn green.
(3) Click the area A or B. As a result, the imaging unit associated with the selected area serves as a reference camera. Actually, however, this has the same effect as specifying a group of cameras to be frozen.
(4) With no person appearing in the images, press the camera freeze button 75. As a result, the group of cameras specified in step (3) is frozen, thus causing the areas A and B to be frozen with images showing no person therein.
(5) From here onward, shoot with the remaining imaging units 20C to 20F that are not frozen.

As described above, in the multiview camera control system according to the present embodiment, a mask register for writing data and a selection register for reading data are inserted between two interfaces, one used by the main processor to access the cameras and another being a camera module interface. This provides collective and fast camera control, thus contributing to easy and efficient camera control. A multiview camera control system can be achieved simply by inserting registers between the existing interfaces. This eliminates the need to change the camera modules or processor interface, thus making it easy to design a control system.

[Multistep Exposure Shooting]

Figure 28:
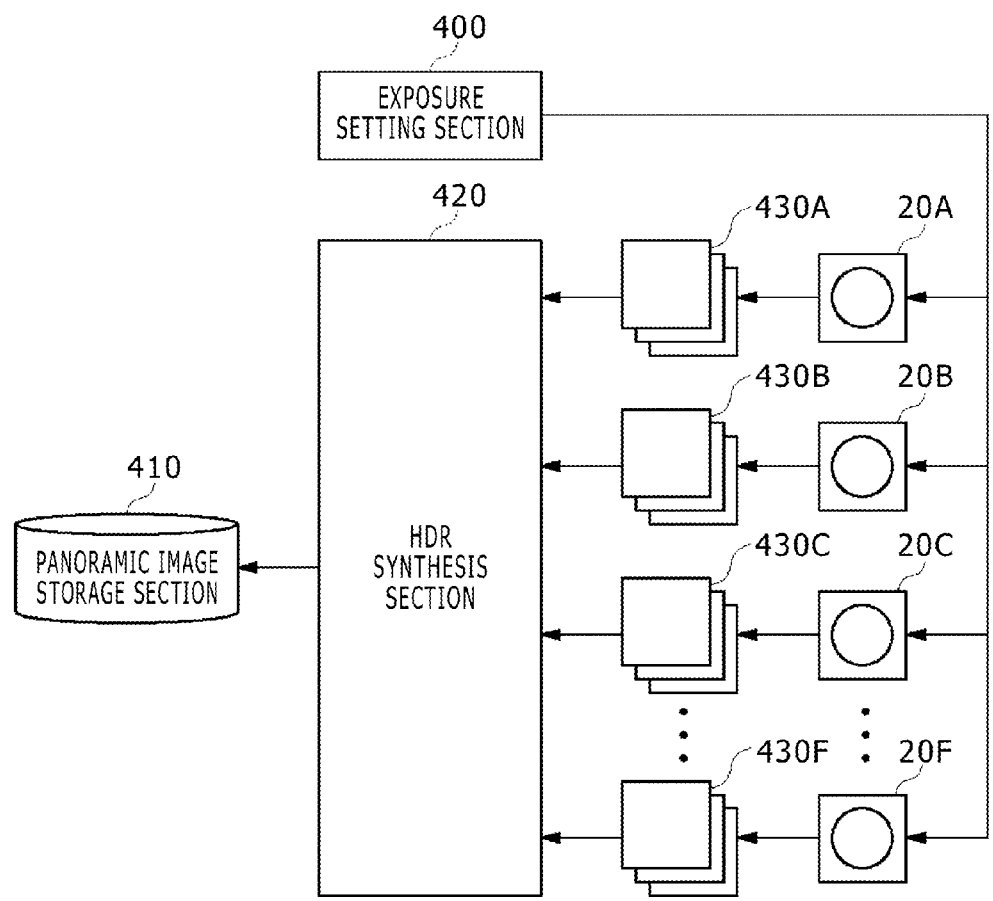
FIG. 28 is a functional configuration diagram of the panoramic movie stream generator adapted to perform multistep exposure shooting.

FIG. 28 is a functional configuration diagram of the panoramic movie stream generator 200 adapted to perform multistep exposure shooting. Here, the components related to multistep exposure shooting are shown, and all other components are not shown for reasons of convenience. An exposure setting section 400 shown in FIG. 28 can be implemented in the shooting control section 210 described with reference to FIG. 11. An HDR synthesis section 420 shown in FIG. 28 can be implemented in the movie stream multiplexing section 230 described with reference to FIG. 11.

The exposure setting section 400 sets an exposure value in each of the plurality of imaging units 20A to 20F. More specifically, the exposure setting section 400 sets an individual reference exposure value in each of the imaging units 20A to 20F and further sets relative exposure values therein. The relative exposure values are centered around the reference exposure value and obtained by increasing or reducing the reference exposure value. The individual reference exposure value of each of the imaging units 20A to 20F may be set to an optimal value by the auto exposure (AE) mechanism of each of the imaging units 20A to 20F.

The exposure setting section 400 may set an exposure value in each of the imaging units 20A to 20F collectively or selectively using the multiview camera control system described with reference to FIG. 15.

The low dynamic range (LDR) captured images shot by the imaging units 20A to 20F with varying exposure values are stored in frame buffers 430A to 430F. Each of the frame buffers 430A to 430F is a frame memory that has a storage area to store images shot with a plurality of exposure values set in the imaging units 20A to 20F.

The HDR synthesis section 420 reads the low dynamic range captured images shot by the imaging units 20A to 20F with varying exposure values from the frame buffers 430A to 430F, synthesizing the captured areas with optimal exposure values through a stitching process and generating a high dynamic range (HDR) panoramic image. It should be noted that if the ultimate output format is an LDR panoramic image, the HDR synthesis section 420 can generate an LDR panoramic image with a compressed dynamic range by subjecting the HDR synthesized image to a tone mapping process.

The HDR synthesis section 420 extracts feature points between adjacent captured images, synthesizing a panoramic image by stitching together the adjacent captured images based on the feature points. A known technology applied for image matching can be used for the feature point extraction process. The panoramic image generated by the HDR synthesis section 420 is stored in a panoramic image storage section 410.

FIGS. 29(a) and 29(b) are diagrams describing captured images shot by setting an identical reference exposure value in the plurality of imaging units 20A to 20F for comparison.

FIG. 29(a) illustrates images 440A to 446A obtained by bracket shooting with the imaging unit 20A in which a reference exposure value (0 in this case) is changed in multiple steps in such a manner that the varying exposure values are centered around the reference exposure value. The image 442A is an example of an image shot with a reference exposure value EV=0. The images 443A, 444A, 445A, and 446A are examples of images shot respectively by adding 1, 4, 5, and 7 to the reference exposure value EV=0. On the other hand, the images 441A and 440A are examples of images shot respectively by subtracting 4 and 7 from the reference exposure value EV=0. Adding 1 to the exposure value EV doubles the amount of light, whereas subtracting 1 from the exposure value EV halves the amount of light.

In FIG. 29(a), the image 440A with the exposure value EV of −7 has a "blocked up shadow," thus resulting in a total lack of information. The image 446A with the exposure value EV of 7 partly has a "blown out highlight."

FIG. 29(b) illustrates images 440B to 446B obtained by bracket shooting with the other imaging unit 20B in which the reference exposure value EV same as that in the case of FIG. 29(a) is changed in multiple steps in such a manner that the varying exposure values are centered around the reference exposure value. The image 442B is an example of an image shot with the reference exposure value EV=0. The images 443B, 444B, 445B, and 446B are examples of images shot respectively by adding 1, 4, 5, and 7 to the reference exposure value EV=0. On the other hand, the images 441B and 440B are examples of images shot respectively by subtracting 4 and 7 from the reference exposure value EV=0.

The images 440B and 441B respectively with the exposure values EV of −7 and −4 have a "blocked up shadow," thus resulting in a total lack of information. The image 446B with the exposure value EV of 7 partly has a "blown out highlight."

As described above, setting the same reference exposure value in all the imaging units 20A to 20F and increasing or reducing the reference exposure value for bracket shooting leads to "blocked up shadows" or "blown out highlights" in the shot images, thus resulting in a waste of images.

With a multiview camera, the appropriate exposure value varies significantly depending on the camera's field of view. In order to achieve an appropriate range of exposure in all directions, bracket shooting is effective which changes the exposure value in multiple steps for shooting. However, the dynamic range of brightness in the field of view of a multiview camera varies significantly depending on the camera angle. As a result, it is necessary to set the exposure values of all the cameras in multiple steps in a wide range of exposure that spans from the darkest field of view to the brightest one for bracket shooting, thus resulting in more image data and more shooting time. Further, increasing or reducing the exposure value relative to the same reference exposure value for all the cameras leads to a large number of images having "blocked up shadows" or "blown out highlights" depending on the camera angle, resulting in a waste of many images.

For this reason, in multistep exposure shooting according to the present embodiment, an individual reference exposure value is set in each of the imaging units 20A to 20F, and the exposure value of each of the imaging units 20A to 20F is varied in multiple steps by increasing or reducing the individual reference exposure value for bracket shooting.

Figure 30:
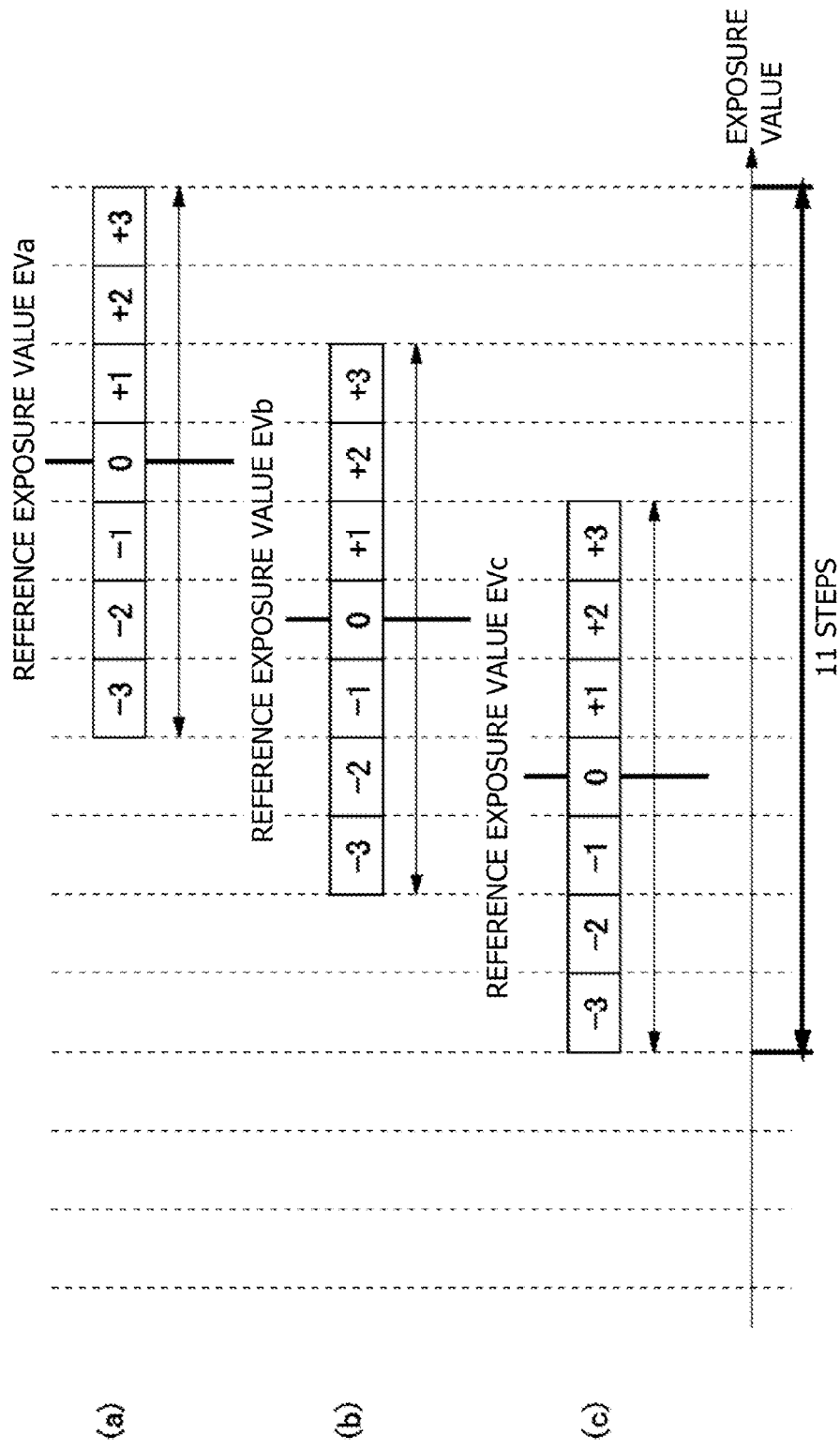
FIGS. 30(a) to 30(c) are diagrams describing the reference exposure value set in the imaging units by an exposure setting section shown in FIG. 28 and variable exposure values that are obtained by changing the reference exposure value in multiple steps in such a manner that the variable exposure values are centered around the reference exposure value.

FIGS. 30(a) to 30(c) are diagrams describing the reference exposure value set in each of the imaging units 20A to 20F by the exposure setting section 400 and relative exposure values that are obtained by changing the reference exposure value in a predetermined number of steps in such a manner that the relative exposure values are centered around the reference exposure value. FIG. 30(a) illustrates a reference exposure value EVa set in the imaging unit 20A and relative exposure values obtained by increasing the reference exposure value EVa in three steps and reducing the reference exposure value EVa in three steps. FIG. 30(b) illustrates a reference exposure value EVb set in the imaging unit 20B and relative exposure values obtained by increasing the reference exposure value EVb in three steps and reducing the reference exposure value EVb in three steps. FIG. 30(c) illustrates a reference exposure value EVc set in the imaging unit 20C and relative exposure values obtained by increasing the reference exposure value EVc in three steps and reducing the reference exposure value EVc in three steps.

The reference exposure values EVa, EVb, and EVc set respectively in the imaging units 20A, 20B, and 20C are optimal exposure values in the fields of view of the imaging units 20A, 20B, and 20C which are generally different. Here, there is a difference of two steps between the reference exposure values EVa and EVb set respectively in the imaging units 20A and 20B and between the reference exposure values EVb and EVc set respectively in the imaging units 20B and 20C. Multistep exposure shooting is conducted by adding 3, 2, and 1 to and subtracting 1, 2 and 3 from the reference exposure values EVa, EVb, and EVc, each having a difference of two steps from its adjacent value. As a result, shooting is conducted using 11 different exposure values in total for the three imaging units 20A, 20B, and 20C.

The number of steps for bracket shooting for each of the imaging units 20 should preferably be determined so that the exposure ranges of the imaging units 20 with adjacent shooting directions partly overlap. This is designed to achieve a correlation in terms of exposure between the adjacent captured images during HDR synthesis.

Each of the imaging units 20A, 20B, and 20C performs multistep exposure shooting with an optimal reference exposure value and six more exposure values, three obtained by increasing the reference exposure value in three steps and other three obtained by reducing the reference exposure value in three steps so that the six more exposure values are centered around the reference exposure value. This prevents "blocked up shadows" and "blown out highlights," described with reference to FIGS. 29(a) and 29(b), from appearing in images captured by the imaging units 20A, 20B, and 20C, thus eliminating a waste of images in multistep exposure shooting. Further, in contrast to 11-step multistep exposure shooting conducted by all the imaging units 20A, 20B, and 20C as hitherto been done, bracket shooting is conducted by the imaging units 20A, 20B, and 20C with only seven steps from +3 to −3 including a reference exposure value, thus contributing to significantly shorter time for bracket shooting. As described above, the present embodiment provides a significantly larger dynamic range during HDR synthesis despite having a small number of steps for bracket shooting conducted by the imaging units 20A to 20F, thus allowing waste-free and efficient HDR panoramic image synthesis.

Figure 31:
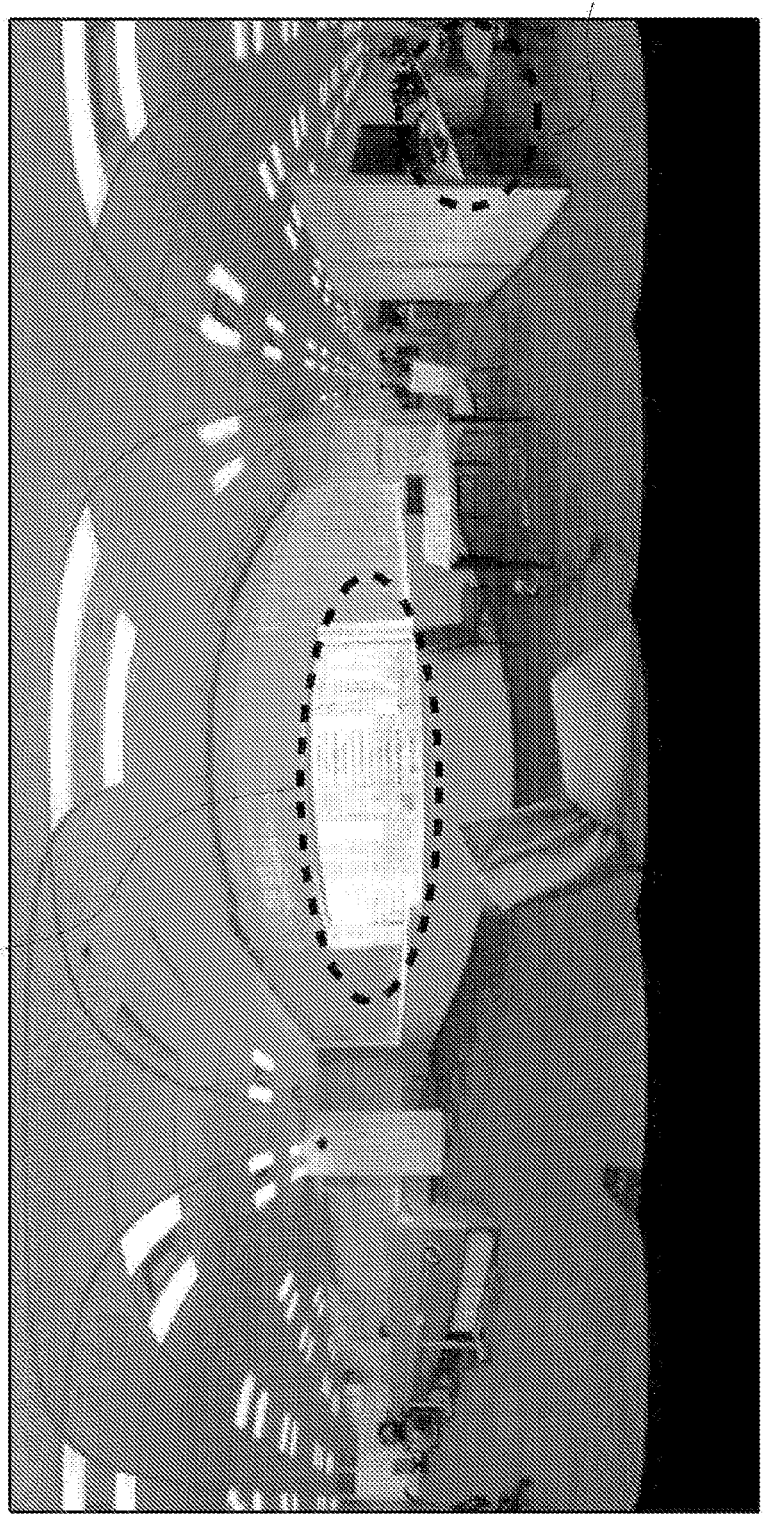
FIG. 31 is a diagram describing a panoramic image synthesized by an HDR synthesis section shown in FIG. 28.

FIG. 31 is a diagram describing a panoramic image synthesized by the HDR synthesis section 420. The panoramic image shown in FIG. 31 is obtained by stitching together the captured areas with appropriate exposure values of the images shot with a plurality of exposure values by the imaging units 20A to 20F for synthesis. For example, an area 450 is a scene outside the window which was extracted from a captured image shot by the imaging unit 20A with an appropriate exposure value for the field of view of the imaging unit 20A. An area 451 is an indoor scene which was extracted from a captured image shot by the imaging unit 20B with an appropriate exposure value for the field of view of the imaging unit 20B.

Figure 32:
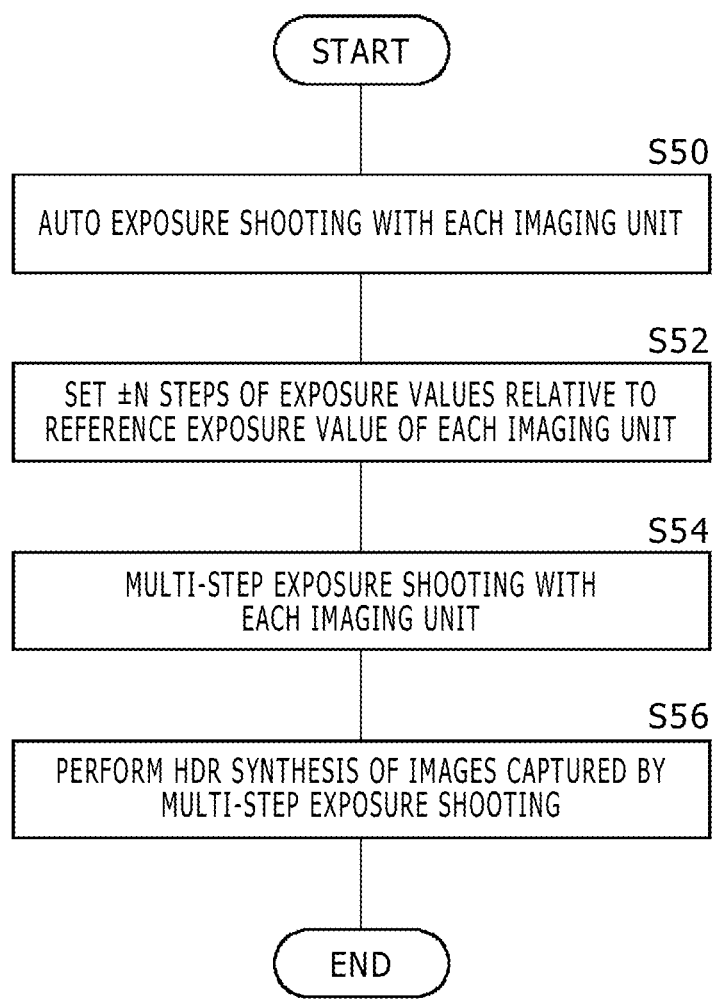
FIG. 32 is a flowchart describing the steps for conducting multistep exposure shooting.

FIG. 32 is a flowchart describing the steps for conducting multistep exposure shooting according to the present embodiment.

Select auto exposure (AE) and auto white balance (AWB) for the imaging units 20A to 20F to proceed with shooting with an optimal reference exposure value for each of the imaging units 20A to 20F (S50).

The exposure setting section 400 sets, in each of the imaging units 20A to 20F, N positive and N negative relative exposure values which are centered around the reference exposure value (S52).

Conduct bracket shooting with the N positive and N negative relative exposure values using the imaging units 20A to 20F (S54).

The HDR synthesis section 420 stitches together the appropriate exposure areas of the captured images by bracket shooting using the imaging units 20A to 20F, thus synthesizing a high dynamic range panoramic image (S56).

In the description given above, multistep exposure shooting is performed by increasing and reducing the reference exposure value in a given number of steps. Appropriate exposure areas of the captured images shot by the imaging units 20A to 20F through multistep exposure shooting are stitched together, thus synthesizing a high dynamic range panoramic image. As a modification example, it is possible to synthesize a pseudo high dynamic range panoramic image from images captured with an individual reference exposure value set in each of the imaging units 20A to 20F. A description will be given below of how to proceed with this pseudo HDR synthesis.

Figure 33:
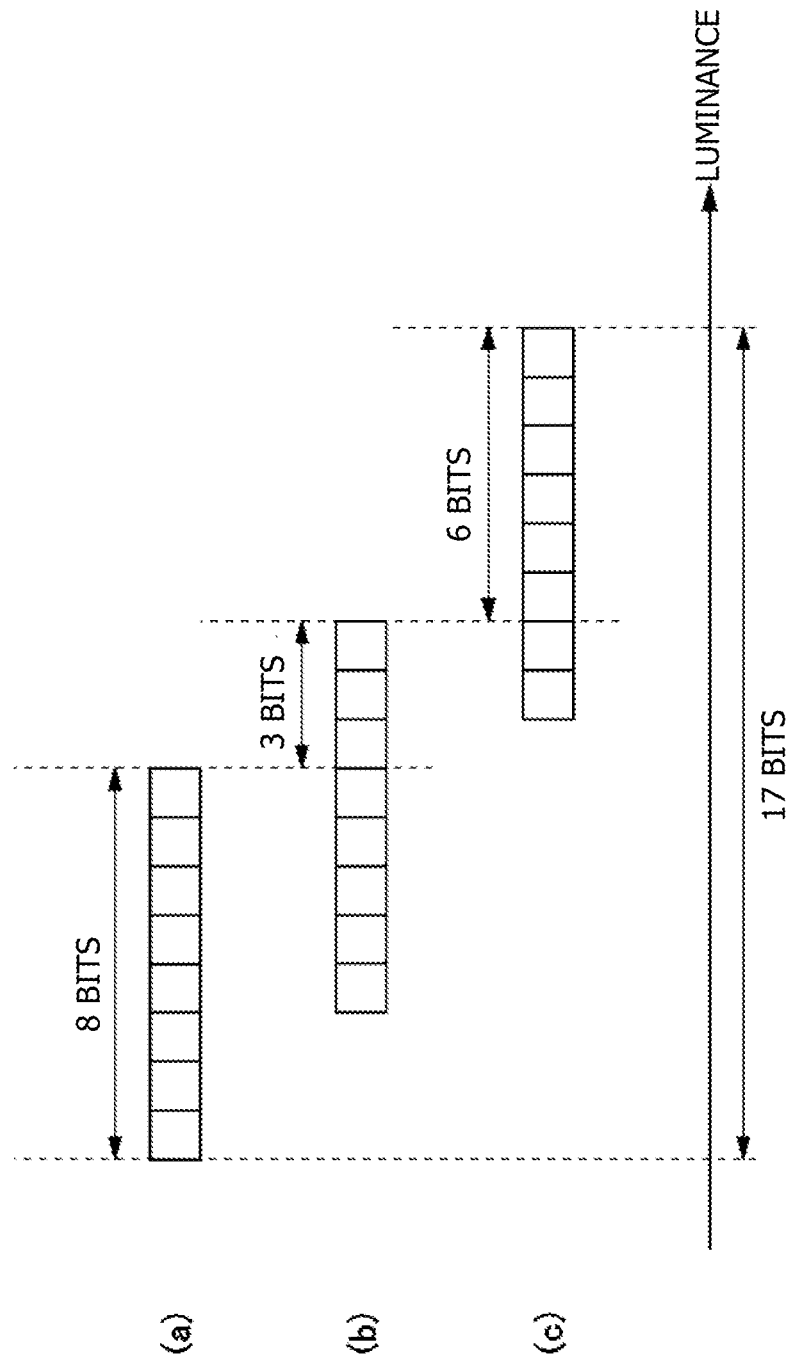
FIGS. 33(a) to 33(c) are diagrams describing a method used by the HDR synthesis section shown in FIG. 28 to proceed with pseudo HDR synthesis.

FIGS. 33(a) to 33(c) are diagrams describing a method used by the HDR synthesis section 420 to perform pseudo HDR synthesis.

In pseudo HDR synthesis, each of the imaging units 20A to 20F is individually controlled by auto exposure control and auto white balance control to shoot a single image with the optimal exposure value. The HDR synthesis section 420 synthesizes an HDR panoramic image by matching corresponding points between two captured images whose shooting directions are adjacent to each other. At this time, we can assume that the luminance and color of the matching points are the same. Further, the optimal exposure values set in the imaging units 20A to 20F by auto exposure are known. Therefore, HDR synthesis is performed without rounding the luminance and color information of each of the pixels of the captured images to eight bits.

More specifically, assume that, because of the difference in optimal exposure value between the three imaging units 20A, 20B, and 20C, the eight-bit luminance information of the image shot by the imaging unit 20A is in the luminance range shown in FIG. 33(a), the eight-bit luminance information of the image shot by the imaging unit 20B is in the luminance range shown in FIG. 33(b), and the eight-bit luminance information of the image shot by the imaging unit 20C is in the luminance range shown in FIG. 33(c).

That is, in a 32-bit high dynamic range, the luminance of the image shot by the imaging unit 20B is in a range that is three bits brighter than the luminance of the image shot by the imaging unit 20A. Further, the luminance of the image shot by the imaging unit 20C is in a range that is six bits brighter than the luminance of the image shot by the imaging unit 20B. In this case, the pixels of the image shot by the imaging unit 20B are shifted by three bits relative to the pixels of the image shot by the imaging unit 20A. The pixels of the image shot by the imaging unit 20C are shifted by nine bits (3+6 bits) relative to the pixels of the image shot by the imaging unit 20A. Then, the pixel values are added up in the 32-bit range. As a result, it is possible to obtain a substantially 17 (8+3+6)-bit high dynamic range pixel values.

It is also possible to obtain high dynamic range color difference information by bit-shifting color difference information in accordance with the optimal exposure value of each of the imaging units 20A to 20F and then adding up the pixel values in the 32-bit space.

[Azimuth Setting]

In the description given above, the shooting directions of the imaging units were not set to a specific direction. However, if the shooting direction of the imaging unit 20A in the front direction is set to magnetic north, for example, the center of the stitched panoramic image faces north. A description will be given below of the configuration adapted to set the azimuth of a panoramic image and the process performed to do so.

Figure 34:
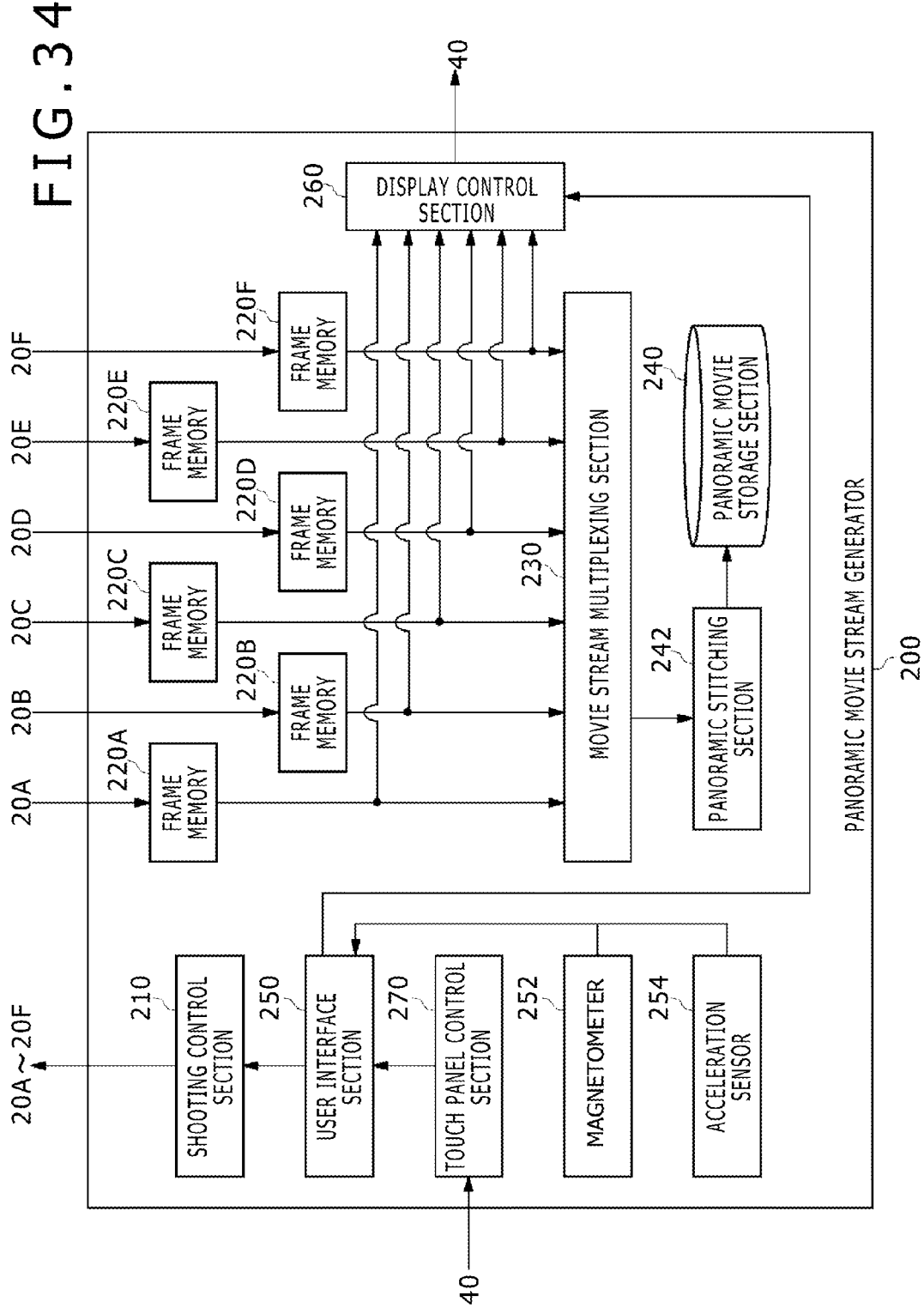
FIG. 34 is a functional configuration diagram of the panoramic movie stream generator capable of adjusting the azimuth.

FIG. 34 is a functional configuration diagram of the panoramic movie stream generator 200 capable of setting the azimuth. A description will be given below of the configuration and operation different from those of the panoramic movie stream generator 200 shown in FIG. 11.

The multiview imaging part 10 or the main body part 30 of the panoramic imaging device 100 incorporates a triaxial magnetometer 252 and a triaxial acceleration sensor 254. Further, a triaxial gyro sensor may also be incorporated. The triaxial magnetometer 252 detects terrestrial magnetism vectors in three axes. The triaxial acceleration sensor 254 detects acceleration vectors of the panoramic imaging device 100 in three axes.

Theoretically, so long as at least one of the triaxial gyro (angular speed) sensor, the triaxial acceleration sensor, and the triaxial magnetometer is incorporated in the panoramic imaging device 100, posture information can be acquired by detecting the inclination of the panoramic imaging device 100 in three axes. Further, azimuth information can be acquired by detecting terrestrial magnetism vectors in three axes by the triaxial magnetometer.

Azimuth information acquired by the triaxial magnetometer 252 is supplied to the user interface section 250. Posture information acquired by at least one of the triaxial magnetometer 252, the triaxial acceleration sensor 254, and the triaxial gyro sensor (if incorporated), is supplied to the user interface section 250.

The user interface section 250 supplies, to the display control section 260, an instruction to display the azimuth in which the multiview imaging part 10 of the panoramic imaging device 100 is shooting and the posture of the panoramic imaging device 100 on the screen. The display control section 260 displays information about the shooting azimuth and the posture in graphics on the operation/display unit 40. Further, the user interface section 250 causes, for example, an instruction to appear on the screen. The instruction prompts the user to adjust the direction of the multiview imaging part 10 so that the shooting direction of one of the imaging units is magnetic north.

FIGS. 35(a) and 35(b) and FIGS. 36(a) and 36(b) are diagrams describing a user interface adapted to set the shooting direction of the imaging unit 20A in the front direction to magnetic north.

FIG. 35(a) is a schematic diagram of the multiview imaging part 10 of the panoramic imaging device 100 as seen from the zenith. The imaging unit 20A adapted to shoot in the front direction is located on the opposite side of the operation/display unit 40. Guidance is displayed on the operation/display unit 40 to prompt the user to adjust the direction of the multiview imaging part 10 so that the shooting direction of the imaging unit 20A serving as a front camera is set to magnetic north. Magnetic north measured by the triaxial magnetometer 252 is indicated by an arrow in FIG. 35(a). There is a discrepancy between the shooting direction of the imaging unit 20A and magnetic north.

FIG. 35(b) is a diagram describing the screen that appears on the operation/display unit 40. Images shot by the six imaging units 20A to 20F are normally displayed respectively in the areas A to F of the operation screen of the operation/display unit 40 as shown in FIG. 10(b). However, when the area A associated with the imaging unit 20A, a front camera, is selected, only the image shot by the imaging unit 20A is displayed in a large size on the operation/display unit 40 as illustrated in FIG. 35(b).

Under the area A (reference sign 42) in which the image shot by the imaging unit 20A is displayed, magnetic north measured by the triaxial magnetometer 252 is displayed by an icon of a compass (reference sign 44). Further, a message "Adjust the orientation of the front camera to magnetic north" appears thereunder (reference sign 46). When the user changes the orientation of the multiview imaging part 10 by rotating the main body part 30 of the panoramic imaging device 100, the shooting direction of the imaging unit 20A changes, thus changing the orientation of magnetic north of the compass.

The user rotates the main body part 30 of the panoramic imaging device 100 in accordance with the displayed message until magnetic north of the compass represented by reference sign 44 points straight up, thus changing the orientation of the imaging unit 20A.

FIGS. 36(a) and 36(b) illustrate the state when the orientation of the imaging unit 20A, a front camera, is aligned with magnetic north measured by the triaxial magnetometer 252. As illustrated in FIG. 36(a), the orientation of the imaging unit 20A is aligned with magnetic north. At this time, magnetic north of the compass points straight up (reference sign 44), and a message "Good!" appears (reference sign 46) as illustrated in FIG. 36(b).

As described above, it is possible for the user to set the orientation of the main body part 30 of the panoramic imaging device 100 so that the shooting direction of the imaging unit 20A, a front camera, is set to magnetic north. As a result, the center of the stitched panoramic image is aligned with true north. The correspondence between the shooting direction of the front camera and the direction of the center of the panoramic image becomes clear by using the imaging unit 20A located on the rear side of the operation/display unit 40 as a front camera and setting the orientation of the front camera to magnetic north. It should be noted that the panoramic imaging device 100 also incorporates the triaxial acceleration sensor 254. This makes it possible to detect the inclination of the multiview imaging part 10 without using a spirit level and correct the multiview imaging part 10 so that it is level during the stitching process.

In the description given above, the shooting direction of the imaging unit 20A, a front camera, is set to magnetic north. However, the shooting direction of the imaging unit 20A may be set to an arbitrary angle with which the center of the panoramic image should be desirably aligned. Alternatively, the shooting direction of the imaging unit other than the front camera may be set to magnetic north or an arbitrary angle.

FIGS. 37(a) and 37(b) and FIGS. 38(a) and 38(b) are diagrams describing a user interface adapted to set the shooting direction of the specific imaging unit to magnetic north.

Assume that magnetic north measured by the triaxial magnetometer 252 is in the direction indicated by an arrow in FIG. 37(a). Here, of the imaging units 20A to 20E, the imaging unit 20C is oriented in the direction closest to magnetic north.

FIG. 37(b) illustrates a screen displayed on the operation/display unit 40. Images shot by the imaging units 20A to 20F are displayed respectively in the areas A to F (reference sign 42). Because the imaging unit 20C is oriented in the direction closest to magnetic north, a compass is displayed in the area C where the image captured by the imaging unit 20C appears, thus indicating the direction of magnetic north (reference sign 44). A message "Adjust the orientation of the camera to magnetic north" appears under the areas A to F (reference sign 46).

The user rotates the main body part 30 of the panoramic imaging device 100 in accordance with the displayed message until magnetic north of the compass represented by reference sign 44 points straight up, thus changing the orientation of the imaging unit 20C.

FIGS. 38(a) and 38(b) illustrate the state when the orientation of the imaging unit 20C is aligned with magnetic north measured by the triaxial magnetometer 252. As illustrated in FIG. 38(a), the orientation of the imaging unit 20C is aligned with magnetic north. At this time, magnetic north of the compass points straight up (reference sign 44), and a message "Good!" appears (reference sign 46) as illustrated in FIG. 38(b).

As described above, it is possible for the user to set the orientation of the main body part 30 of the panoramic imaging device 100 so that the shooting direction of the specific imaging unit is set to magnetic north. It may be difficult, depending on the position of the photographer, to shoot with the shooting direction of the imaging unit 20A, located on the opposite side of the operation/display unit 40, set to magnetic north. In such a case, it is only necessary to set the shooting direction of any one of the imaging units other than the front camera to magnetic north.

Thus, the embodiment of the present invention has been described above. It should be understood by those skilled in the art that the above embodiment is illustrative, that the combination of components and processes can be modified in various ways, and that such modification examples also fall within the scope of the present invention.

A description has been given above of the panoramic imaging device 100 that includes the multiview imaging part 10 and the main body part 30 as an example of a multiview imaging device. The multiview imaging part 10 includes the plurality of imaging units 20A to 20F that are orientated in different shooting directions. The main body part 30 includes the operation/display unit 40. However, at least some of the plurality of imaging units of the multiview imaging part 10 may be oriented in the same direction. In particular, if the multiview imaging part 10 includes at least two imaging units that are oriented in the same direction, and if the positions of the viewpoints of these two imaging units are different, it is possible to shoot an image having parallax. Using parallax images allows to find the depth. As a result, a three-dimensional image can be generated. If a parallax image is a panoramic image, it is possible to generate a three-dimensional panoramic image. Such a stereo imaging device may be configured as another example of a multiview imaging device, and it should be understood by those skilled in the art that the various characteristic components and processes of the above embodiment are also applicable to such a stereo imaging device.

A description has been given above of the present embodiment by taking, as an example of a panoramic image, an entire celestial sphere panoramic image. However, a panoramic image need not be an entire celestial sphere panoramic image. Instead, a panoramic image may be an image obtained by synthesizing a plurality of images shot by a plurality of cameras whose shooting directions are different.

It should be noted that the term "panoramic image" in the present specification is not limited to a "panoramic image" in a narrow sense, that is, a landscape or portrait image, 360-degree whole view image, and so on, but refers simply to an image that spans a wide area. Further, a description has been given of an example of generating a panoramic image as a synthesized image in the present embodiment. However, an output synthesized image need not be a so-called panoramic image. The present invention is applicable even when a synthesized image is an ordinary image of an arbitrary size. Alternatively, an output synthesized image may be an image made up of layered images having a plurality of different resolutions. Such a layered image may be formed so that when an area of the image is enlarged, the enlarged area is replaced by an image with a higher resolution.

REFERENCE SIGNS LIST

10 Multiview imaging part
12 Camera enclosure
14 Fastening member
20A to 20F Imaging unit
30 Main body part
40 Operation/display unit
50 Tripod seat fastening hole
70 Movie recording start/stop button
72 Still image shooting button
74 Auto exposure lock button
75 Camera freeze button
76 Auto white balance lock button
77 Grouping button
78 Extension control button
80 Tripod
100 Panoramic imaging device
200 Panoramic movie stream generator
210 Shooting control section
220A to 220F Frame memory
230 Movie stream multiplexing section
232 Motion detection portion
234 Mode determination portion
236 Control signal generation portion
240 Panoramic movie storage section
242 Panoramic stitching section
246 Switching section
250 User interface section
252 Triaxial magnetometer
254 Triaxial acceleration sensor
260 Display control section
270 Touch panel control section
280 Main processor
290 Secondary storage device
300 Bus interface/camera control interface
310 Pass-through mask register
320 Control data pass-through logic
400 Exposure setting section
410 Panoramic image storage section
420 HDR synthesis section
430A to 430F Frame buffer

INDUSTRIAL APPLICABILITY

The present invention is applicable to a technology adapted to capture a synthesized image.

The invention claimed is:

1. An image generation device comprising:
a plurality of frame memories adapted to store captured images from a plurality of imaging units; and
a multiplexing section adapted to read the captured images of the imaging units from the frame memories and multiplex the captured images to generate an image stream,
wherein the multiplexing section includes
a motion detection portion adapted to detect a motion of a captured image of at least one of the imaging units,
a mode determination portion adapted to set, in accordance with at least one of: (i) an amount of the motion detected by the motion detection portion, and (ii) a predetermined power consumption limit of the image generation device, one of two modes, one for operating the plurality of imaging units simultaneously and the other for operating the plurality of imaging units intermittently, and
a control signal generation portion adapted to supply, to the plurality of frame memories, a control signal adapted to control reading of the captured images from the plurality of frame memories in accordance with the mode set by the mode determination portion.

2. The image generation device of claim 1 further comprising
a shooting control section adapted to control operations of the plurality of imaging units,
wherein the shooting control section supplies, to the plurality of imaging units, a control signal adapted to operate the plurality of imaging units simultaneously or intermittently in accordance with the mode set by the mode determination portion.

3. The image generation device of claim 2,
wherein, even when the mode for operating the plurality of imaging units intermittently is set by the mode determination portion, the control signal generation portion supplies, to the plurality of frame memories, a control signal adapted to operate the plurality of frame memories intermittently while operating the plurality of imaging units simultaneously.

4. The image generation device of claim 1, wherein
the mode determination portion sets the mode for operating the plurality of imaging units simultaneously when the amount of the motion detected by the motion detection portion is equal to or greater than a given threshold, and
the mode determination portion sets the mode for operating the plurality of imaging units intermittently when the amount of the motion detected by the motion detection portion is smaller than the given threshold.

5. The image generation device of claim 4, wherein,
even when the amount of the motion detected by the motion detection portion is equal to or greater than the given threshold, but when the image generation device is not operating within the power consumption limit, the mode determination portion sets the mode for operating the plurality of imaging units intermittently, and
when the amount of the motion detected by the motion detection portion is equal to or greater than the given threshold, and when the image generation device is operating within the power consumption limit, the mode determination portion sets the mode for operating the plurality of imaging units simultaneously.

6. The image generation device of claim 1, wherein,
when the image generation device is operating within the power consumption limit, the mode determination portion sets the mode for operating the plurality of imaging units simultaneously, and
when the image generation device is not operating within the power consumption limit, the mode determination portion sets the mode for operating the plurality of imaging units intermittently.

7. The image generation device of claim 1, wherein,
when the image generation device is operating on power from an external power source, the mode determination portion sets the mode for operating the plurality of imaging units simultaneously, and
when the image generation device is operating on power from a built-in chargeable battery, the mode determination portion sets the mode for operating the plurality of imaging units intermittently.

8. An image generation method comprising:
storing captured images from a plurality of imaging units in a plurality of frame memories; and
reading the captured images of the imaging units from the frame memories and multiplexing the captured images to generate an image stream,
wherein the reading includes
detecting a motion of a captured image of at least one of the imaging units,
setting, in accordance with at least one of: (i) an amount of the motion detected by the motion detection portion, and (ii) a predetermined power consumption limit, one of two modes, one for operating the plurality of imaging units simultaneously and the other for operating the plurality of imaging units intermittently, and
supplying, to the plurality of frame memories, a control signal adapted to control reading of the captured images from the plurality of frame memories in accordance with the set mode.

9. A non-transitory, computer-readable recording medium storing a program for a computer, the program comprising:
a module configured to store captured images from a plurality of imaging units in a plurality of frame memories; and
a module configured to read the captured images of the imaging units from the frame memories and multiplexing the captured images to generate an image stream,
wherein the module configured to read includes
a module configured to detect a motion of a captured image of at least one of the imaging units,
a module configured to set, in accordance with at least one of: (i) an amount of the motion detected by the motion detection portion, and (ii) a predetermined power consumption limit, one of two modes, one for operating the plurality of imaging units simultaneously and the other for operating the plurality of imaging units intermittently, and
a module configured to supply, to the plurality of frame memories, a control signal adapted to control reading of the captured images from the plurality of frame memories in accordance with the set mode.

* * * * *